(12) United States Patent
Kukuk

(10) Patent No.: US 12,478,168 B2
(45) Date of Patent: Nov. 25, 2025

(54) TACTICAL TORSO TOOL CARRIER AND NETWORKED CONTROL AND COMMUNICATION SYSTEM

(71) Applicant: Craig Allen Kukuk, Eagle, ID (US)

(72) Inventor: Craig Allen Kukuk, Eagle, ID (US)

(*) Notice: Subject to any disclaimer, the term of this patent is extended or adjusted under 35 U.S.C. 154(b) by 664 days.

(21) Appl. No.: 17/902,959

(22) Filed: Sep. 5, 2022

(65) Prior Publication Data

US 2023/0073359 A1    Mar. 9, 2023

Related U.S. Application Data

(60) Provisional application No. 63/241,069, filed on Sep. 6, 2021.

(51) Int. Cl.
| | |
|---|---|
| A45F 3/14 | (2006.01) |
| F41A 17/06 | (2006.01) |
| F41C 33/02 | (2006.01) |
| F42B 39/02 | (2006.01) |

(52) U.S. Cl.
CPC .............. *A45F 3/14* (2013.01); *F41A 17/063* (2013.01); *F41C 33/029* (2013.01); *F42B 39/02* (2013.01); *A45F 2003/142* (2013.01); *A45F 2003/146* (2013.01)

(58) Field of Classification Search
CPC ................ A45F 3/14; A45F 2003/142; A45F 2003/146; A45F 5/02; A45F 2200/0516; A45F 2200/0591; F41A 17/063; F41C 33/029; F41C 33/02; F42B 39/02; F41H 13/00; F41H 1/00; H04B 5/79; H04B 1/385; H04B 3/54; H02J 50/10; H02J 50/40; H02J 7/02; H02J 50/80; H04W 4/38; H04W 84/18; H04W 4/80; H04N 23/51; H04N 23/45; H04N 23/55; H04N 23/661; H04R 2499/11
See application file for complete search history.

(56) References Cited

U.S. PATENT DOCUMENTS

| | | |
|---|---|---|
| 7,004,597 B2 | 2/2006 | Kukuk |
| 7,152,990 B2 | 12/2006 | Kukuk |
| 7,524,076 B2 | 4/2009 | Kukuk |
| 9,546,848 B1* | 1/2017 | Burger, Sr. ........... F41G 11/003 |
| 10,469,116 B2* | 11/2019 | Tran ........................ H04B 1/38 |
| 11,583,027 B1* | 2/2023 | Klaftenegger .......... G06F 3/147 |
| 11,647,318 B1* | 5/2023 | Lim ...................... H04R 1/083 |
| | | 381/355 |
| 2015/0256990 A1* | 9/2015 | Vilrokx ................. H04W 76/50 |
| | | 455/404.1 |
| 2016/0165192 A1* | 6/2016 | Saatchi .................. H04N 7/185 |
| | | 386/227 |
| 2016/0172870 A1* | 6/2016 | Blum ..................... H02J 50/12 |
| | | 320/108 |

(Continued)

*Primary Examiner* — Cindy Trandai
(74) *Attorney, Agent, or Firm* — Jonathan Madsen

(57) ABSTRACT

A tactical torso tool carrier and networked control and communication system is disclosed, wherein a tactical torso tool carrier device includes a main unit configured to be worn on the torso of a person, the main unit including a housing having a docking station configured to securely attach a removable tool module, wherein the tactical torso tool carrier device facilitates communications between personnel and systems operably associated with the tactical toro tool carrier and networked control and communication system.

19 Claims, 40 Drawing Sheets

(56) References Cited

U.S. PATENT DOCUMENTS

| | | | |
|---|---|---|---|
| 2016/0190859 A1* | 6/2016 | Blum | F41C 33/029 |
| | | | 348/372 |
| 2017/0160041 A1* | 6/2017 | Stewart | F41C 23/22 |
| 2019/0005803 A1* | 1/2019 | Wingfield | H04B 1/385 |
| 2019/0191060 A1* | 6/2019 | Akens | H04N 23/55 |
| 2019/0325584 A1* | 10/2019 | Peled | G06N 3/045 |
| 2019/0331456 A1* | 10/2019 | Lecosnier | F41C 33/04 |
| 2020/0077052 A1* | 3/2020 | Tran | G02B 27/017 |
| 2020/0146084 A1* | 5/2020 | Boushley | H04W 4/023 |
| 2020/0216132 A1* | 7/2020 | Fuchs | B62J 43/30 |
| 2020/0355463 A1* | 11/2020 | Piccioni | F41C 33/046 |
| 2021/0312951 A1* | 10/2021 | Kakde | G06F 16/748 |
| 2022/0240653 A1* | 8/2022 | Zhang | G16Y 40/35 |
| 2023/0074279 A1* | 3/2023 | Spitzer-Williams | G10L 15/26 |
| 2023/0087554 A1* | 3/2023 | Guzik | G08B 25/10 |
| | | | 455/456.3 |
| 2023/0162307 A1* | 5/2023 | Morris | G06Q 50/265 |
| | | | 705/325 |
| 2023/0273000 A1* | 8/2023 | Pettigrew | F41C 33/029 |
| | | | 396/419 |
| 2023/0417514 A1* | 12/2023 | Rebro | B65D 83/182 |
| 2024/0013333 A1* | 1/2024 | Wilkosz | H04L 41/069 |
| 2024/0013801 A1* | 1/2024 | Adeel | G06F 16/632 |

* cited by examiner

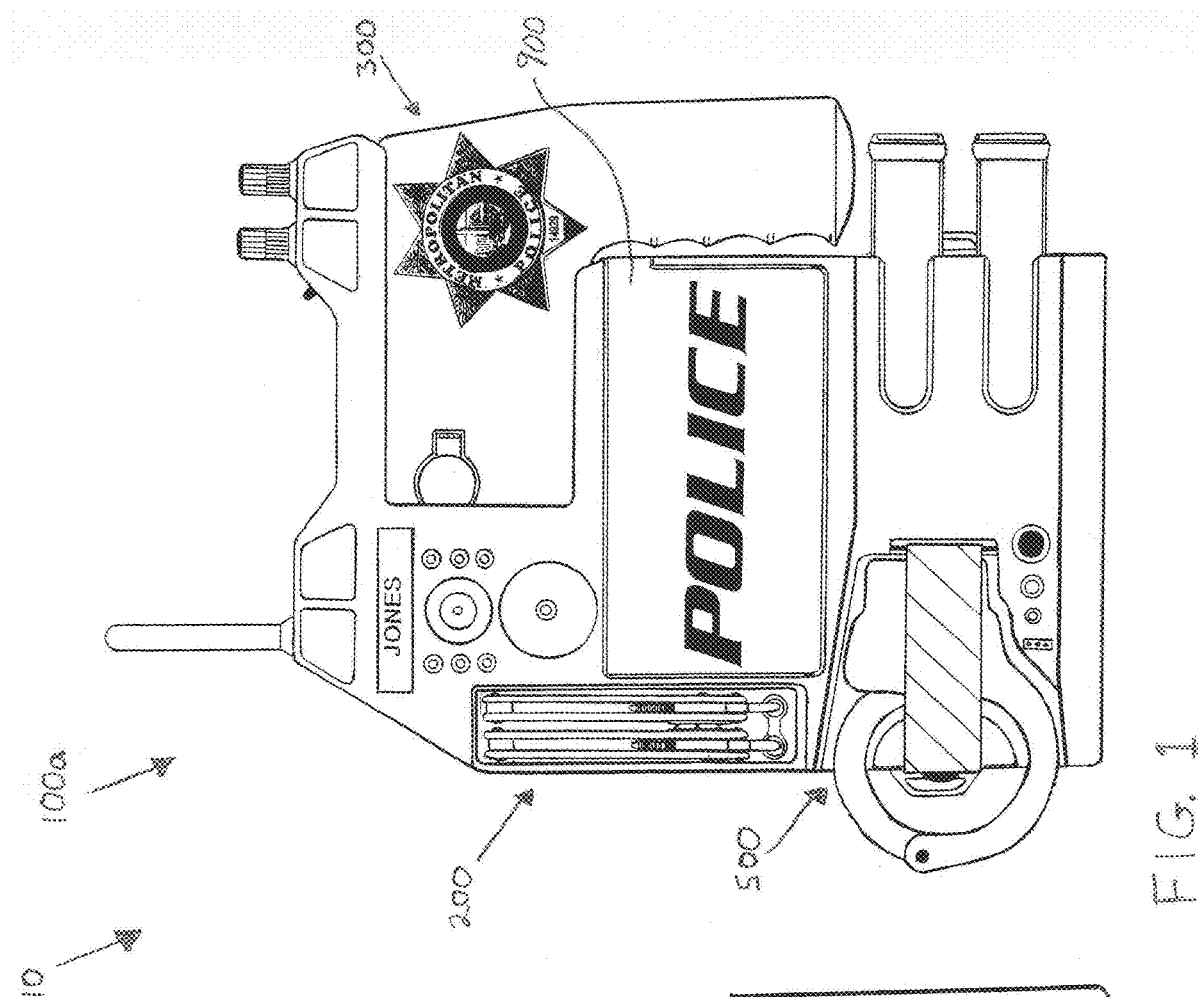
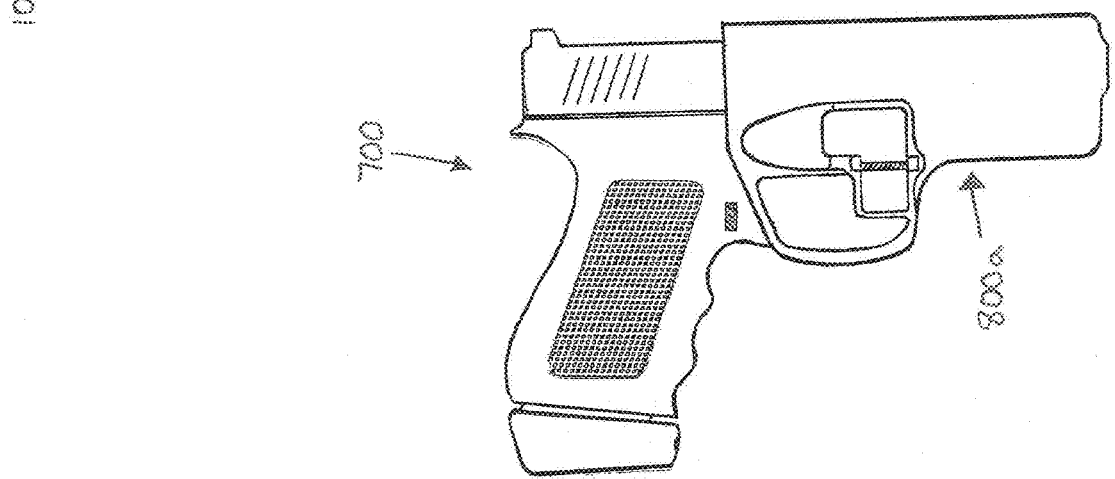
FIG. 1

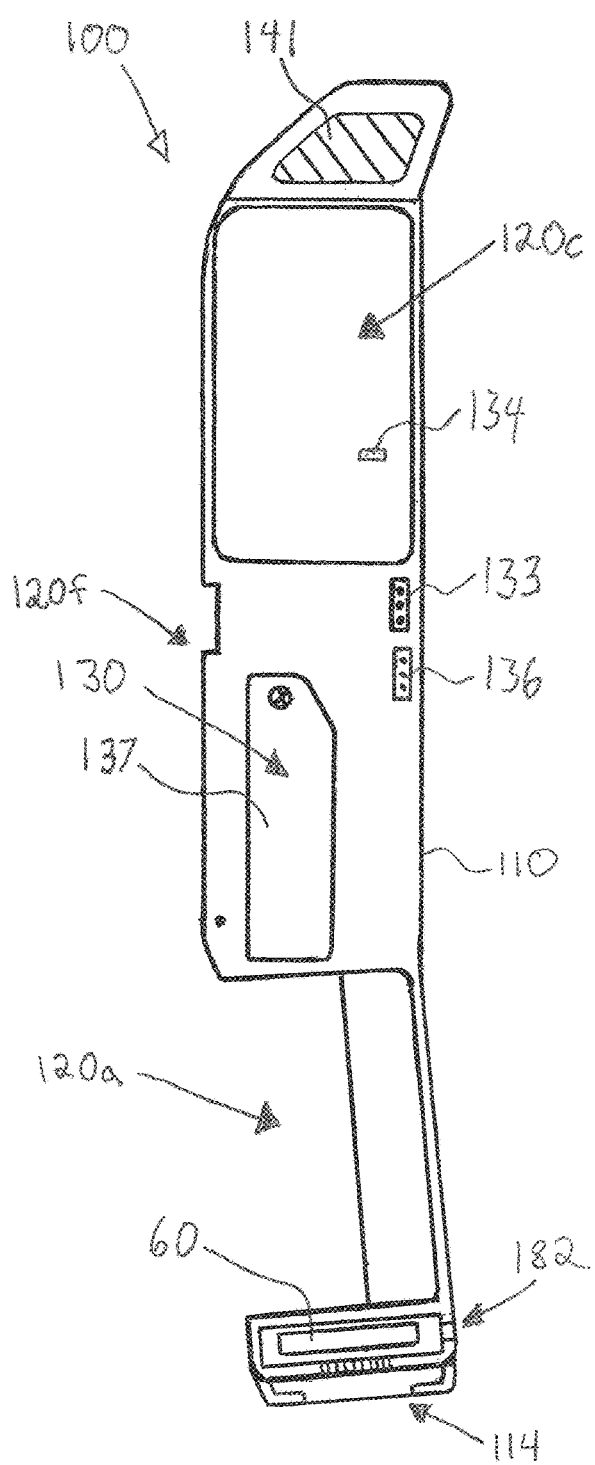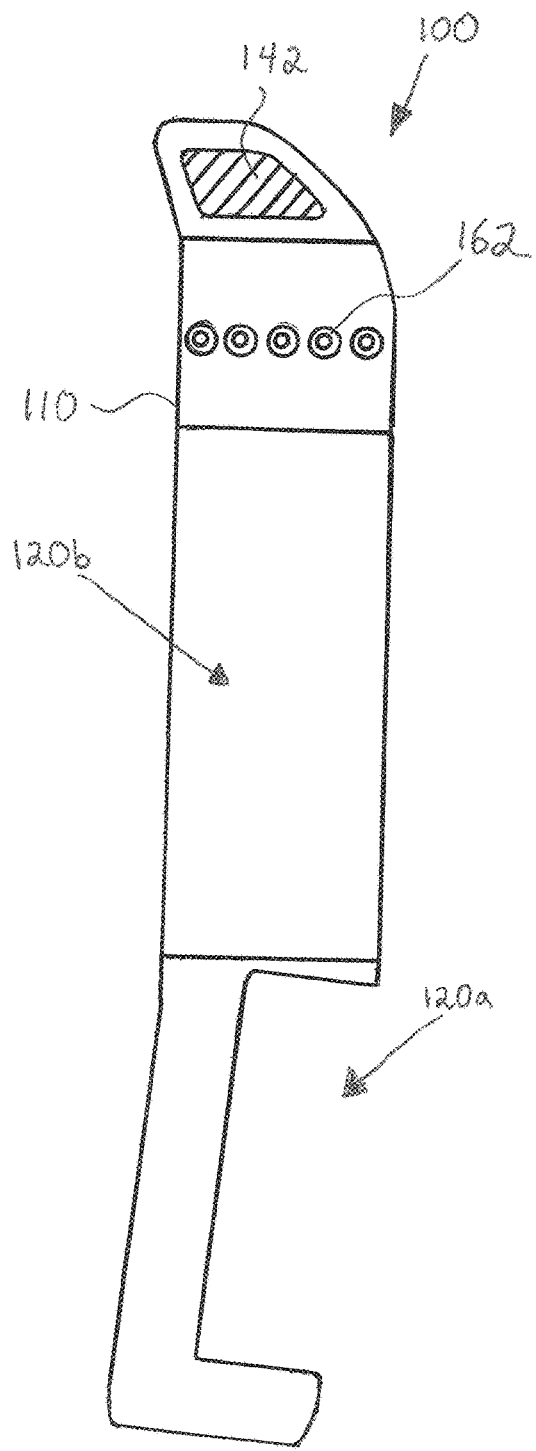
FIG. 5A
FIG. 5B

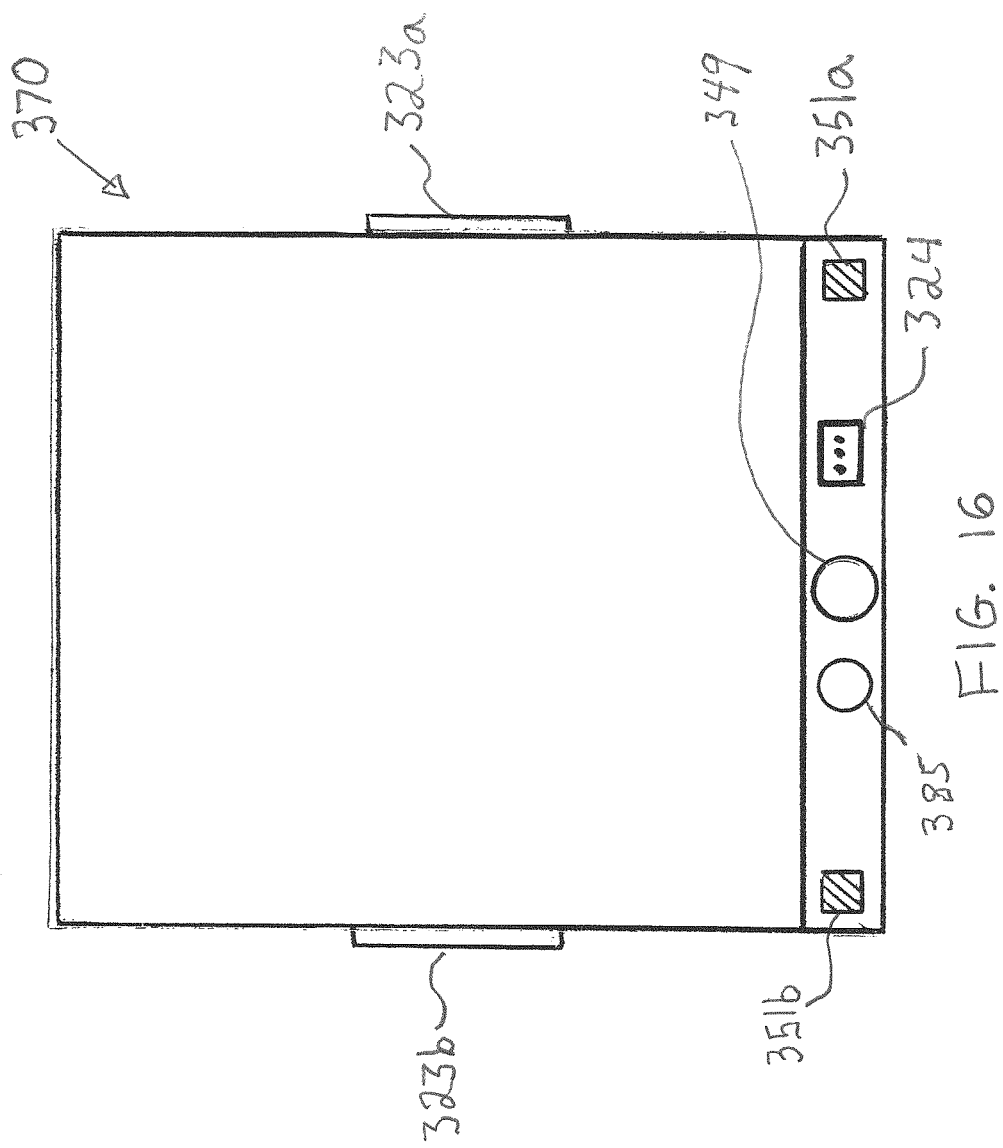

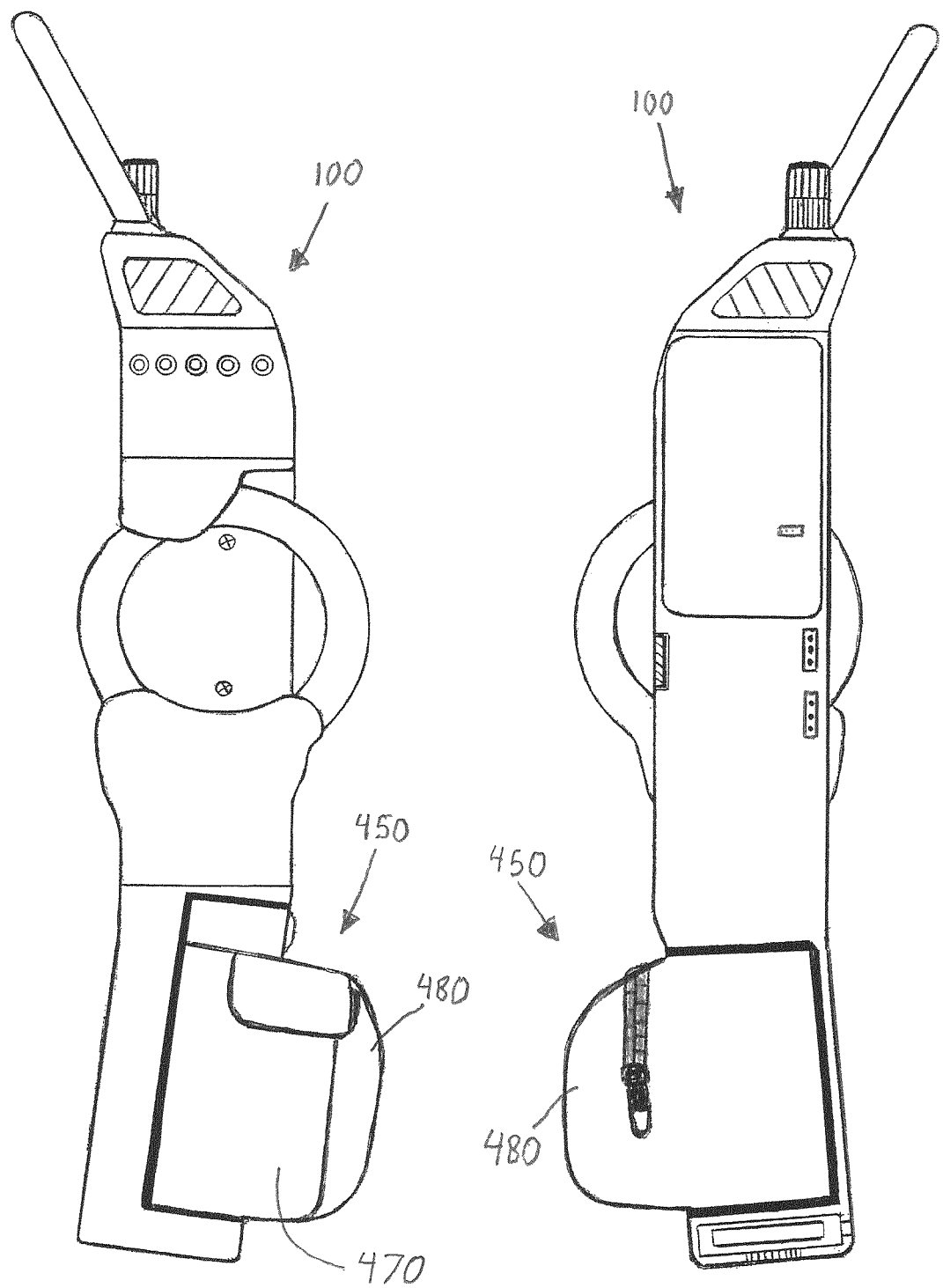

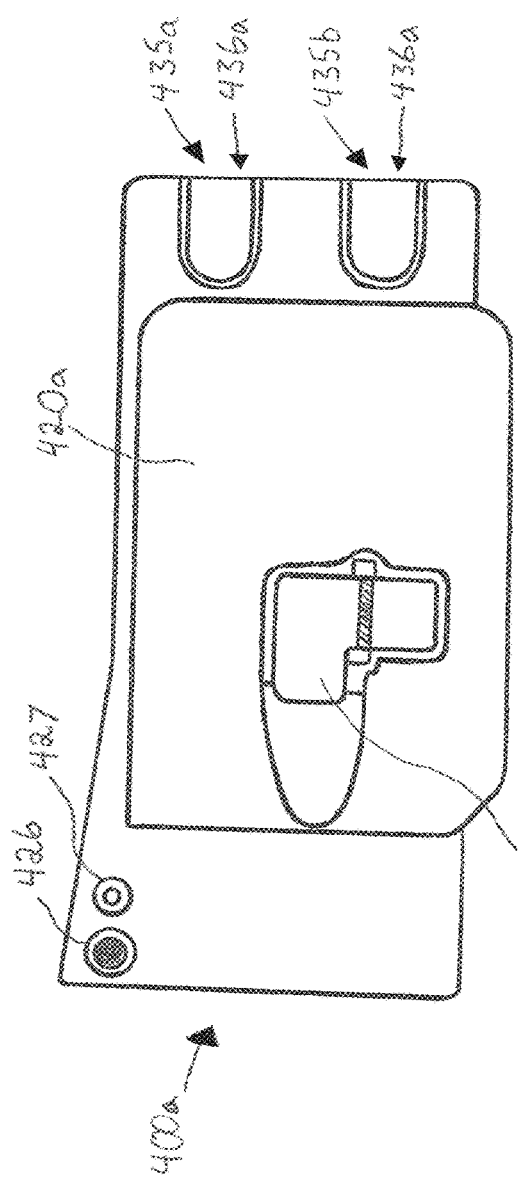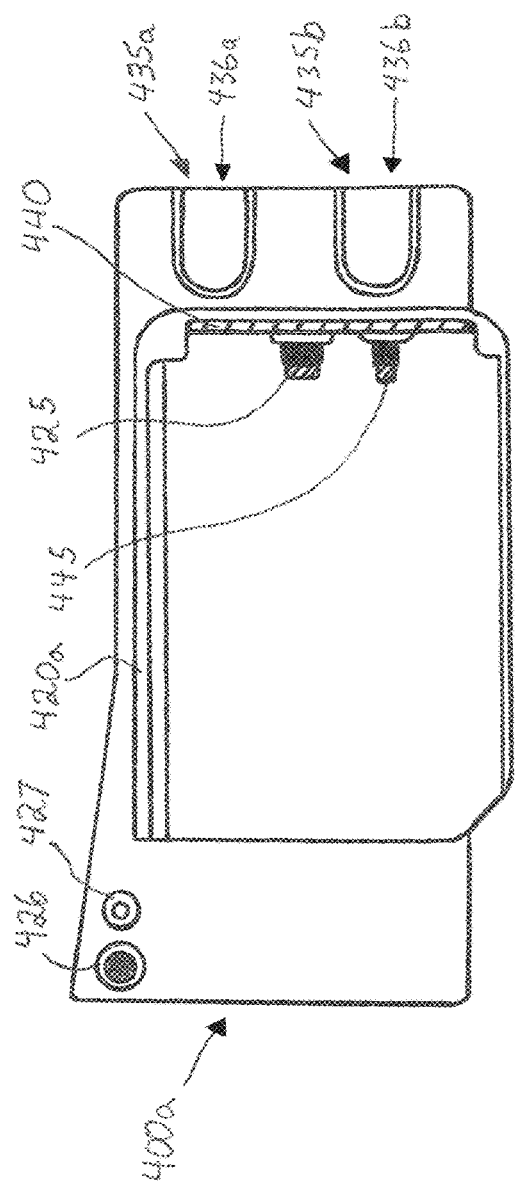

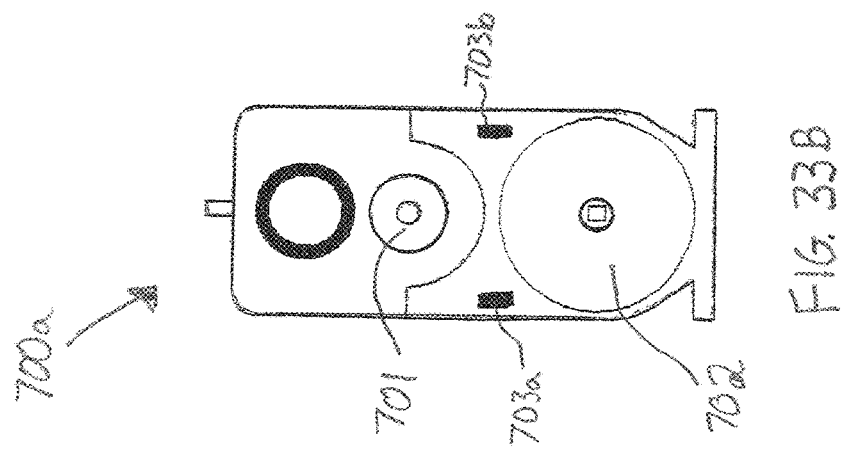
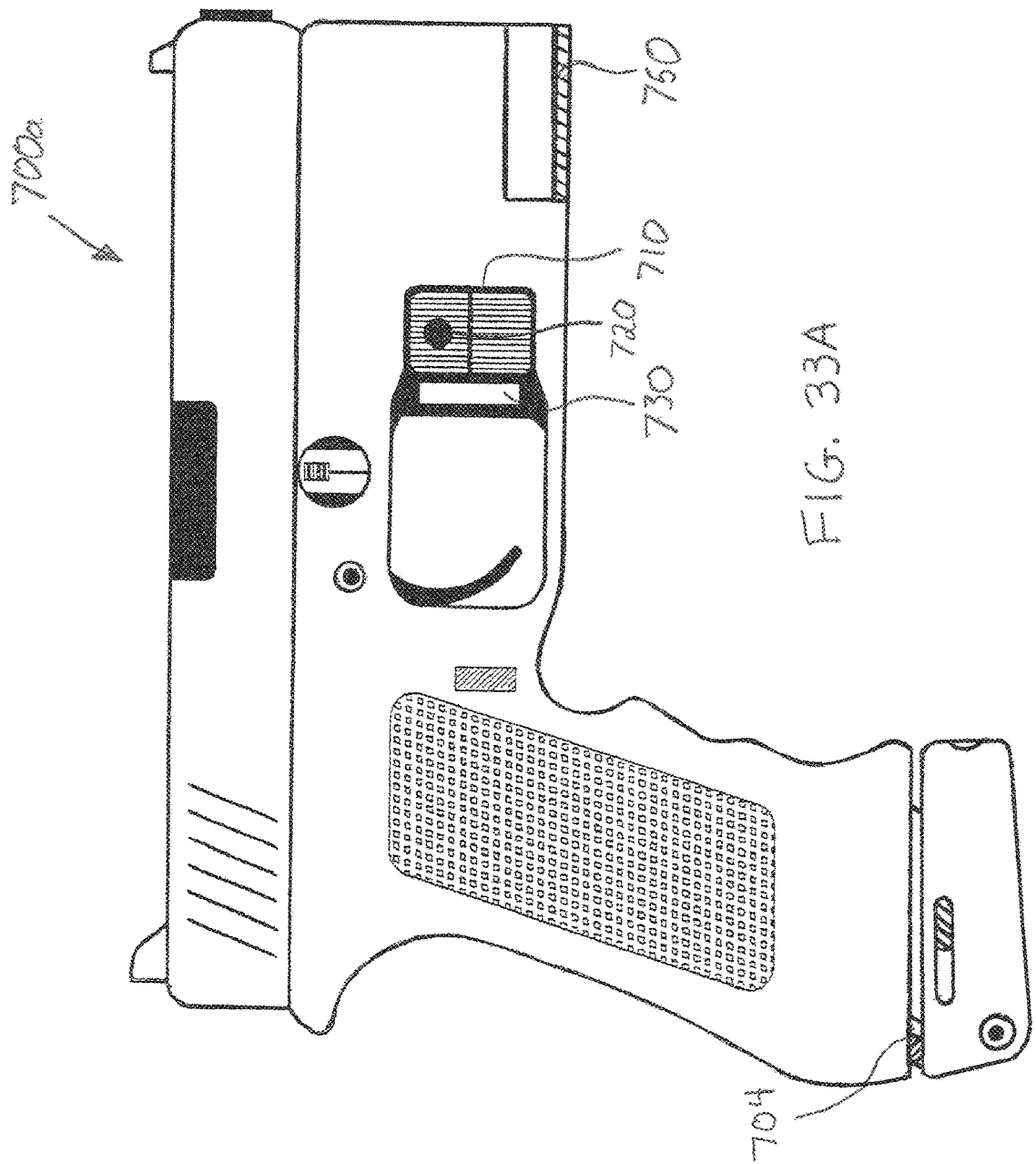
FIG. 33B
FIG. 33A

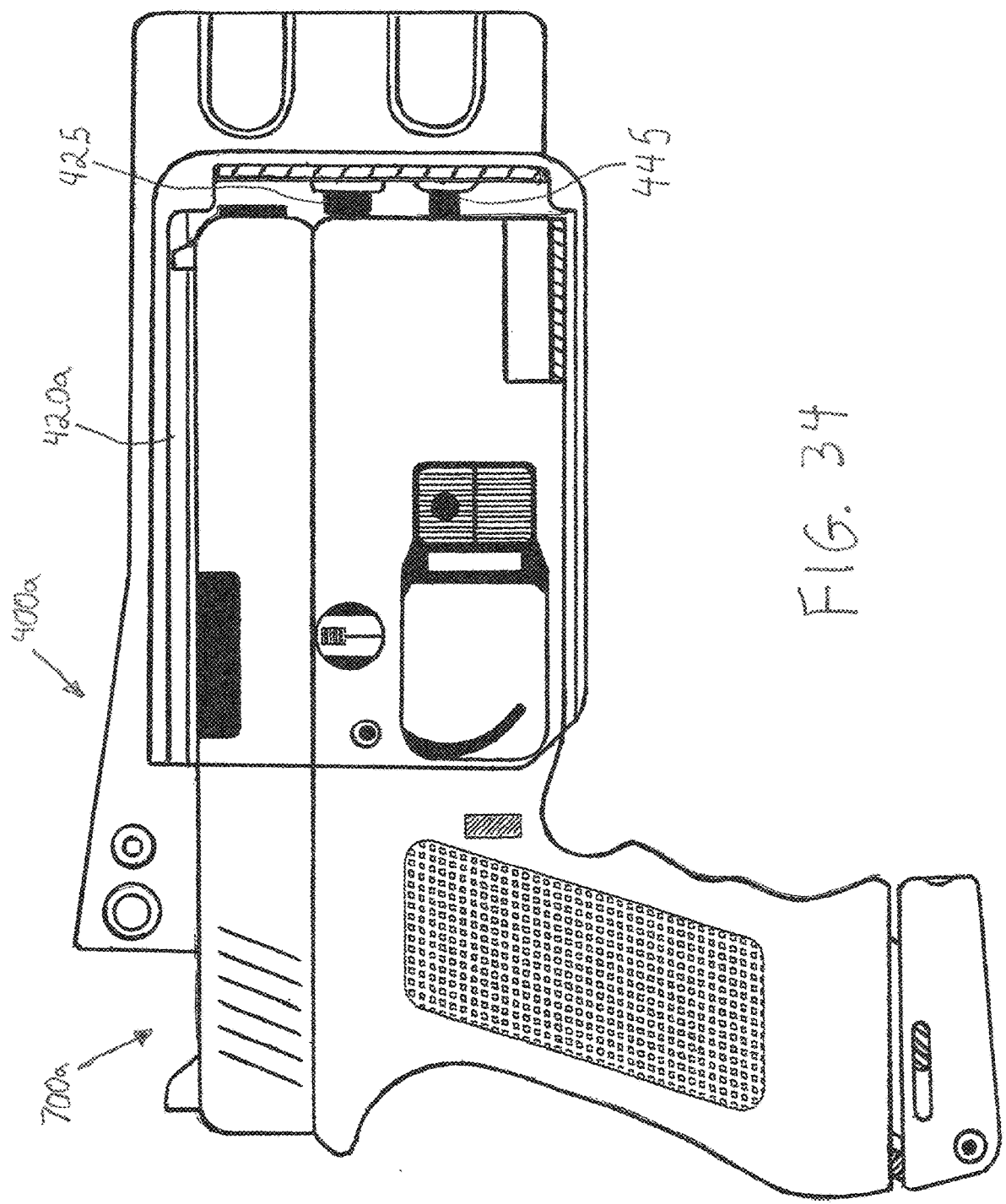

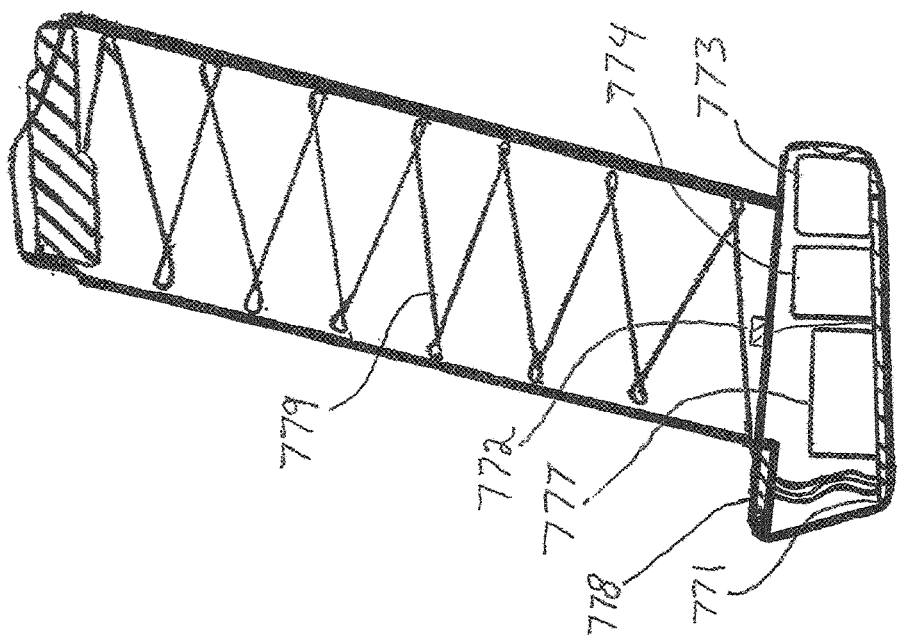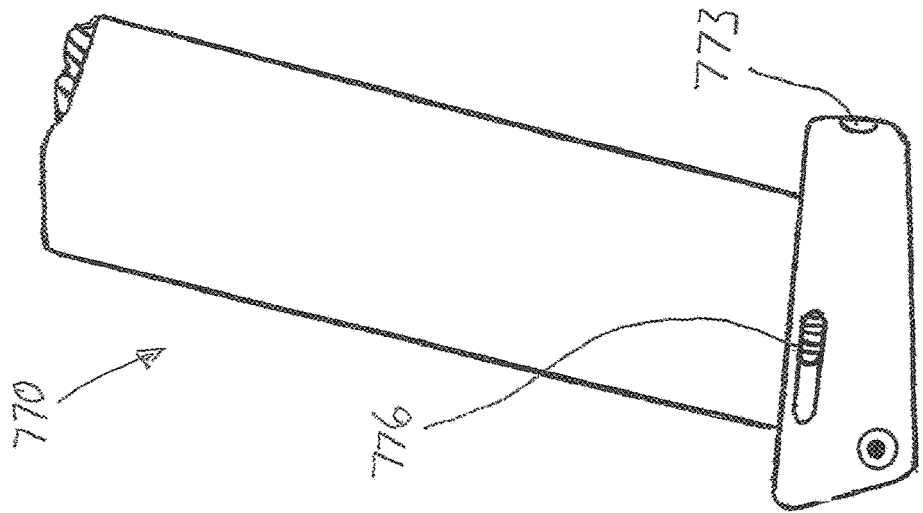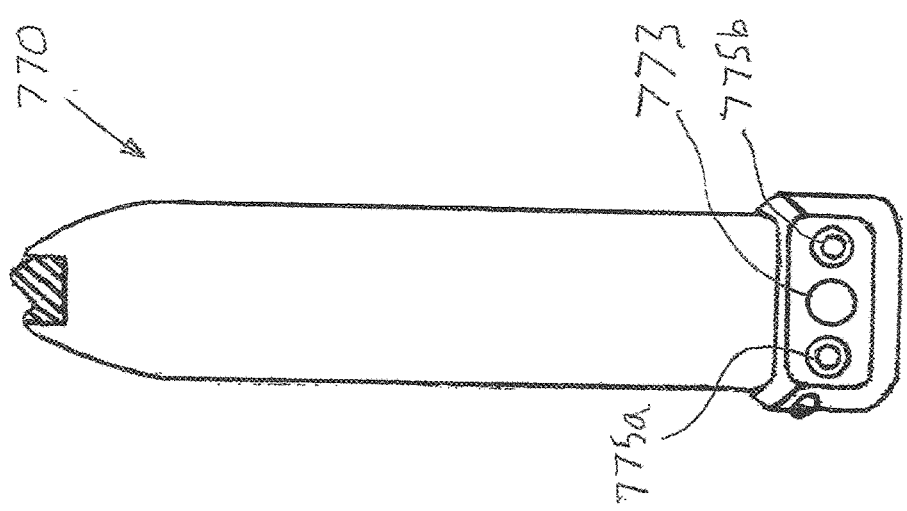

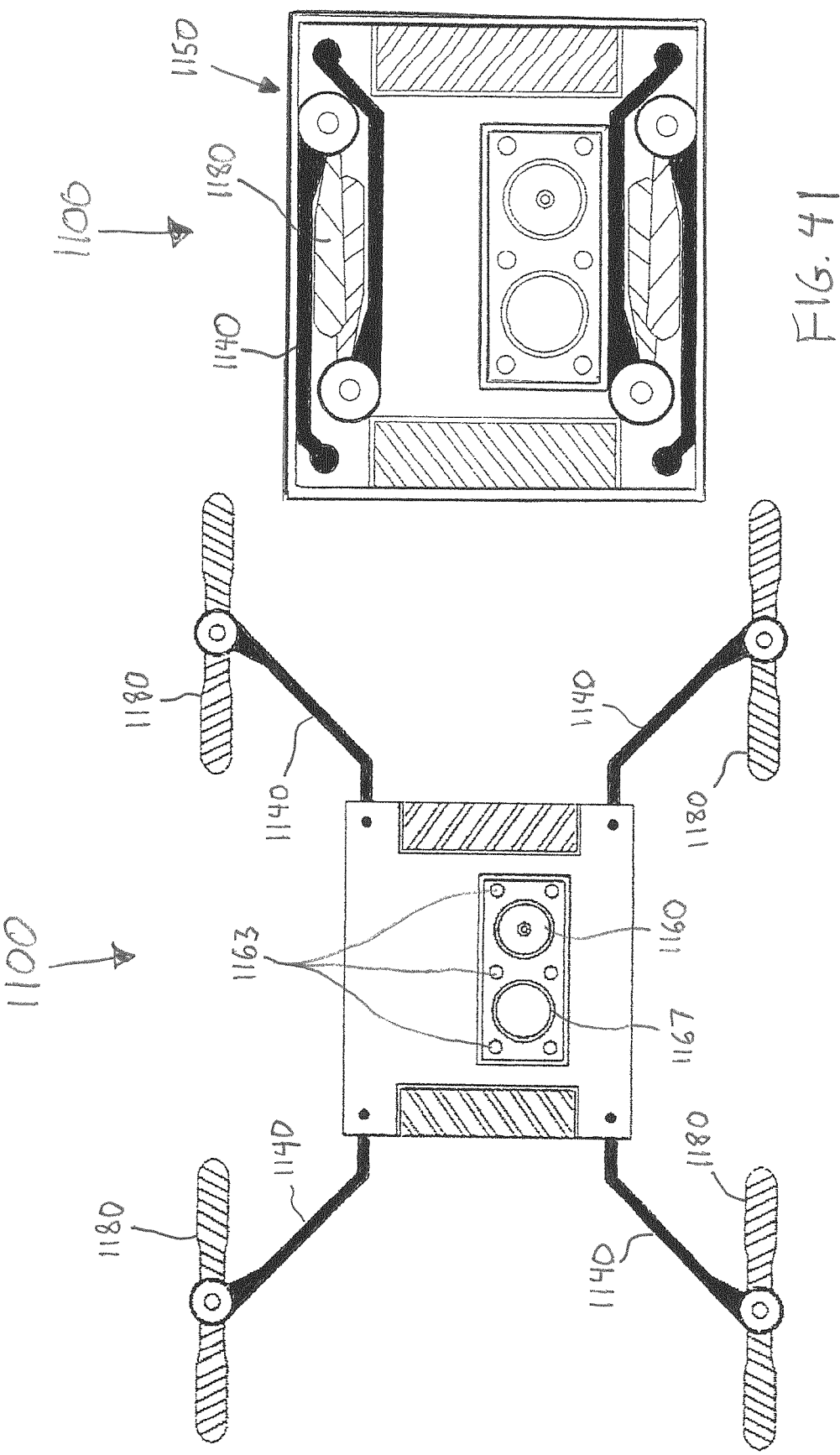

TACTICAL TORSO TOOL CARRIER AND NETWORKED CONTROL AND
COMMUNICATION SYSTEM

CROSS REFERENCE TO RELATED APPLICATION(S)

This application claims the benefit of U.S. Provisional Patent Application No. 63/241,069, filed Sep. 6, 2021, the disclosure of which is hereby incorporated entirely herein by reference.

TECHNICAL FIELD

This invention relates generally to a tactical torso tool carrier and networked control and communication system, wherein tools, implements and devices commonly carried and utilized by law enforcement, security and military personnel are readily stored and accessed in a torso-wearable main unit facilitating networked control and communication between personnel and systems operably associated with the tactical torso tool carrier and networked control and communication system.

BACKGROUND

As law enforcement has advanced and incorporated technological improvements, the number of tools and implements carried on the person of a typical law enforcement officer has likewise increased. It is important for law enforcement officers to have their hands as free as possible. Hence, many law enforcement tools and implements are carried on a belt, often called a duty belt. Typically, such belts are often two or more inches wide and are increasingly made of nylon or other synthetic fabrics, although leather belts remain very common. Duty belts generally include various pockets, clips, and attached pouches that are designed to make a law enforcement officer's tools readily accessible, while leaving the officer's hands free to interact. Moreover, enforcement agencies and security forces are moving increasingly toward having officers carry gear in and/or on a shirt, suspenders and/or a vest. Such shirts, suspenders, or vests may be configured to include a number of pockets, pouches and clips that may permit tool storage. It is also common practice for officers to wear a body armor vest. Hence, such body armor vests may integrate tool storage structure and functionality.

Conventional duty belts, shirts, suspenders, and vests may have several downsides. The size and weight of a standard duty belt, especially with tools mounted thereon, can make it difficult to readily move, especially to run, or sit properly, such as in a vehicle. The weight and size of a belt may adversely affect officer health and cause, inter alia, lower back pain. Furthermore, complications can arise for smaller officers, such as women or men with a slender frame, because there is simply not enough body area around their waist to effectively place and wear the belt with all the tools. Problems have likewise arisen with shirts, suspenders or vests configured to store and carry law enforcement tools and implements. For example, there is a lack of consistency regarding how and where on a shirt, suspender, or vest the various tools and implements should be mounted. Placement of gear on a vest can be cumbersome and impede officer performance. Additionally, as law enforcement agencies increasingly utilize officer-worn cameras, operation may be hindered, because, when mounted on a shirt, suspender, or vest, the camera may be obscured when an officer has drawn and is pointing their weapon at a potential assailant. The several tools and implements carried on a duty belt, a shirt, suspenders, and/or vest of a law enforcement officer may rattle creating noise and potentially give away an officer's position.

Many of the tools commonly worn or carried by security and law enforcement officers require battery power to operate, and it often becomes incumbent upon an officer to ensure that the batteries of such tools are properly charged. Because each battery-powered tool normally operates separately from the other tools, an officer may be required to recharge and keep track of multiple tools' battery capacity, wherein each tool may comprise a separate charging unit or charging plug and cable. Maintaining proper battery power for several separate tools can be cumbersome and may result in tools having insufficient charge when needed. Moreover, many common law enforcement tools generate and/or utilize substantial amounts of digital data, which data may need to be stored and/or communicated to other personnel or systems, wherein different tools may rely on separate communication and storage protocols requiring implementation and management of multiple communication networks and/or storage systems. The increasing number of tools and communication implements, including drones, used by law enforcement officers, military, and security personnel has outpaced the common duty belt and been unmet by cumbersome shirt, suspender, and vest adaptations. Hence a need exists for a tactical torso tool carrier and networked control and communication system that efficiently and securely stores and electrically charges readily accessible law enforcement tools and implements and facilitates efficient communications and system operations, while offering numerous other advantages as described herein below.

SUMMARY

An aspect of the present disclosure provides a tactical torso tool carrier and communication device comprising a main unit configured to be worn on the torso of a person, the main unit including a housing having a plurality of docking stations, wherein each of the plurality of docking stations is configured to securely attach a removable tool module to the housing, and wherein at least one of the plurality of docking stations is configured to securely attach tool modules having different configurations; a transmitter/receiver, wherein at least a portion of the transmitter/receiver is housed within the housing, a video camera, wherein at least a portion of the video camera is housed within the housing, a screen, attached to the housing, a processor, in communication with the transmitter/receiver, the video camera, and the screen, and a battery, configured to provide electrical power to the transmitter/receiver, the video camera, the screen, and the processor.

Particular aspects of the tactical torso tool carrier and communication device including wherein the main unit further comprises a body light, a drone activation button, an emergency button, a nameplate and police indicia, handcuffs, an infrared strobe, a magazine holder, a tourniquet, a knife holder sleeve configured to receive a tactical knife and handcuff key, and an identity verification actuator; and wherein the transmitter/receiver operates with a two-way radio. The main unit operates with a smart holster having a use sensor, the smart holster in communication with the processor. The smart holster includes a charging contact configured to mate with a charging contact of an electronically enhanced lethal firearm, the electronically enhanced lethal firearm including a gun light, a laser sight, and a battery, the battery in electrical communication with an electronically enhanced wireless magazine having an electrical contact configured to electrically connect with a corresponding contact of the electronically enhanced lethal firearm, when the magazine is loaded in an operable position within the electronically enhanced lethal firearm, and further wherein the electronically enhanced wireless magazine includes a camera, a wireless transmitter, a processor, and a battery electrically connected with the camera, the wireless transmitter, and the processor. At least one of the plurality of docking stations is configured as a housing compartment to securely removably stow and charge a non-lethal multi-functional law enforcement weapon tool, wherein the non-lethal multi-functional law enforcement weapon tool includes a flashlight, a laser sight, a pepper spray canister, a wireless transmitter, a battery, and a removable electronic control device cartridge. The removable electronic control device cartridge includes a laser sight hole, a pepper spray nozzle, at least one electrically charged probe, and a pressurized gas capsule configured to discharge gas based on a command initiated via the non-lethal multi-functional law enforcement weapon tool and project the at least one electrically charged probe and tethered wire away from the electronic control device cartridge. The main unit is configured to operate with at least one autonomous drone in communication with the processor.

Another aspect of the present disclosure provides a method of wireless communication, the method comprising providing a plurality of tactical torso tool carrier and communication devices, wherein each of the provided tactical torso tool carrier and communication devices include a main unit configured to be worn on the torso of a person, the main unit including a housing having a plurality of docking stations, wherein each of the plurality of docking stations is configured to securely attach a removable tool module to the housing, a wireless transmitter/receiver, wherein the transmitter/receiver is housed within the housing, a video camera, wherein at least a portion of the video camera is housed within the housing, a microphone, wherein at least a portion of the microphone is located on the housing, a screen, attached to the housing, a processor, housed within the housing and in communication with the wireless transmitter/receiver, the video camera, the microphone, and the screen, and a battery, configured to provide electrical power to the wireless transmitter/receiver, the video camera, the microphone, the screen, and the processor, and transmitting communications between at least two tactical torso tool carrier and communication devices of the plurality of tactical torso tool carrier and communication devices.

Particular aspects of the method of wireless communication include the communications transmitted between the at least two tactical torso tool carrier and communication devices include audio/visual signal and global positioning system data. The method further comprises transmitting communications between a command center and at least one tactical torso tool carrier device of the plurality of tactical torso tool carrier and communication devices. Moreover, the method comprises transmitting communications between an autonomous drone and at least one tactical torso tool carrier device of the plurality of tactical torso tool carrier and communication devices.

Still another aspect of the present disclosure provides a networked control and communication system comprising a plurality of tactical torso tool carrier and communication devices, wherein each tactical torso tool carrier and communication device of the plurality of tactical torso tool carrier and communication devices includes a main unit configured to be worn on the torso of a person, the main unit including a housing having at least one docking station, wherein the at least one docking station is configured to securely attach a plurality of differently configured removable tool modules to the housing, a microphone, wherein at least a portion of the microphone is located on the housing, a video camera, wherein at least a portion of the video camera is housed within the housing, a processor, in communication with the microphone and the video camera, and a battery, configured to provide electrical power to the microphone, the video camera, and the processor, and a command center, wherein at least two of the tactical torso tool carrier and communication devices of the plurality of tactical torso communications devices communicate with the command center through a communication network, and wherein communications between at least two of the tactical torso tool carrier and communication devices of the plurality of tactical torso communications devices are exchanged through the communication network.

Particular aspects of the networked control and communication system include communications through the communication network between the command center and at least one tactical torso tool carrier and communication device include audio/video data. The communications through the communication network between at least two of the tactical torso tool carrier and communication devices of the plurality of tactical torso communications devices include audio/video data. The communications through the communication network between the command center and at least one tactical torso tool carrier and communication device include smart holster sensor operation data. The communications through the communication network between the command center and at least one tactical torso tool carrier and communication device include two-way radio communications. The system further comprises communications through a communication network between at least one tactical torso tool carrier and communication device and a data repository. Moreover, the system comprises communications between the command center and at least one autonomous drone. The at least one autonomous drone is communicatively associated with a drone network comprising a plurality of autonomous drones, and wherein each of the autonomous drones of the plurality of autonomous drones of the drone network is configured to communicate with the command center. The system additionally comprises communications between at least one autonomous drone and at least one tactical torso tool carrier and communication device.

The foregoing and other aspects, features and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIG. 1 is a front view of a tactical torso tool carrier device including a main unit with an attached handcuff and magazine holder tool module attached to a bottom docking station of the main unit, and an operably associated smart holster and lethal firearm;

FIG. 5A is a right side view of a main unit with no tool modules attached to any docking stations;

FIG. 5B is a left side view of a main unit with no tool modules attached to any docking stations;

FIG. 16 is a back view of a removable electronic control device cartridge;

FIG. 29A is a left view of a main unit having a pouch carrier tool module attached to a bottom docking station;

FIG. 29B is a right view of a main unit having a pouch carrier tool module attached to a bottom docking station;

FIG. 31 is a front view of a gun holster tool module including a smart holster;

FIG. 32 is a front partial cut-away view of a gun holster tool module including a smart holster having a charging contact configured to mate with a charging port of an electronically enhanced lethal firearm;

FIG. 33A is a left side view of an electronically enhanced lethal firearm;

FIG. 33B is a front view of an electronically enhanced lethal firearm;

FIG. 34 is a partial cut-away front view of a gun holster tool module including a smart holster with an electronically enhanced lethal firearm operably holstered therein;

FIG. 35A is a front view of an electronically enhanced magazine configured to be loaded in an operable position within an electronically enhanced lethal firearm;

FIG. 35B is a left side view of an electronically enhanced magazine configured to be loaded in an operable position within an electronically enhanced lethal firearm;

FIG. 35C is a cut-away left side view of an electronically enhanced magazine configured to be loaded in an operable position within an electronically enhanced lethal firearm;

FIG. 40 is a top view of an autonomous drone;

FIG. 41 is a top view of an autonomous drone with collapsible rotor arms folded into a drone tool module;

DETAILED DESCRIPTION

Figure 2:
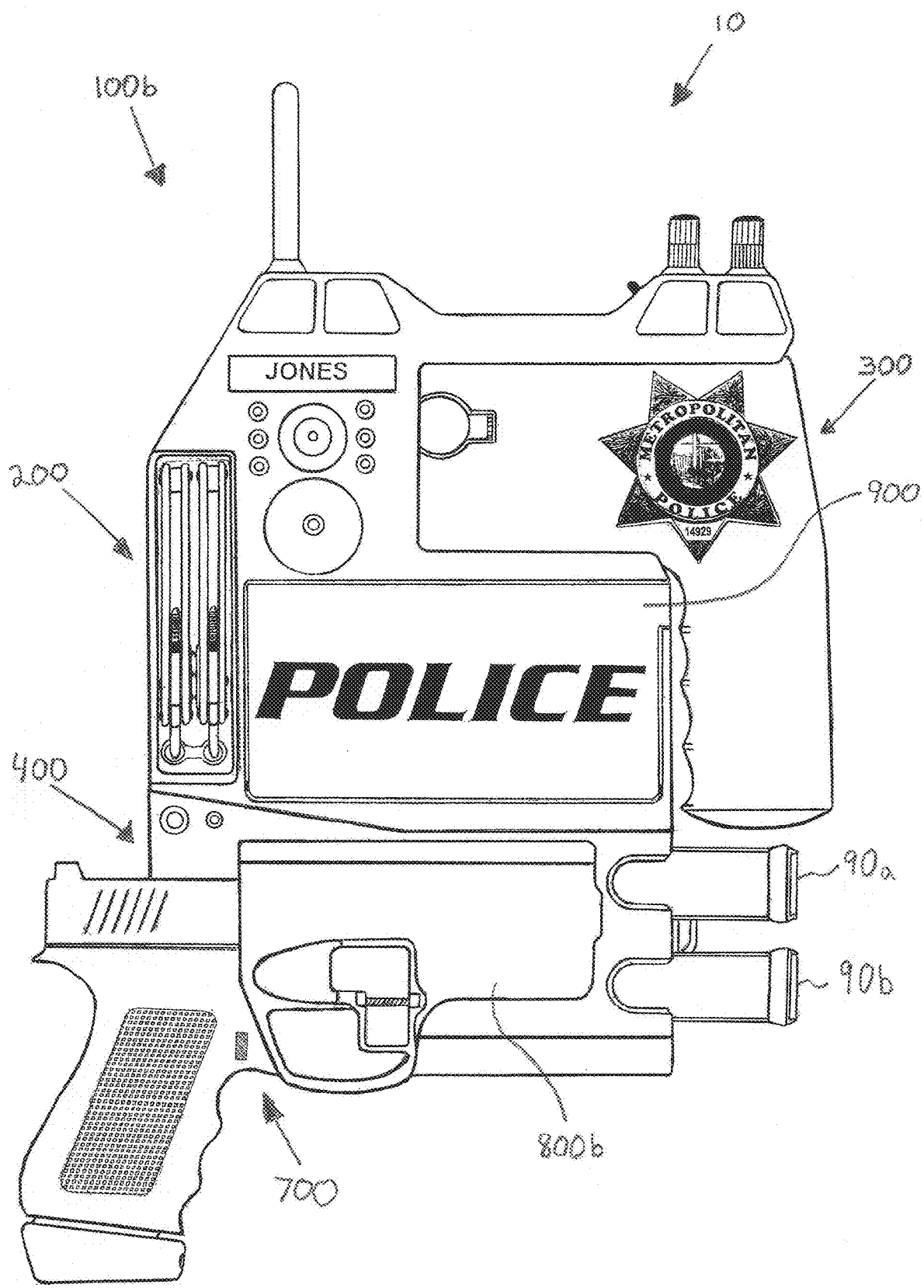
FIG. 2 is a front view of a tactical torso tool carrier device including a main unit with an attached smart holster tool module attached to a bottom docking station of the main unit, and a holstered lethal firearm.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations in many different forms, there is shown in the drawings and will herein be described in detail particular implementations with the understanding that the present disclosure is to be considered as an exemplification of the principles of the disclosed devices, methods and systems, and is not intended to limit the broad aspect of the disclosed concepts to the implementations illustrated.

The present disclosure concerns a tactical torso tool carrier and networked control and communication system for use by law enforcement officers and security personnel. A variety of different implementations are discussed below. These implementations introduce improvements to the conventional duty belt and/or shirt, suspenders or vest adaptations provided to store, charge, carry, and utilize law enforcement tools and implements on the person of an active security or law enforcement officer. These improvements may also allow law enforcements officers or security personnel to be a part of a communications network or system with other officers within their department. Aspects of the tactical torso tool carrier and networked control and communication system may include the generation, transmission, collection, and/or storage of data, wherein the data may pertain to situational/environmental conditions captured by and/or associated with tactical torso tool carriers worn by officers and/or may pertain to supplemental data applicable to the situational/environmental conditions of the officers, wherein generation of the supplemental data may be external to the networked control and communication system. Aspects of a tactical torso tool carrier and networked control and communication system may operate with associated independent operational systems, such as drone network systems, global positioning systems, cellular data transmission systems, camera data transmission and/or storage systems, and other independent operational systems. It should be understood that the aspects and components depicted and discussed are not limiting examples, and that the contemplated aspects and components may be combined with any of the other aspects and components in other implementations.

Figure 3:
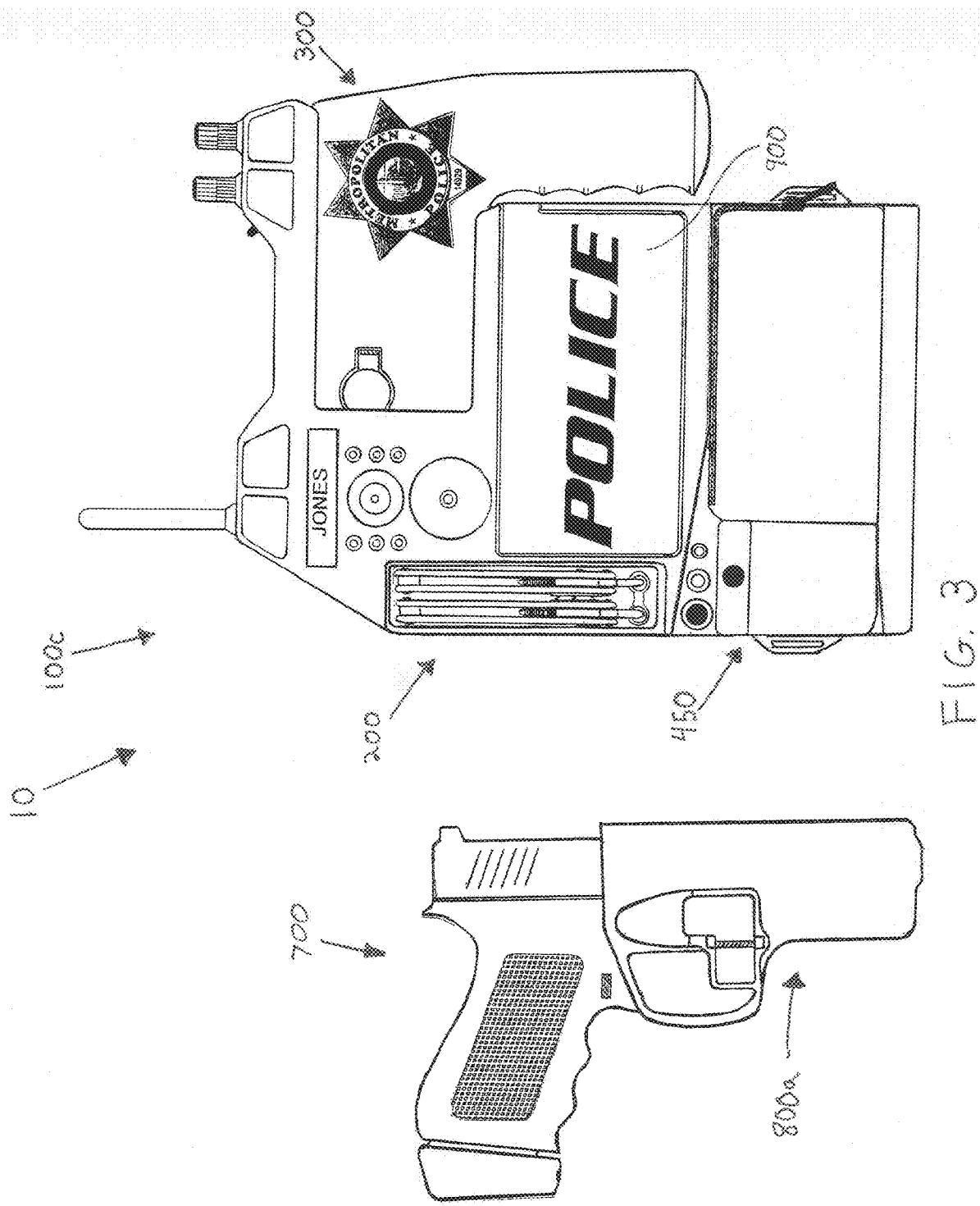
FIG. 3 is a front view of a tactical torso tool carrier device including a main unit with an attached pouch carrier tool module attached to a bottom docking station of the main unit, and an operably associated smart holster and lethal firearm.

As shown in FIGS. 1-3, implementations of the presently discussed tactical torso tool carrier and networked control and communication system may include a tactical torso tool carrier and communication device 10, wherein the tactical torso tool carrier and communication device 10 may include a main unit 100, such as a main unit embodiment 100*a*, 100*b*, and/or 100*c* depicted respectively in FIGS. 1-3. As further depicted in FIG. 4, each main unit 100, such as main unit embodiments 100*a*-100*c* (see FIGS. 1-3) and/or other like main unit 100 embodiments, may include a housing 110, wherein the housing 110 may have one or more docking stations, such as docking stations 120*a*, 120*b* 120*c*, 120*f* and/or other like docking stations, and wherein the one or more docking stations, such as docking stations 120*a*, 120*b*, 120*c*, and 120*f* may be configured to securely attach a removable tool module, such as removable tool modules 200, 300, 400, 450, 500 and 900 shown in FIGS. 1-3, and/or other like removable tool modules. The type, style, and number of attachable tool modules associated with main unit embodiments may vary. Each tool module associated with a tactical torso tool carrier and communication device 10 may be configured to physically and/or functionally interact with a main unit 100, such as main unit embodiment 100*a*, main unit embodiment 100*b*, and main unit embodiment 100*c*, or other like main unit embodiments. The various removably attachable tool modules may also be configured to be electronically connected with electronic component elements of a main unit 100. Electronic connections associated with a main unit 100 may provide electrical power to tools, features and other like implements of a removably attachable tool module. Moreover, electronic connections associated with a main unit 100 may facilitate electronic communication transmission. Electronic connections (for power transmission and/or for communication transmission/reception) may be facilitated by physically connecting components, by wirelessly interacting components, and/or by both.

As further depicted in FIGS. 1-3, embodiments of a tactical torso tool carrier and communication device 10 may operate with a lethal firearm 700. The lethal firearm 700 may be holstered in a standard holster and may be operably positioned on a wearer's body in a location separate from the positioning of a tactical torso tool carrier and communication device 10 on a wearer's torso. In addition, the lethal firearm 700 may be holstered in a wireless smart holster 800*a* separate from but operable with a main unit (discussed further herein), as depicted in FIGS. 1 and 3. Moreover, the lethal firearm 100 may be holstered in a smart holster 800*b* included in a gun holster tool module 400 (discussed further herein) removably attached to a docking station, such as docking station 120*a*, of a main unit, such as main unit 100*b*, as depicted in FIG. 2. Furthermore, holsters 800 associated with a tactical torso tool carrier and communication device 10 may be configured to holster and operate with an electronically enhanced lethal firearm 700*a*, such as an advanced tactical pistol, as discussed further herein.

Figure 4:
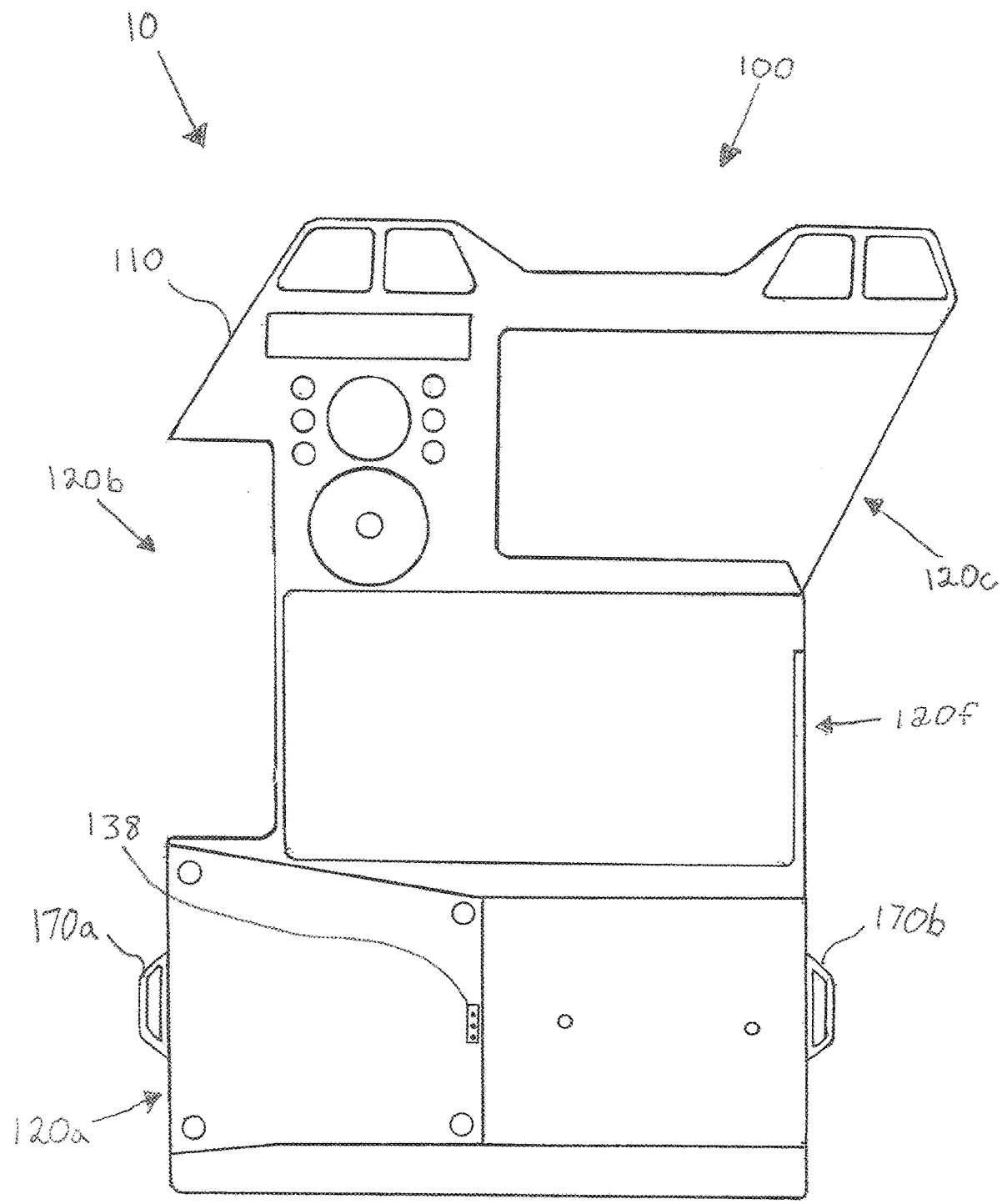
FIG. 4 is a front view of a main unit with no tool modules attached to any docking stations.

With further reference to the drawings, FIG. 4 depicts a front view of a main unit 100 with no tool modules attached to any docking stations, such as docking stations 120*a*, 120*b*, 120*c*, and 120*f*, wherein the docking stations may be integral with the housing 110 of the main unit. A docking station 120 may include physical features to help attach a corresponding tool module, and electrical features, such as charging contact 138, configured to electrically connect tool modules with electronic elements of a main unit 100. Docking stations may facilitate ready removability of tool modules, and/or may facilitate more permanent attachment of a tool module, such as display screen docking station 120f, which securely attaches a rotatable display screen tool module 900, shown in FIGS. 1-3. It is contemplated that the main units and associated modules and attachments may be fitted directly to a wearer, via harnesses, straps or other fasteners, and/or may be fitted to a shirt, suspender, ballistic vest, belt, and/or any other operable article of clothing of the wearer. Tactical torso tool carrier and communication device embodiments 10 may include fastener features 170, such as fastener features 170a-b shown in FIGS. 4 and 170c-d shown in FIG. 6, wherein the fastener features 170 may be configured to help facilitate the fastening of component elements onto the front torso of a wearer's body.

Various aspects of a main unit 100 associated with a tactical torso tool carrier and communication device 10 may utilize electrical power to operate some of the features of the main unit 100, such as operably connected tool modules and associated implements. For instance, as shown in FIG. 5A, a housing 110 of a main unit 100 may include a battery access door 137 provided for accessing a battery 130 located within the housing 110. The battery 130 may be in electrical communication with electrical contacts, such as a battery recharge port 136. Moreover, electrical contacts, such as an external plug in socket 133 for a heartrate monitor or such as a non-lethal multi-functional law enforcement weapon tool connection plug 134 located in a housing portion of docking station 120c, may facilitate electrical communication and charging of functional attachments and tool module components, such as powered elements of a non-lethal multi-functional law enforcement weapon tool module 300. Embodiments of a main unit housing 110 may include functional physical features, such as a bottom slide rail 114 located and configured so as to facilitate attachment of various modules and implements, and/or such as a knife holder sleeve 182 configured to securely stow a knife 60. Additionally, buttons, knobs and other like device activation and control features may be located on the housing 110 to facilitate operation of associated tools and implements of a tactical torso tool carrier and communication device 10. For instance an on/off power button 141 may be positioned on the housing and provide functional ability to power-on and power-off electrically powered features of a tactical torso tool carrier and communication device 10.

As depicted in FIG. 5B, a main unit 100 may include one or more infrared strobes 162 (or IR strobes), wherein the IR strobes may facilitate identification and/or tracking of a main unit 100. A blackout button 142 may be located on the housing 110 and provide functional ability to rapidly dim or turn-off all light generating features and/or noise generating features of a tactical torso tool carrier and communication device, which functionality may be critical when a wearer of the tactical torso tool carrier and communication device does not want to be seen or heard.

Figure 6:
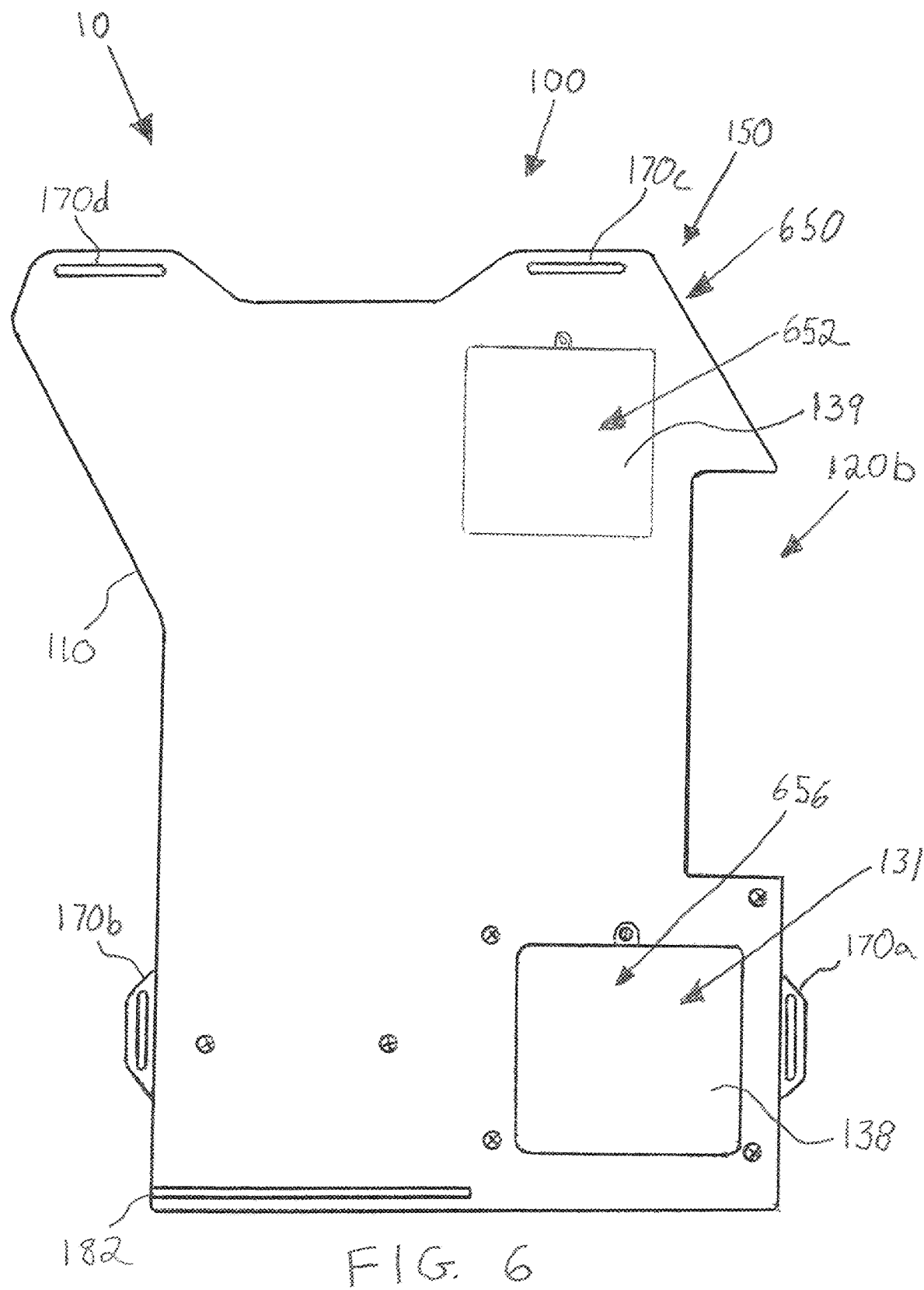
FIG. 6 is a back view of a main unit.

With continued reference to the drawings, FIG. 6 depicts a back view of a main unit 100 of a tactical torso tool carrier and communication device 10. A main unit may include a back-up battery 131 accessible via a removable back-up battery and data storage access plate 138. A battery operable with a main unit 100, such as battery 130 (see FIG. 5A) and/or battery 131, may be hard-wired into the main unit 100 and designed to remain securely fastened on and/or within the housing 110, or the battery may be removably connected to electronic elements of a main unit 100, such as a transmitter/receiver, a camera, a screen, a processor, and other like components of a tactical torso tool carrier and communication device 10. Recharging of a main unit battery may occur when an external battery plug in wire is connected to battery recharge port, such as battery recharge port 136 (depicted in FIG. 5A). Electrical charging power may emanate from a typical wall-mounted electrical receptacle and/or from a power source available in a vehicle, such as a squad car or a patrol motorcycle. Wireless recharging of a main unit battery may also be operable with variously configured batteries of various main unit embodiments. The battery recharge port 136 may have the ability to charge all the batteries operably associated with a main unit 100 simultaneously, which may be advantageous because an officer may keep all modules of the tactical torso tool carrier and communication device 10 as fully charged as possible. Still further, the various batteries operably associated with a main unit 100 may comprise a "smart" charging system, wherein associated battery power sensors accompanying each battery may determine the amount of charge remaining of each battery. As such, the "smart" battery charging system may determine that one battery is drained more than the others. Should such charge disparity to be determined, power (or remaining charge) may be diverted from a more fully charged battery, to the battery that has a lesser charge, thus optimizing, in a sense, the power storage and usage capability of embodiments of a tactical torso tool carrier and communication device 10.

A main unit, such as main unit 100 and core tool modules and attachments thereto, may comprise and function, in many ways, as a brain of a tactical torso tool carrier and communication device 10, because a main unit may operate with one or more computing components configured to process data and governing protocol pertaining to the operation of interconnected (physically and/or electromagnetically) features of a tactical torso tool carrier and communication device 10. Embodiments of a tactical torso tool carrier and communication device 10 may include a mobile computing device 650 having a processor, such as a mobile computing processor 652, in communication with a transmitter/receiver, such as transmitter/receiver 150, a video camera, such as body-cam video camera 160, and a screen, such as screen 90 of screen tool module 900 (see FIGS. 7-9). A mobile computing device 650 may be used to perform and/or implement operational features of the various embodiments disclosed herein. The mobile computing device 650 may also be an onboard computer of a main unit 100 embodiment, a tool module, a smart phone computer, and/or a computing component of a tactical torso tool carrier and communication device 10, including any processing feature of a main unit 100. The specific mobile computing device 650 may operate with various forms of mobile devices. The components shown here, their connections, couples, and relationships, and their functions, are meant to be exemplary only, and are not meant to limit the embodiments described and/or claimed, according to one embodiment. The mobile compatible processor 652 may execute instructions in the specific mobile computing device 650, including instructions stored in mobile compatible memory. The mobile compatible processor 652 may be implemented as a chipset of chips that include separate and multiple analog and digital processors including, inter alia, a transmitter/receiver 150, wherein the chipset may reside on a printed circuit board (PCB). The chipset may be accessed by opening a PCB cover 139 on the back of a main unit 100, as depicted in FIG. 6. The mobile compatible processor 652 may provide, for example, for coordination of the other components of the specific mobile computing device 650, such as control of user interfaces, applications run by the specific mobile computing device 650, and wireless communication by the specific mobile computing device 650. A main unit 100 may include a cellular phone or incorporate a standard smart-phone attached as part of a tool module to a docking station, wherein the inclusion of a cellular phone embodiment, or an operably connected standard smart phone, may enable a tactical torso tool carrier and communication device 10 to transmit and receive digital communications and data through a cellular network, such as a 3G, a 4G, or a 5G network, etc. In this regard, a main unit 100, with its included processor, memory, cellular transmitters, and battery, etc., may benefit from the capability of a mobile smart phone or a mobile (cellular-network-connected) tablet device. Accordingly, a main unit 100, may run software applications (Apps), access the internet, access cloud-based databases, access a department-operated network server, or otherwise operate in a manner described herein. One such application may involve a GPS teammate locator, wherein an onboard computer may facilitate data and signal processing that may facilitate communication and processing of GPS location data. The interactive screen and computing and communication features of a tactical torso tool carrier and communication device 10 provide mobile freedom to law enforcement personnel who are commonly tethered to office desktop or patrol car laptop computers for critical information flow.

As further shown in FIG. 6, a main unit 100 of a tactical torso tool carrier and communication device 10 may comprise data storage, such as a data storage device 656, wherein such data storage may be removably accessible via a removable back-up battery and data storage access plate 138. Data storage may remain within, but conveniently extractable and/or transmittable from features of the tactical torso tool carrier and communication device 10. The data storage may pertain to things such as video and/or audio recordings from any camera and/or audio recording implement; for storing operating system software; for storing application software; for storing governing protocol pertaining to the operation of a transmitter/receiver; for storing operating software pertaining to a drone; for storing weapon withdrawal timer software or officer training information; for storing digital maps; for storing data associated with a database; for storing governing protocol pertaining to a "smart" battery charging system; for storing operating software pertaining to cellular and/or smart phone functionality; for storing vital information pertaining to the health and physical ability of a user/wearer of features of a tactical torso tool carrier and communication device 10; and/or for storing any other data or protocol information operably associated with the use and functionality of component elements of a tactical torso tool carrier and communication device 10.

Figure 7:
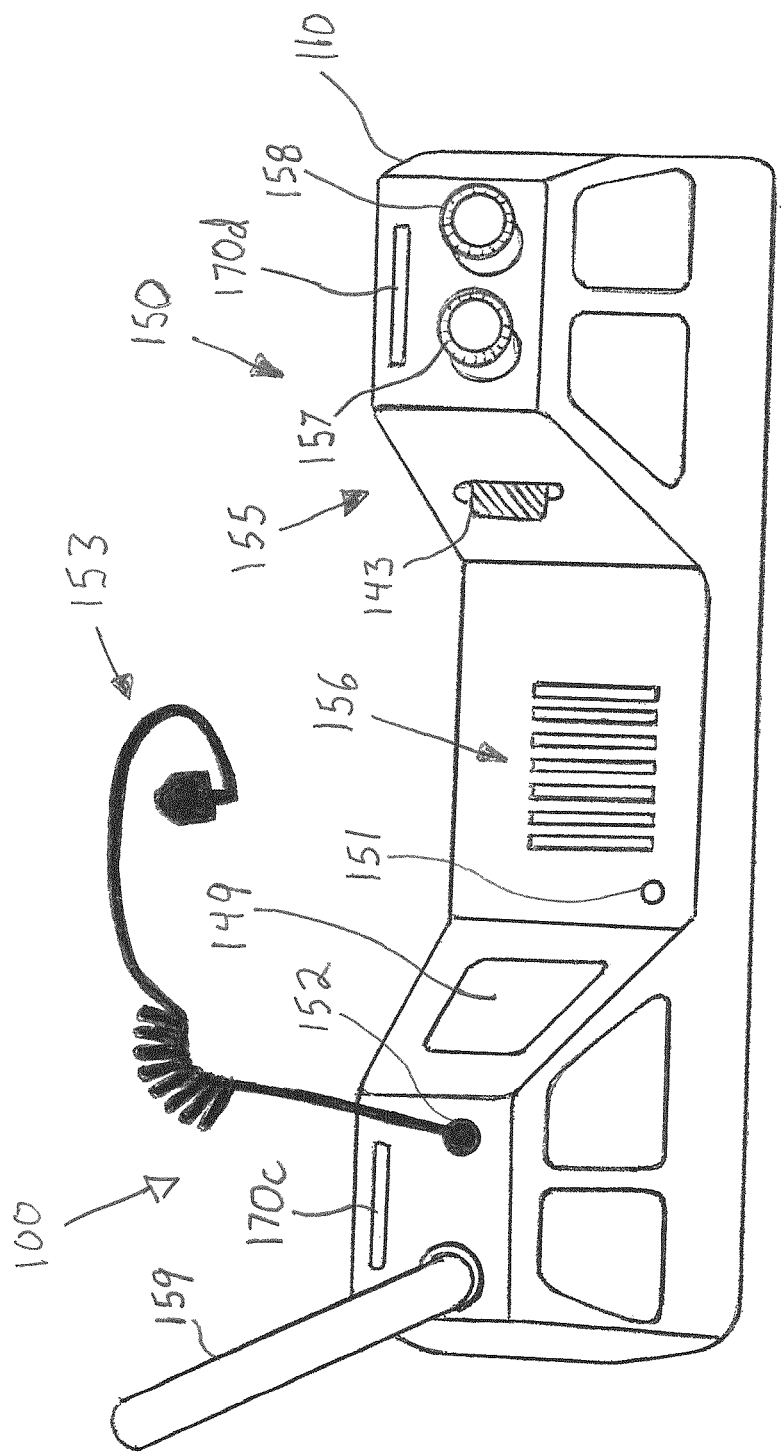
FIG. 7 is a top view of a main unit with attached volume and channel knobs and an antenna, and with an ear-piece speaker operably connected to a port of the main unit via a flexible cable and plug.

Aspects of communicatory functionality of a tactical torso tool carrier and communication device 10 may be associated with a transmitter/receiver 150 of main unit 100, wherein the transmitter/receiver 150 may be fully or partially housed within the housing 110, as shown, inter alia, in FIG. 7. A main unit 100 may include a several different transmitter/receivers, of which some may be wireless transmitter/receivers. A transmitter/receiver, such as a transmitter receiver 150, may facilitate communications of audio/visual signal data between tactical torso tool carrier and communication devices 10 and/or between a command center, and/or between an autonomous drone, and/or other communicatively connected devices. An embodiment of a wireless transmitter/receiver 150 may be associated with a two-way radio 155 of a main unit 100. The two-way radio 155 may be configured so as to be hands-free or require minimal hand-effectuated operation. Certain buttons, knobs, and/or graphically interactive screens may help facilitate operability of the two-way radio 155. For example, a main unit may include a volume knob and a channel knob to control the volume and radio channel functionality of the two-way radio 155. Knob functionality may include tactile clicking, wherein, as a knob is turned, a click or ratchet effect may be tactilely observed by a user turning the knob. Knobs operable with a main unit 100 may also comprise press-click functionality, whereby the knobs may be compressed along their axis to trigger a switch that may control functional features. A microphone 15, having at least a portion thereof is located on the housing 110, may be operable with a speaker 156 may facilitate voice activated controls that may additionally help facilitate effective radio functionality pertinent to embodiments of a tactical torso tool carrier and communication device 10. A microphone activation button 143 may also initiate microphone 151 operation. The speaker 156 may an ability to broadcast amplified sound, much like a megaphone. Signal transmission may be broadcast and received, inter alia, through functional application of an antenna 150. Furthermore, an audio jack 152, operable with a tethered ear-piece 153, may operate with the two-way radio 155.

Referring still further to FIG. 7, embodiments of tactical torso tool carrier and communication device 10 may include an emergency button 149 located for ready and near-instant accessibility. The emergency button 149, when activated, may provide an automatic alert to a command center and/or to other officers. When an emergency button 149 is activated, the GPS position of the officer wearing applicable features of a tactical torso tool carrier and communication device 10 may be transmitted to a command center and/or other officers, thereby informing the command center and the others of the activating officer's real-time location. Moreover, the emergency button 149 may turn on one or more cameras (and corresponding microphones) so a live video/(audio) feed of the officer's situation may be broadcast to a command center and/or other officers. Still further, activation of the emergency button 149 may turn on the IR strobe 162 (depicted in FIG. 5B), and/or may trigger a loud alert noise promulgated from the speaker 156 and/or may trigger a siren from a nearby patrol vehicle in communication with features of the officer's tactical torso tool carrier and communication device 10.

Figure 8:
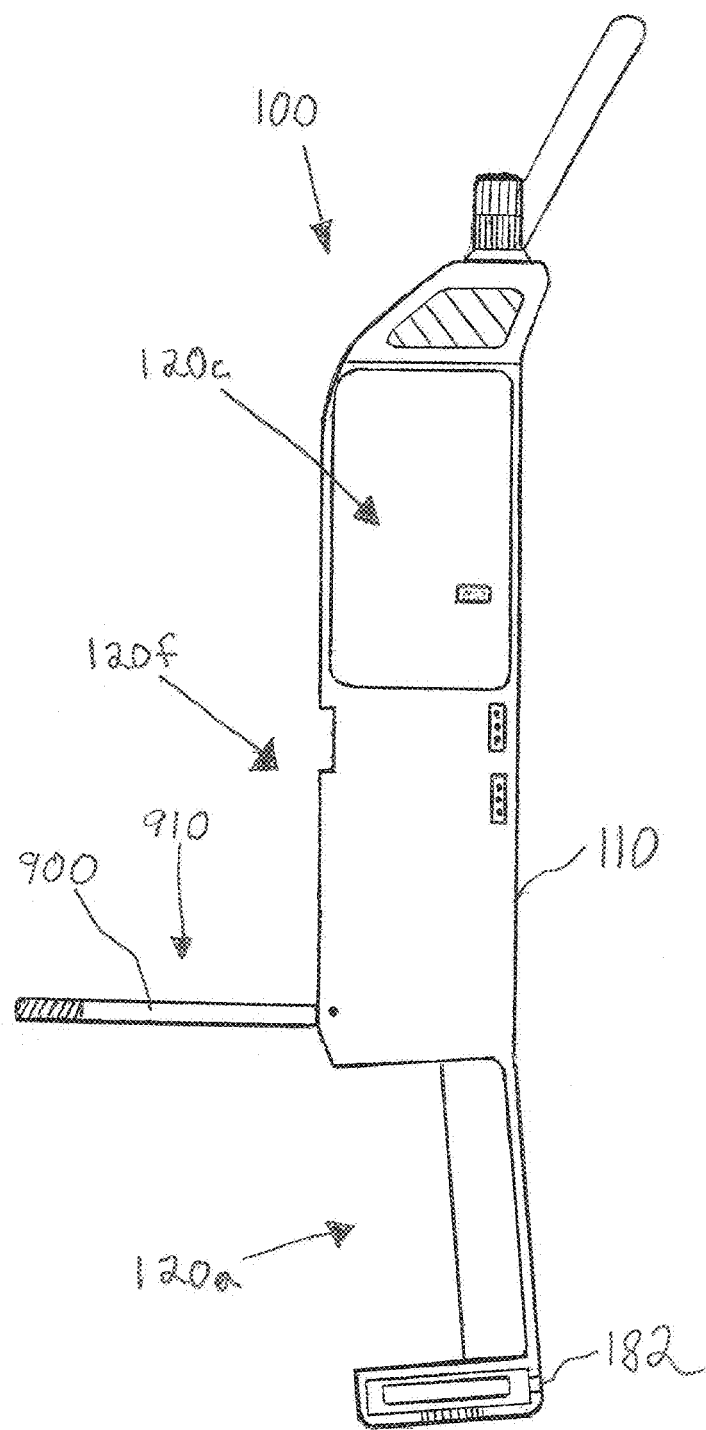
FIG. 8 is a right side view of a main unit with a screen rotatably attached to the main unit and in a folded down position.

With reference to FIG. 8, a main unit may include a screen 910, such as the screen 910 of screen tool module 900. The screen tool module 900 may be rotatably attached to a docking station 120f of main unit 100, and, as depicted, the screen tool module is in a folded down position, wherein the screen 910 is visible to a wearer of the main unit 100. Screen tool module 900 embodiments may also be slidably attached to a main unit 100 or removably clipped onto a main unit 100. The screen 910 may be a touchscreen display. Additionally, screen tool module 900 may facilitate functionality similar to a cellular phone or smart phone, such as texting, emailing, internet access and browsing, video conferencing, and other like functionality. A screen tool module 900 may include a computing unit with a processor and/or may be in functional communication with one or more other computing units and processors of a main unit 100. Similarly, a display screen tool module may include a transmitter/receiver and/or may be in functional communication with one or more transmitters/receivers of a main unit 100. Moreover, a display screen tool module 900 may comprise and operate with a light sensor that may automatically dim the screen 910 in low light conditions. Moreover, the screen tool module 900 may comprise and operate with a self-facing camera, so that an officer can engage in video conferencing.

Figure 9:
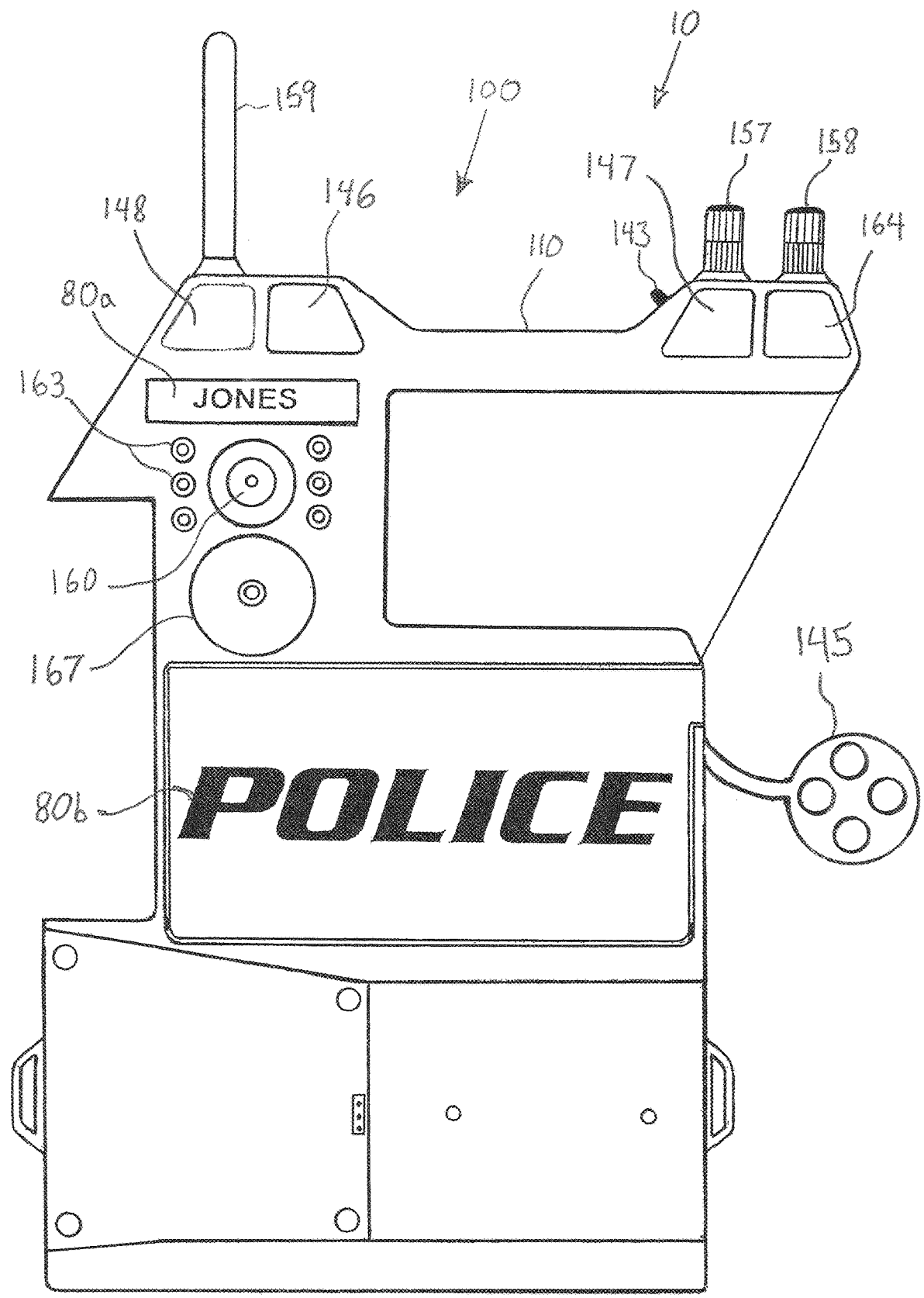
FIG. 9 is a front view of a main unit with a screen rotatably attached to the main unit and in a folded up position, and an operably connected heart rate monitor.
Figure 10:
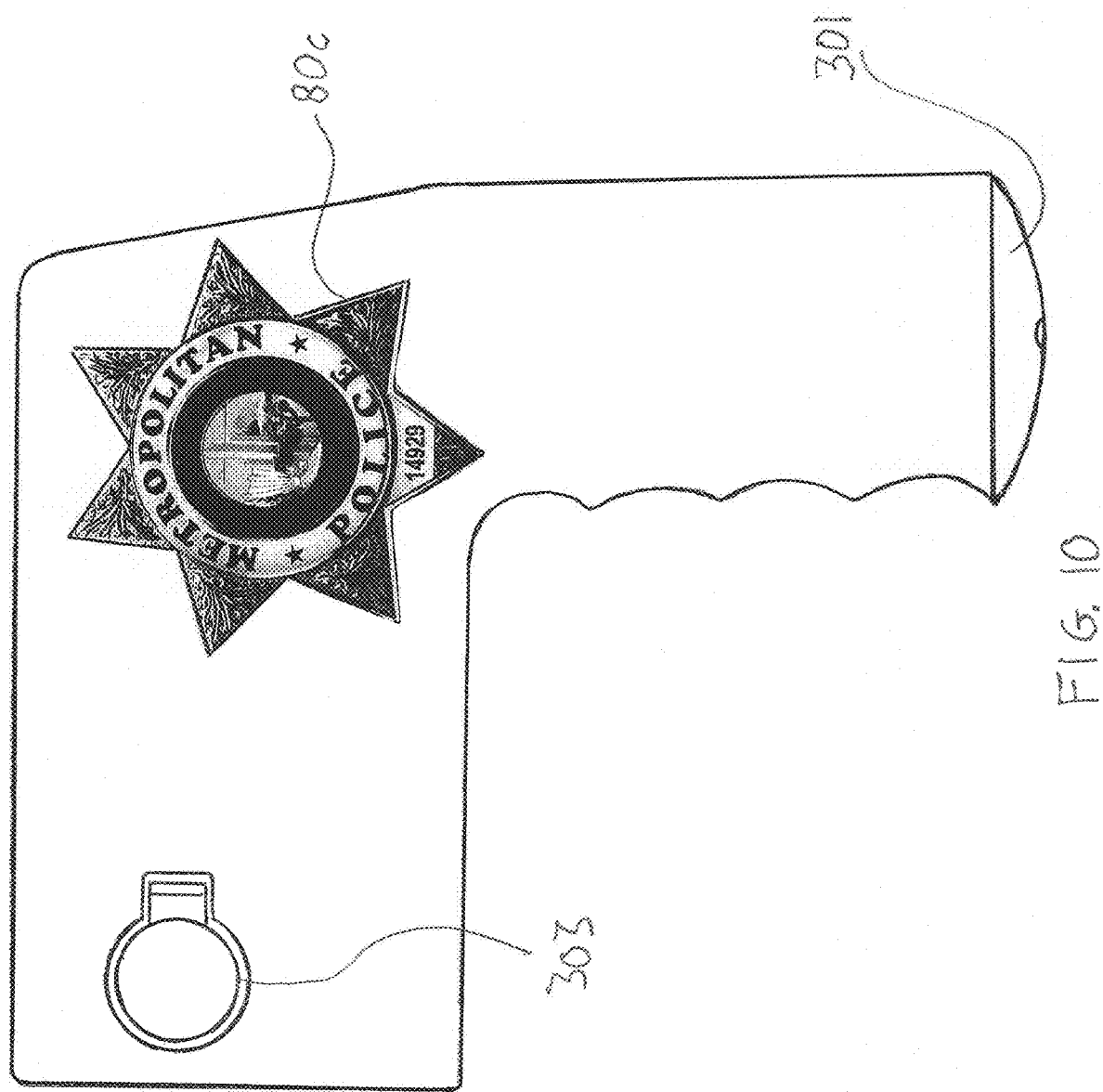
FIG. 10 is a left side view of a non-lethal multi-functional law enforcement weapon tool.

In particular implementations, features of a tactical torso tool carrier and communication device 10 may include insignia 80, such as name badges 80*a*, and identification notices 80*b*, such as the word "POLICE" or the word "SECURITY", as depicted in FIG. 9, as well as official identification markers, such as a police badge 80*c* (see the police badge on the non-lethal multi-functional law enforcement weapon tool depicted in FIG. 10). A useful component feature of embodiments of a main unit, may be a video camera 160. All, or at least a portion of the video camera 160, or body-cam, may be housed within the housing 110 of a main unit 100. The body-cam video camera 160 may comprise one lens or a plurality of lenses and may be capable of capturing high-definition video and still frame images. The one or more lenses, in potential association with image processing hardware and software, may facilitate zooming, night vision, infra-red (IR) thermal vision, and other like visual image capture capabilities. The body-cam video camera 160 may be operable with several infrared (IR) lights 163 (see the six IR lights on the main unit 100 depicted in FIG. 9). Captured and recorded images from the video camera 160 (such as zoomed images, visual images, night vision images, IR thermal images, etc.) may be transmitted to various displays of a tactical torso tool carrier and communication device 10, and/or may be transmitted to other officers, to a command center, and/or to display devices in patrol vehicles, etc. Recorded images may be stored as digital data transmissible from the tactical torso tool carrier and communication device 10. Various embodiments of the video camera 160 may also have, or otherwise operate with, a microphone, such as microphone 151, to capture and record audio contemporaneously with the high-definition image recording facilitated by the body-cam video camera 160. The video camera 160 may be activated, inter alia, by a body-cam activation button 164 on the main unit 100. The video camera 160 may also activate when a microphone detects the sound of a gunshot, when an emergency button is pushed, when a drone is activated (see FIG. 26), when a weapon, such as a lethal firearm or a non-lethal multi-functional law enforcement weapon tool (see FIG. 15), is drawn from a holster or docking station, when a command center activates the body-cam video camera 160, when another officer activates the video camera 160, and/or any other official "activation" of the body-cam video camera 160. The ability to buffer may enable officers to retain video (and audio) of everything that occurred for a designated period of time prior to the moment the body-camera 300 was officially activated. Video camera 160 video may be streamed. Moreover, data storage of video camera 160 recordings may be associated with data storage device 606 (shown in FIG. 6), and/or may involve transmission of data to a data repository separate from the tactical torso tool carrier and communication device 10.

A further component element of a main unit 100, may be a body light 167, as additionally depicted in FIG. 9. A body light 167 may include one or more light emitting diodes (LEDs) housed in one or more lenses to emit one or more light streams having one or more fields of emission and may do so with varying degrees of power and intensity. For example, the body light 50 may emit a tight and focused light stream having intense luminal concentration, may a emit a broadly distributed light ban to illuminate a bright and/or wide field of view, may project a less powerful emission helpful for reading or viewing objects nearby, and/or may project combinations of narrow or wide light emissions and/or the like. Moreover, a body light 167 may operate with pulsing, strobing, or flashing functionality. The body light 167 allows an officer to illuminate the field of view in front of them, while having their hands free. Particular embodiments of a body light 167 may have autonomous operation, wherein the body light 167, may be configured to automatically activate and come on when certain actions are taken by an officer, such as when an officer draws either their lethal firearm or their non-lethal multi-functional law enforcement weapon tool, or may come on with the simple touch of a button, such as a body light button 147 located prominently on the main unit 100, or by simply compressing the lens of the light itself, wherein the lens movement may activate an on/off switch.

Main unit 100 embodiments may operate with a heartrate monitor 145, wherein the heart rate monitor 145 may be plugged into an external plug in socket 133 (see FIG. 5A) and thereby electrically, physically and functionally attached to the main unit 100. In addition, a voice activation button 146 may be located on a main unit 100, wherein actuation of the voice activation button 146 initializes applications, text as texting, emailing, phone dialing contacts, GPS spot locating, and other like applications, functionally effectuated by voice commands. Moreover, a drone activation button 148 may be located on a main unit 100, wherein actuation of the drone activation button 146 activates at least one drone, wherein the drone may be in communication with a tactical torso tool carrier and communication device 10 and may operate with a plurality of drones in an associated drone network (as discussed further herein).

Figure 19:
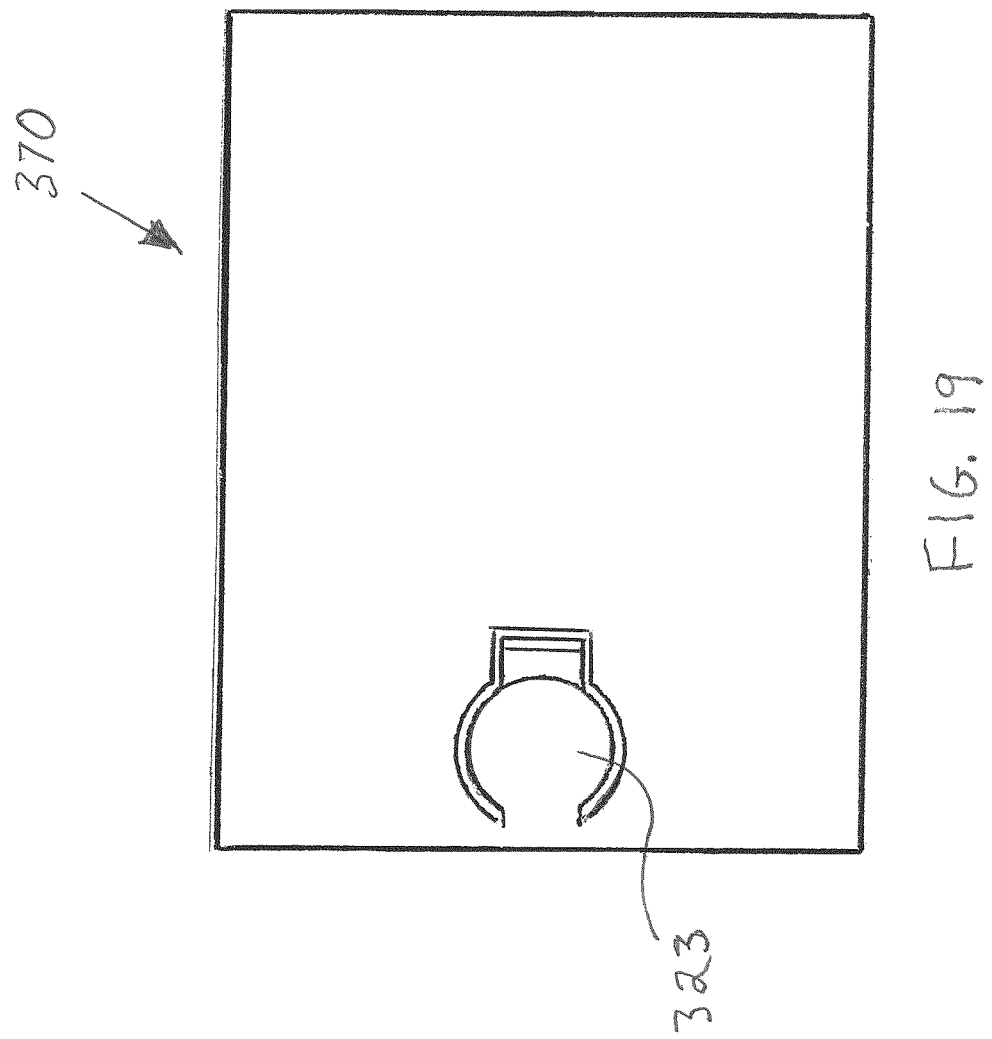
FIG. 19 is a right side view of an electronic control device cartridge.

In some implementations, a main unit 100, may include a docking station 120*c* configured as a housing compartment to securely removably stow and charge a non-lethal multi-functional law enforcement weapon tool 300 having electrical shock and capability to function as an electronic control device (ECD), and wherein the non-lethal multi-functional law enforcement tool 300 may include a glass breaker 301 comprising a solid, hard and blunt-ended component that can be forcefully rammed against glass to break the glass, as depicted in FIG. 10. The non-lethal multi-functional law enforcement weapon tool 300 may include cartridge mating features 303 configured to physically engage complimentary cartridge removal tabs 323 (see FIG. 19) of an electronic control device (ECD) cartridge 370 to securely attach the ECD cartridge 370 to the docking station 120*c* of main unit 100.

Figure 11:
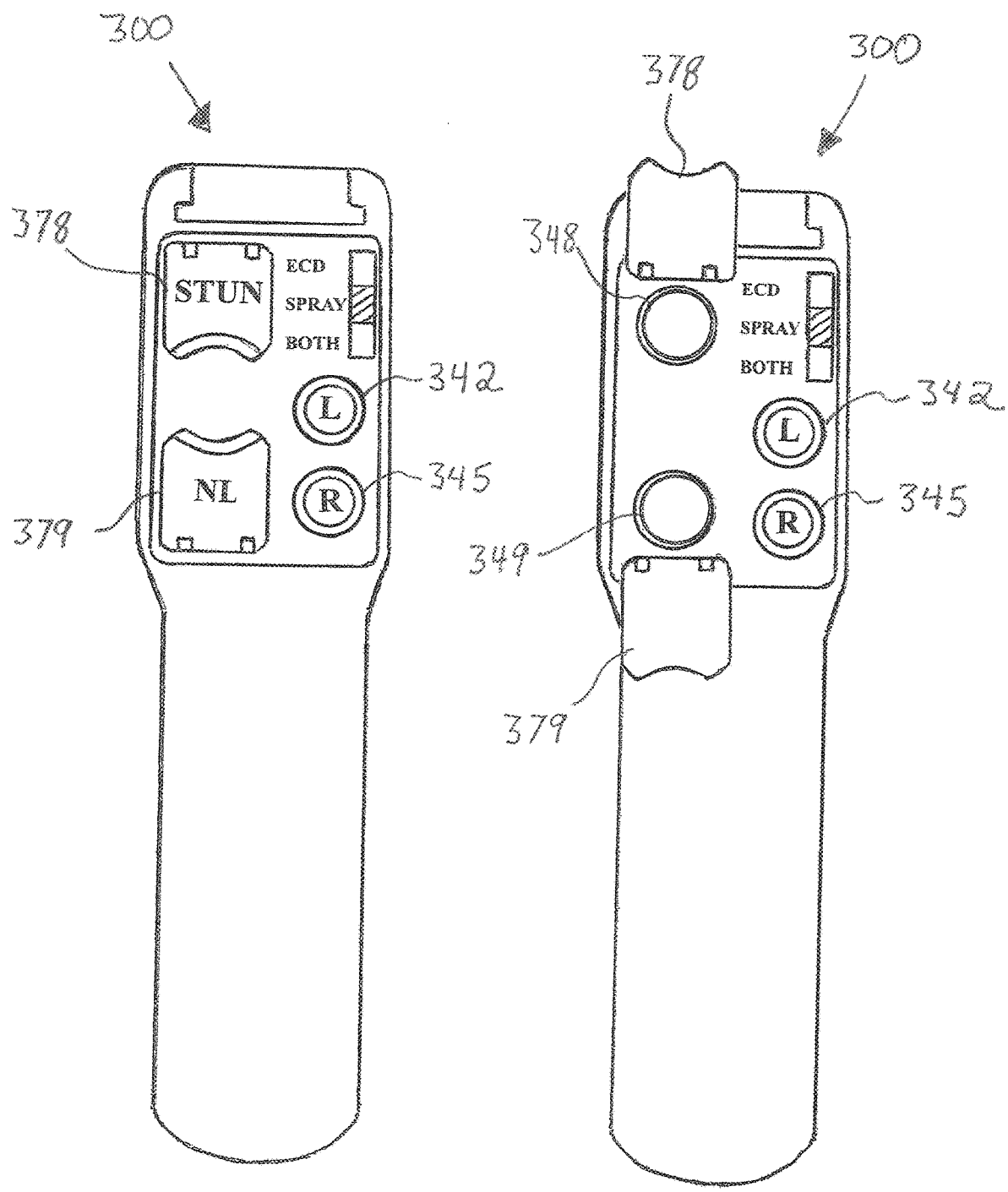
FIG. 11A is a back view of a non-lethal multi-functional law enforcement weapon tool with safety features covering stun function and non-lethal shock probe projection activation buttons.
FIG. 11B is a back view of a non-lethal multi-functional law enforcement weapon tool with safety features not covering stun function and non-lethal shock probe projection activation buttons.

As seen, inter alia, with regard to FIGS. 11A and 11B, embodiments of a non-lethal multi-functional law enforcement weapon tool 300 may have buttons, levers, knobs, controllers or other like implements that may be utilized to actuate the functional components of the non-lethal multi-functional law enforcement weapon tool 300. A non-lethal multi-functional law enforcement weapon tool 300 may include a flashlight 362, and a corresponding button 342 potentially marked "L" may actuate the light. A non-lethal multi-functional law enforcement weapon tool 300 may include a laser-sighting implement 339 (shown in FIG. 12), which may help an officer pinpoint a more exact location they are aiming toward when using the non-lethal multi-functional law enforcement weapon tool. A button 345 (potentially marked "R") may actuate a wireless transmitter 332 to send a signal to a receiver 150 of a main unit 100 and actuate a two-way radio 155 of the main unit 100. Incorporating an officer's light and two-way radio into the non-lethal multifunctional law enforcement tool 300 allows an officer the ability to keep his gun hand free. Furthermore, buttons 348 and 349, for respectively actuating electrical stun functionality and for actuating projection of charged non-lethal shock probes, may be shielded from unintentional use by respective safety covers 378 and 379 (which may be respectively marked "STUN" and "NL").

Figure 13:
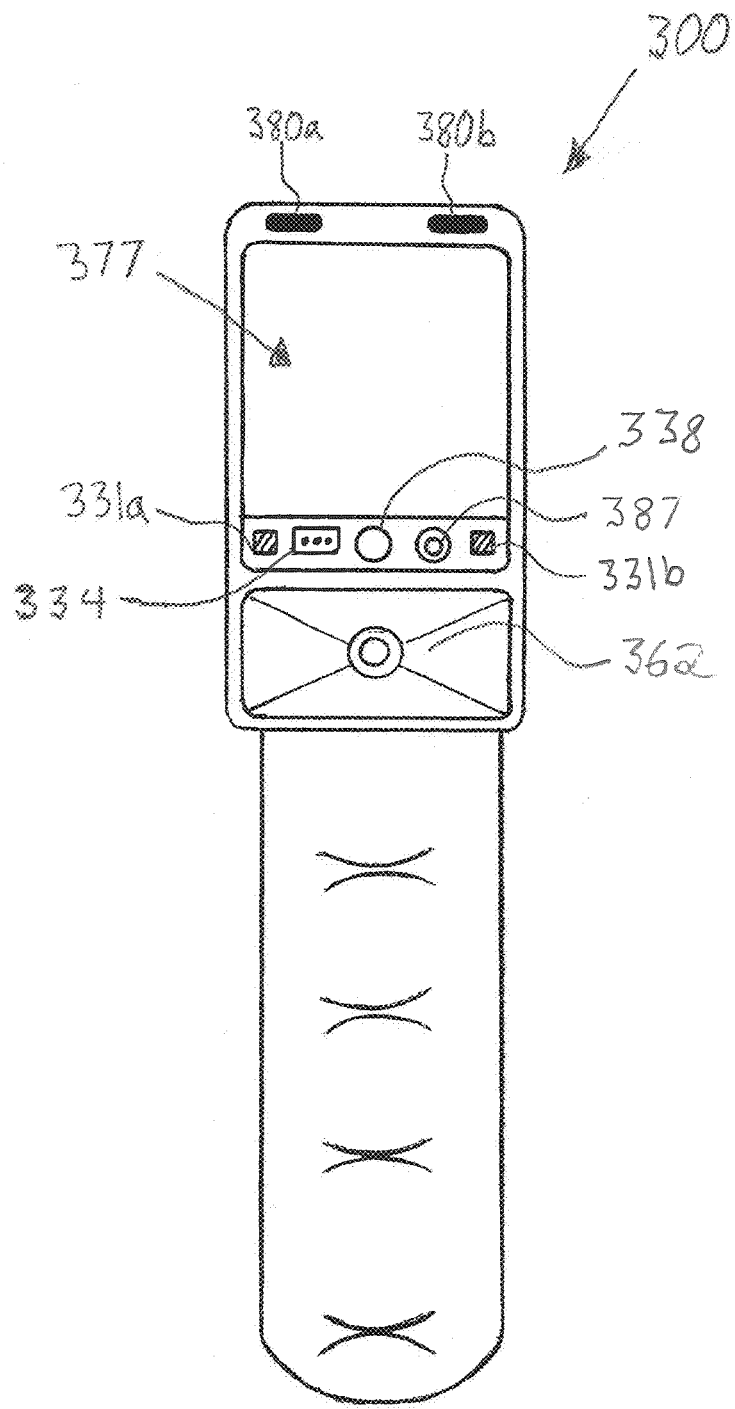
FIG. 13 is a front view of a non-lethal multi-functional law enforcement weapon tool with the electronic control device cartridge removed.
Figure 14:
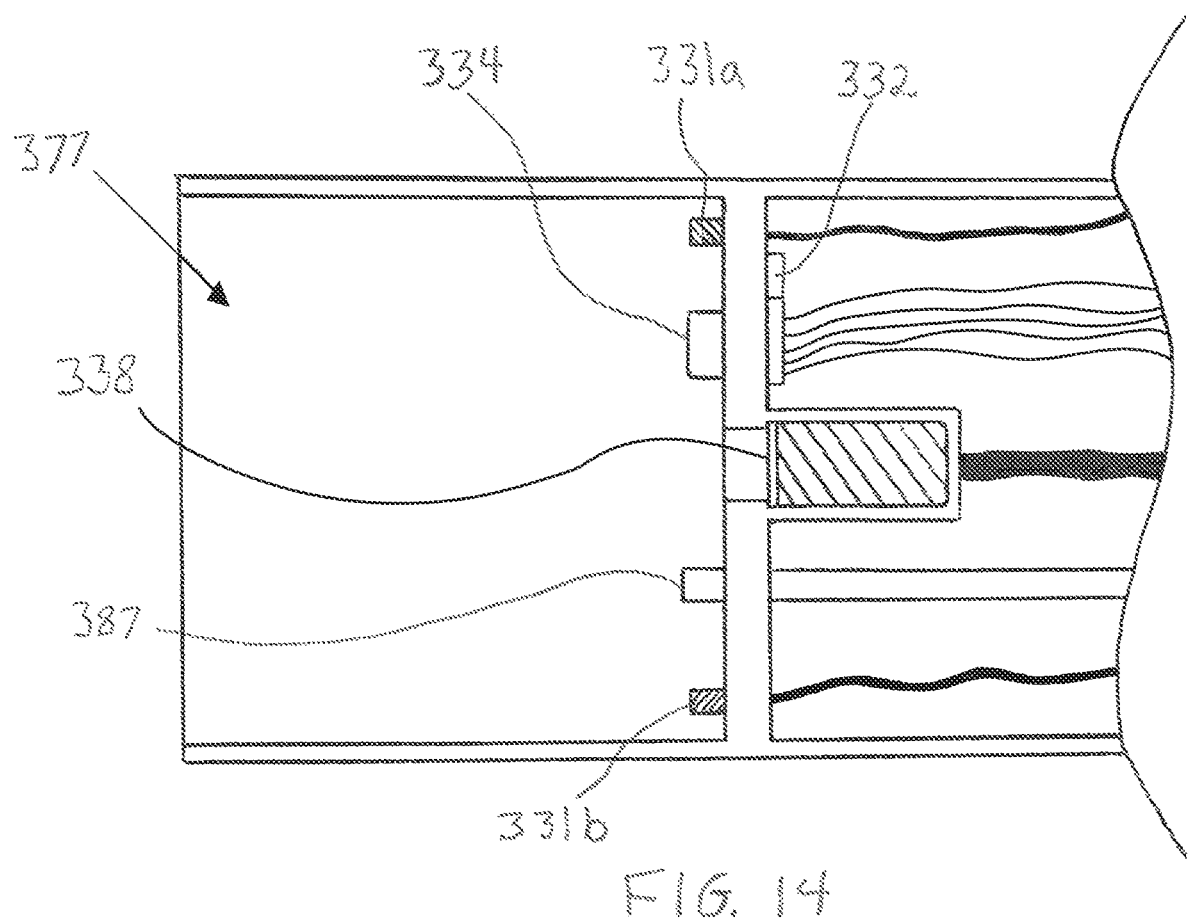
FIG. 14 is a right side cut-away view of a portion of a non-lethal multi-functional law enforcement weapon tool including cartridge function connectors.
Figure 17:
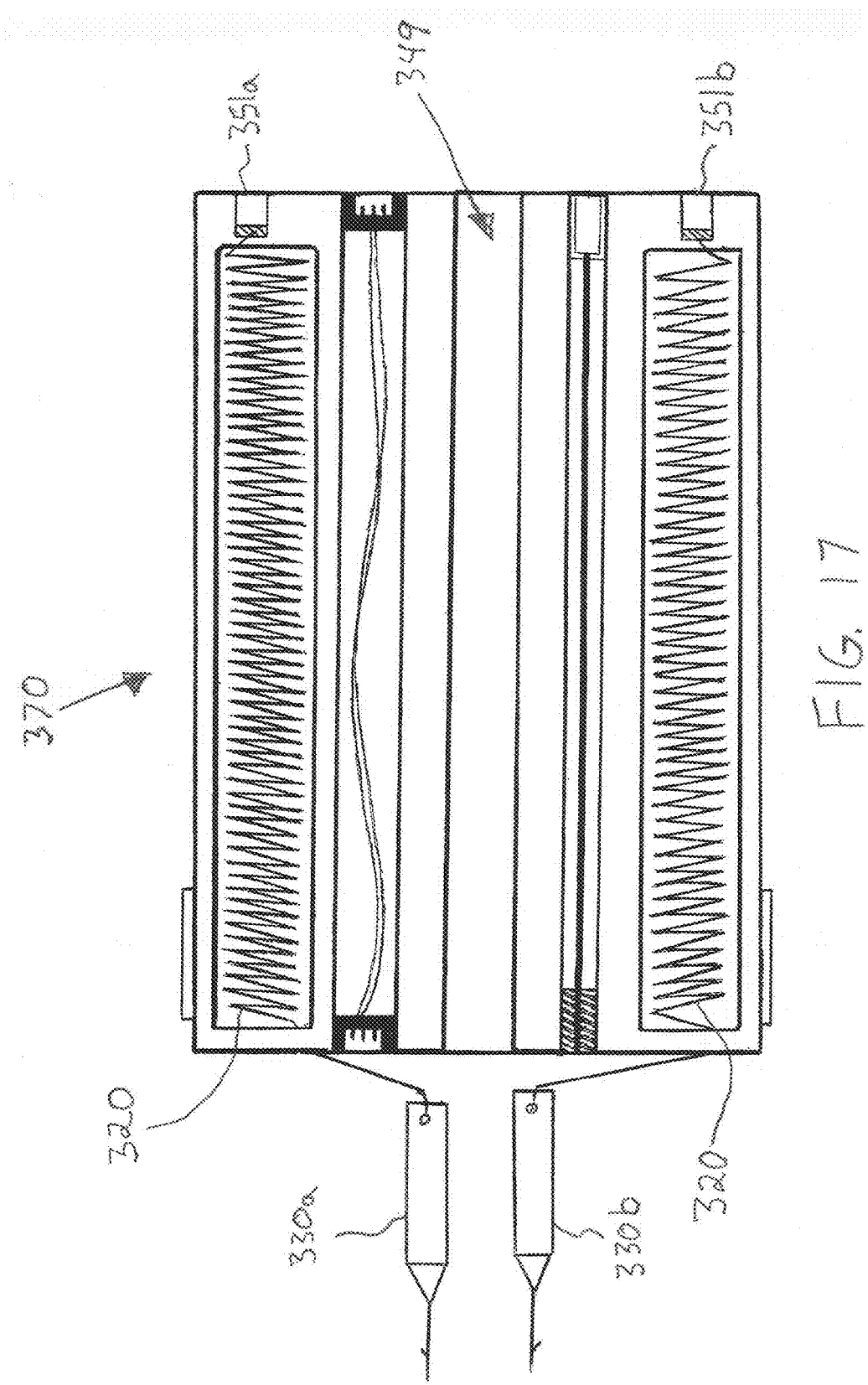
FIG. 17 is a top cut-away view of an electronic control device cartridge with non-lethal shock probes outside the cartridge and connected via conductive wires.
Figure 18:
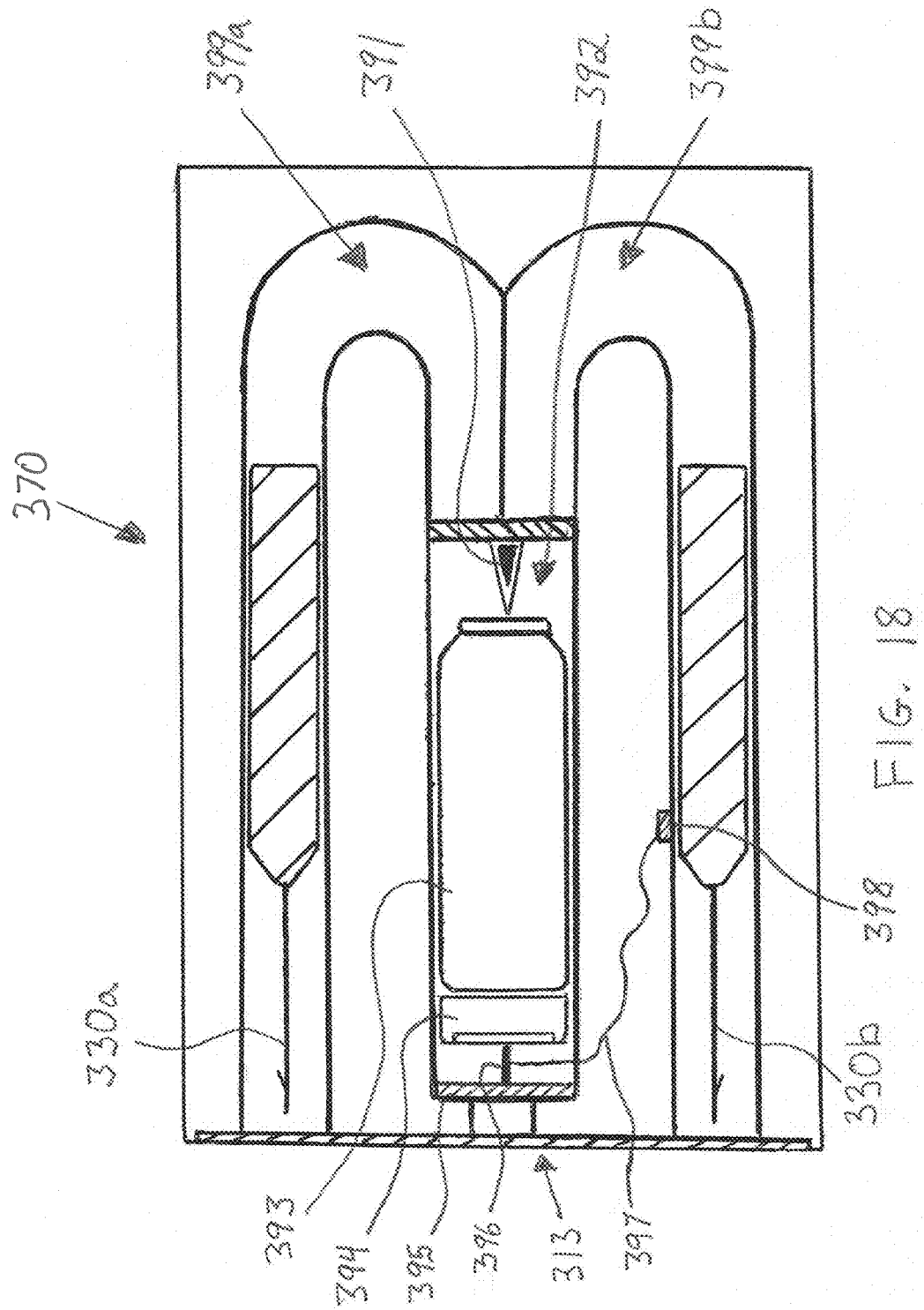
FIG. 18 is a right side cut-away view of an electronic control device cartridge including a pressurized gas canister.

A non-lethal multi-functional law enforcement weapon tool 300 may incorporate a rechargeable battery (not shown). In addition, a non-lethal multi-functional law enforcement weapon tool 300 may include an electronic control device, or "ECD," cartridge 370 (depicted in FIGS. 12, 15A-B, and 16-19) potentially containing, inter alia, compressed gas, such as nitrogen, to help deploy and project darts 330 (or probes) of the ECD cartridge 370, when attached to a non-lethal multi-functional law enforcement weapon tool 300 and actuated thereby. The darts (or probes) 330 may be connected to the ECD cartridge 370 by conductive wires 320 (See FIG. 17). Electrical contacts 331a and 331b (see FIGS. 13-14) of the non-lethal multi-functional law enforcement weapon tool 300 may electrically connect with electrical contacts 351a and 351b (see FIGS. 16-17) to supply electric charge to the dart probes 330a-b (see FIGS. 15B and 17-18) and stun feature probes 380a and 380b (see FIGS. 12-13). Additionally, the darts (or probes) 330 may be deployed while the flashlight 362 and the laser-sighting implement 339 are on and illuminating/targeting a dangerous perpetrator toward which the darts (or probes) 330 are projected.

An ECD cartridge 370 may be configured to be removably secured into a housing 377 (see FIGS. 13-14) located in the discharge end of a non-lethal multi-functional law enforcement weapon tool 300. The removable securing of an ECD cartridge 79 may be facilitated by ECD cartridge release tabs 323 (see FIG. 19), wherein the tabs 323 may structurally and functionally operate with complimentary cartridge mating features 303 (see FIG. 10) of a non-lethal multi-functional law enforcement weapon tool 300 to securely/removably retain the ECD cartridge 370. The ECD cartridge 370 may include blast shield doors 317 (see FIGS. 12 and 15A) positioned to conceal and cover projectable darts (or prongs) 330 and associated wires 320 when not in use. An air escape nozzle 313 (see FIG. 15B) may be located on a surface concealed by the doors 317 and may be configured to eject pressurized gas in a manner that rapidly blows the blast shield doors 317 open, when activation control aspects, such as of the non-lethal multi-functional law enforcement weapon tool 300, are activated.

Figure 12:
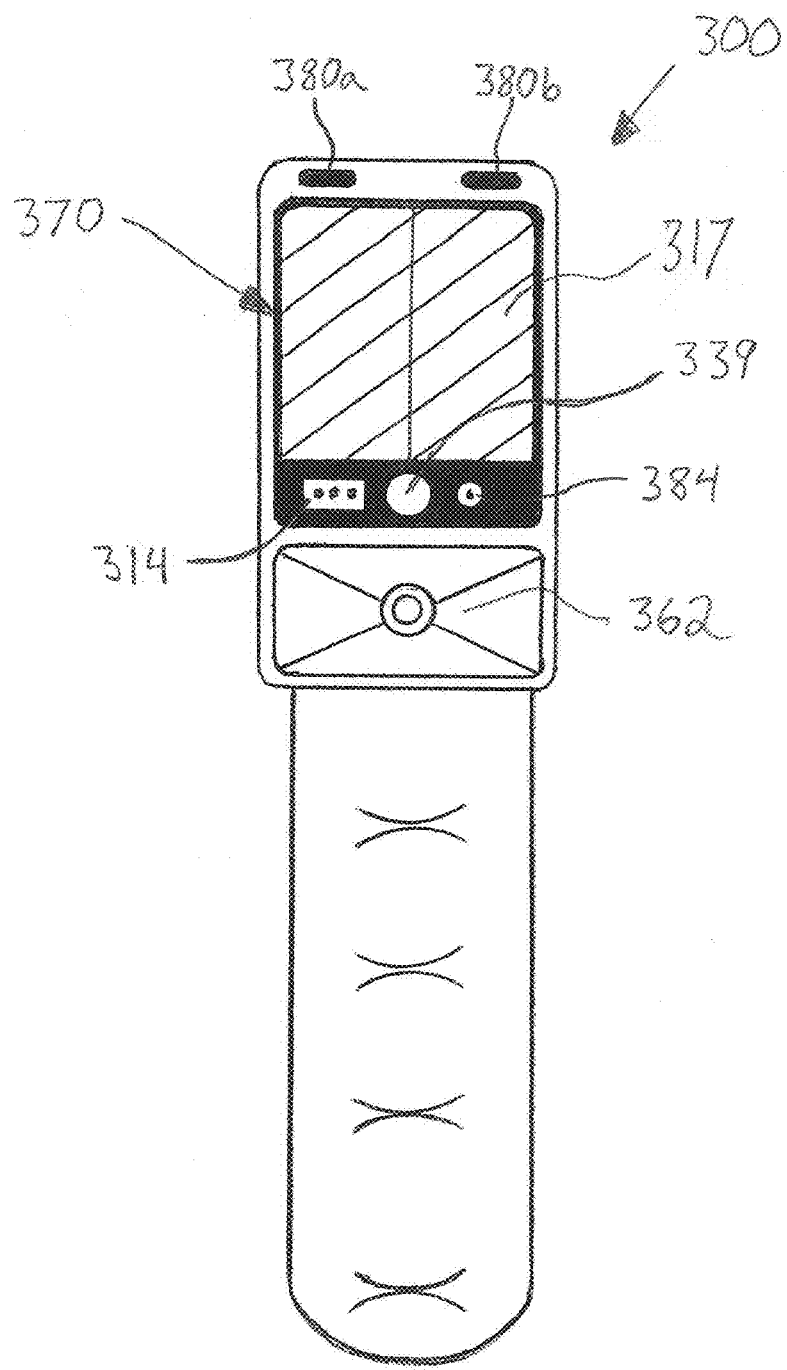
FIG. 12 is a front view of a non-lethal multi-functional law enforcement weapon tool with an operably inserted removable electronic control device cartridge.
Figure 15B:
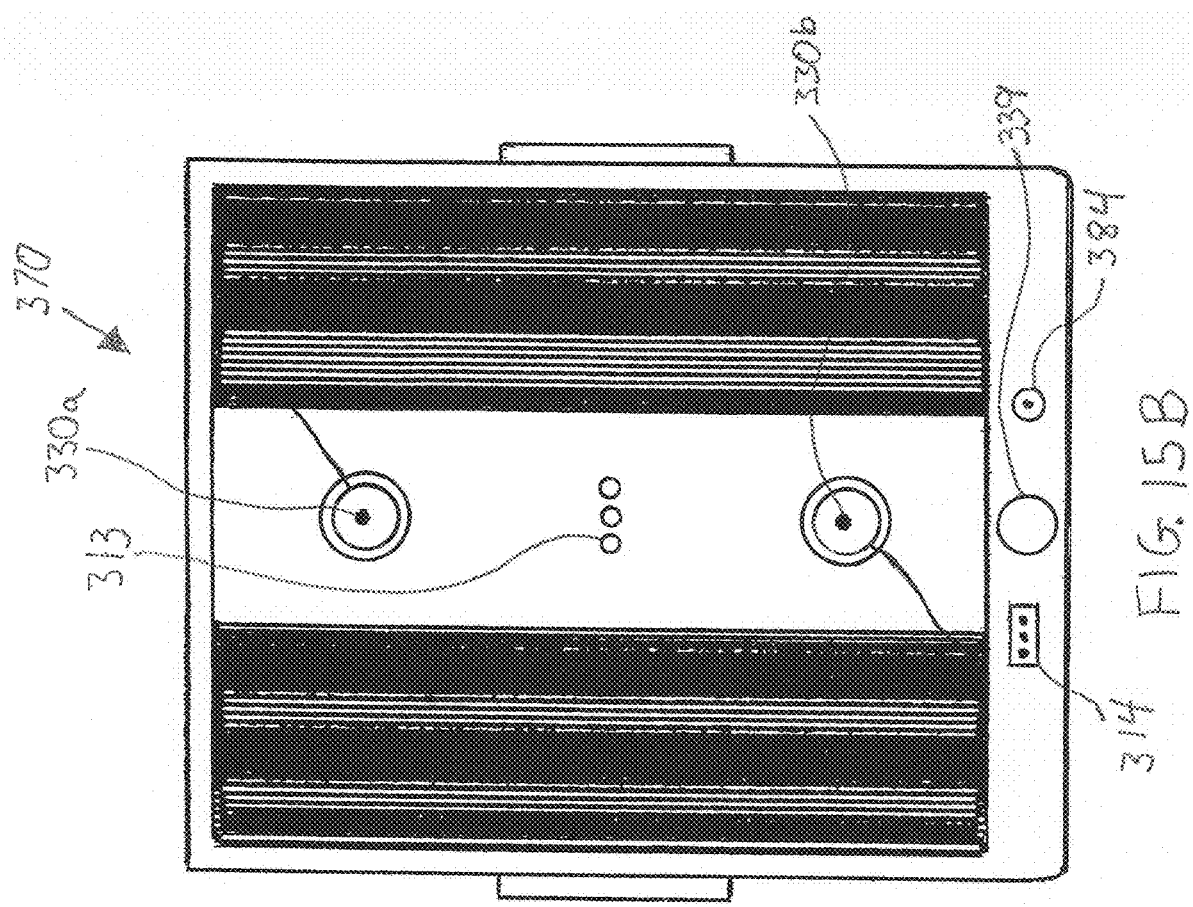
FIG. 15B is a front view of a removable electronic control device cartridge without blast doors attached.
Figure 15A:
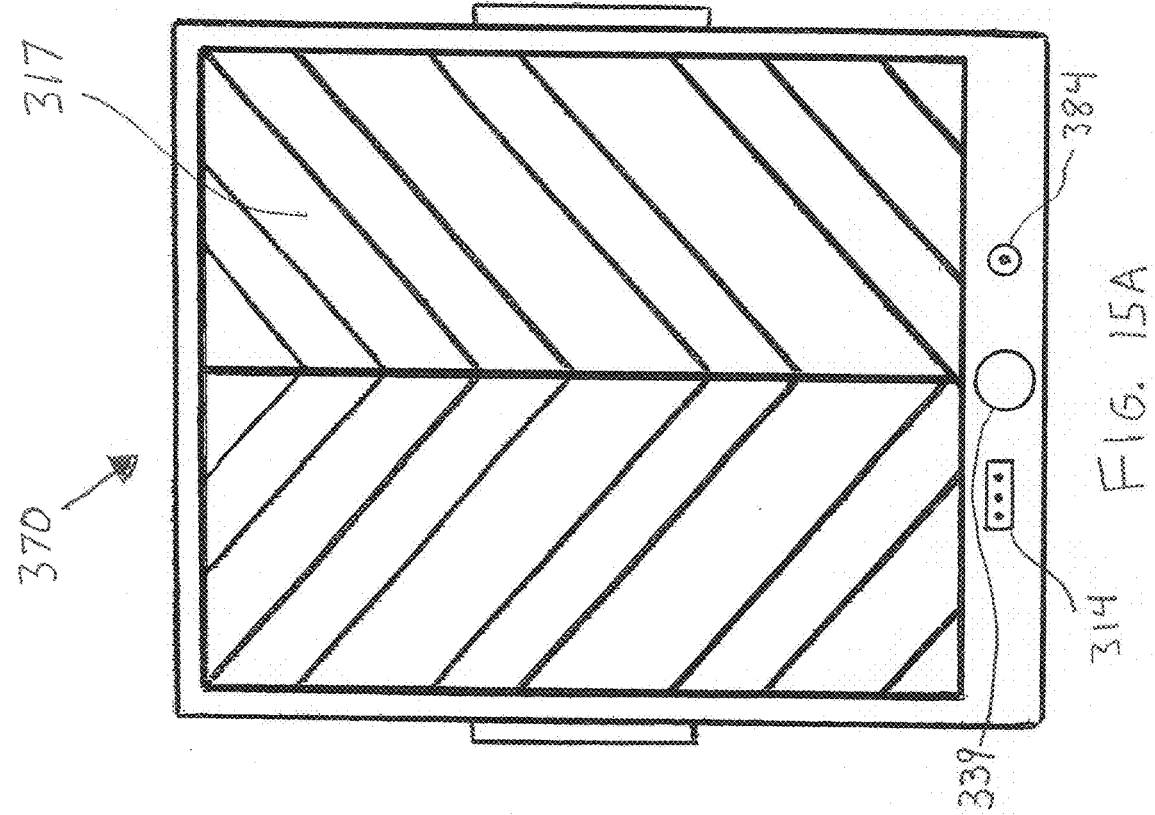
FIG. 15A is a front view of a removable electronic control device cartridge with blast doors attached.

An ECD cartridge 370 may include a battery recharge port 314 (see FIGS. 12 and 15A-B). The battery recharge port may electrically mate with connection plug 134 located in docking station 120c, when the non-lethal multi-functional law enforcement weapon tool is operably attached to docking station 120c of a main unit 100. An ECD cartridge may also include a rear tool socket 324, wherein the rear tool socket 324 may electrically mate with a power contact plug 334 located within the housing 377 of the non-lethal multi-functional law enforcement weapon tool 300, when the ECD cartridge 370 is operably housed therein. When operably mated, electrical power may be utilized to facilitate electrical current distribution through the wire 320 and darts (or prongs) 330. Moreover, when operably mated, the battery of the non-lethal multi-function law enforcement weapon tool 300 may operate with electrical connectors to achieve electrical communication with connection plug 134 located in docking station 120c, when the non-lethal multi-functional law enforcement weapon tool 300 is operably attached to docking station 120c of a main unit 100, thereby maintaining a proper charge of the tool 300 an included ECD cartridge 370, while having ready access for use if needed.

An ECD cartridge 370 may be a duel-function combo cartridge. In addition to the structural and functional features associated with dart (or probe) 330 operation and discharge, a duel-function combo ECD cartridge 370 may structurally and functionally facilitate discharge of pepper spray. The pepper spray may be emitted by pressurized force through a pepper spray nozzle 384 (see FIGS. 12 and 15A-B). The pepper spray nozzle 384 may be in fluid communication with a pepper spray reservoir, such as a pepper spray canister within non-lethal multi-functional law enforcement weapon tool 300, so that, when the pepper spray is released under the application of pressure, the pepper spray can discharge from the pepper spray nozzle 384 with enough force and velocity to project a steady stream of the pepper spray between 4-24 feet for several seconds. Additionally, the pepper spray nozzle 384 may be in fluid communication with a pepper spray port 385 located on the rear of the ECD cartridge 370 (see FIG. 16). The pepper spray port 385 on the rear of the ECD cartridge 370 may physically and fluidically mate with a pepper spray docking port 387 located in the rear of housing 377 of the non-lethal multi-functional law enforcement weapon tool 300. When the pepper spray port 385 is mated with the pepper spray docking port 387, there is a potential for the provision of pepper spray, or pressurized gas, and/or pressurized pepper spray from a corresponding reservoir (not shown) within the non-lethal multi-functional law enforcement weapon tool. Likewise, a laser sight 338 (see FIGS. 13 and 14) may be located within the non-lethal multi-functional law enforcement weapon tool 300 and may operate through a laser conduit 349 (see FIGS. 16-17) of the ECD cartridge 370 to effectuate an operable laser sight implement 339. A non-lethal multi-functional law enforcement weapon tool weapon tool 300 may include sensors and tracking features that may help to automatically inform when the duel-function combo ECD cartridge may need to be replaced.

With continued reference to FIGS. 10-19, a further feature associated with embodiments of a non-lethal multi-functional law enforcement weapon tool may be an electrical stun device. The electrical stun device may emit electric current through probes 180a and 180b. The electrical stun device probes 180a-b may be used defensively while the non-lethal multi-functional law enforcement weapon tool is held in an officer's hand. As such, the electric stun-gun feature may be extremely helpful in situations where an assailant comes within close proximity with the officer and may be effectively utilized with only one hand, thereby allowing an officer to freely use their other hand for other additional actions, such as handcuffing, physically restraining or defending, or even drawing and discharging their lethal firearm. Electrical power may be provided to the electrical stun device probes 180a-b through a variety of means. For example, power may come from a battery (not shown) housed within the non-lethal multi-functional law enforcement weapon tool 300 and electrically connected to the electrical stun device probes 180a-b.

It is contemplated that, when actuating projection of electrically charged probes 330 from an EDC cartridge 370, a user may lift a safety cover "NL" 379, so that the shock probe projection actuation button 349 may be actuated. The lifting of the safety cover 379 may instigate an automatic activation of a laser sight implement 339. Moreover, when the user actuates the shock projection probe actuation button 349, a charge is sent to a conductive contact 398 proximally located near a probe 330. The conductive contact 398 may be energized by its proximity to the probe 330, which may traverse wire 397 to firing pin 396, which may then set off a primer charge 394. The primer charge may then send a pressurized gas capsule or canister 393 toward a breach pin 391 and breach hole or cavity 392, which may then evacuate the pressurized gas into the bifurcated tubes 399a and 399b. The force of the evacuated pressurized gas works on the electrically charged shock probes 330a and 330b projecting them out of the cartridge 370 and toward an intended target. Corresponding exhaust gases pass through a screen 395 and out exhaust holes 313 (see FIG. 15B), with enough force to blast away the blast doors 317 so as to avoid impedance with the projecting shock probes 330a-b. Hence gas may be discharged based on a command initiated via the non-lethal multi-functional law enforcement weapon tool and project the electrically charged probes 330a and 330b away from the electronic control device cartridge.

Figure 20:
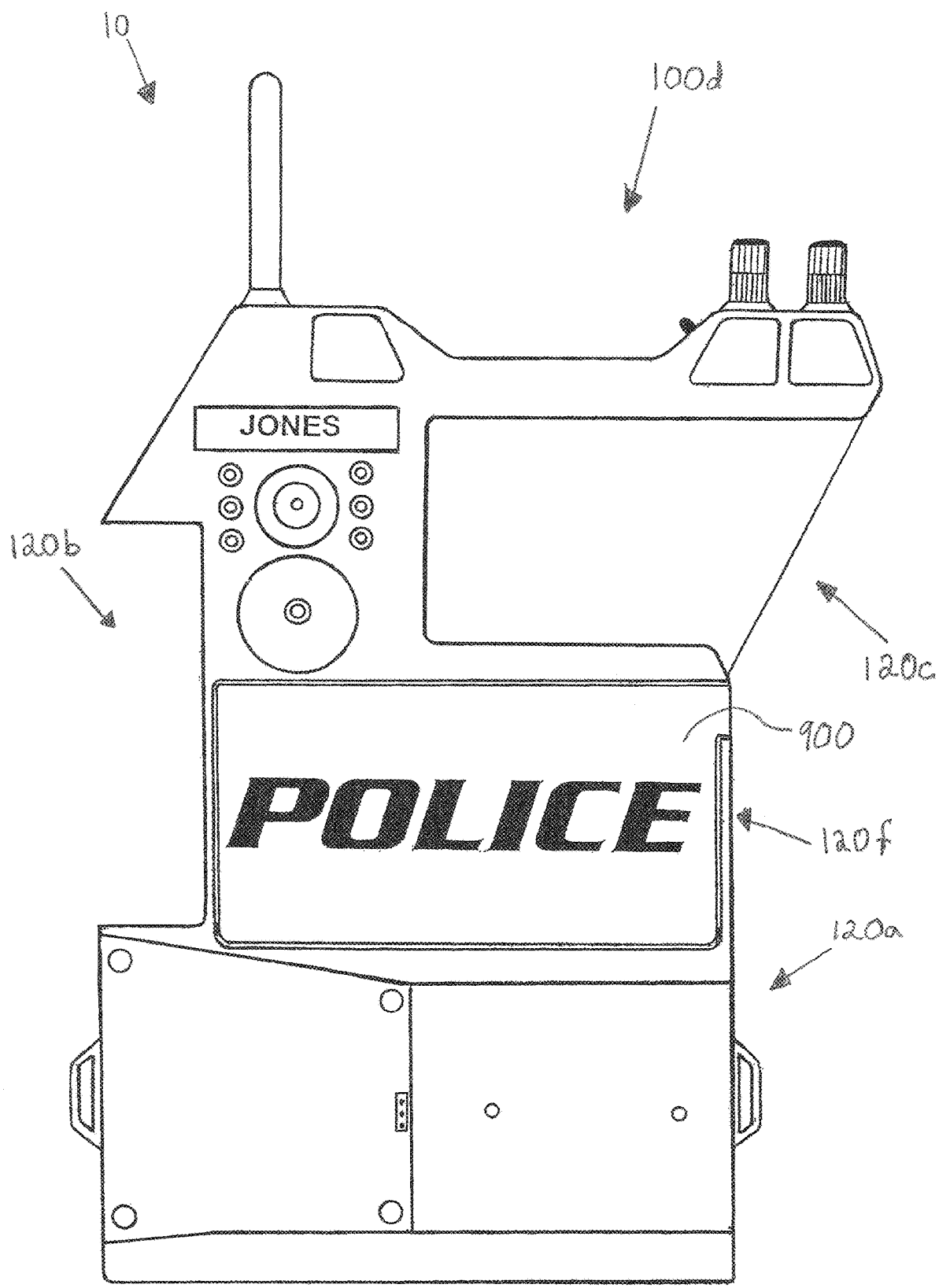
FIG. 20 is a front view of a main unit with a screen rotatably attached to the main unit and in a folded up position.
Figure 21:
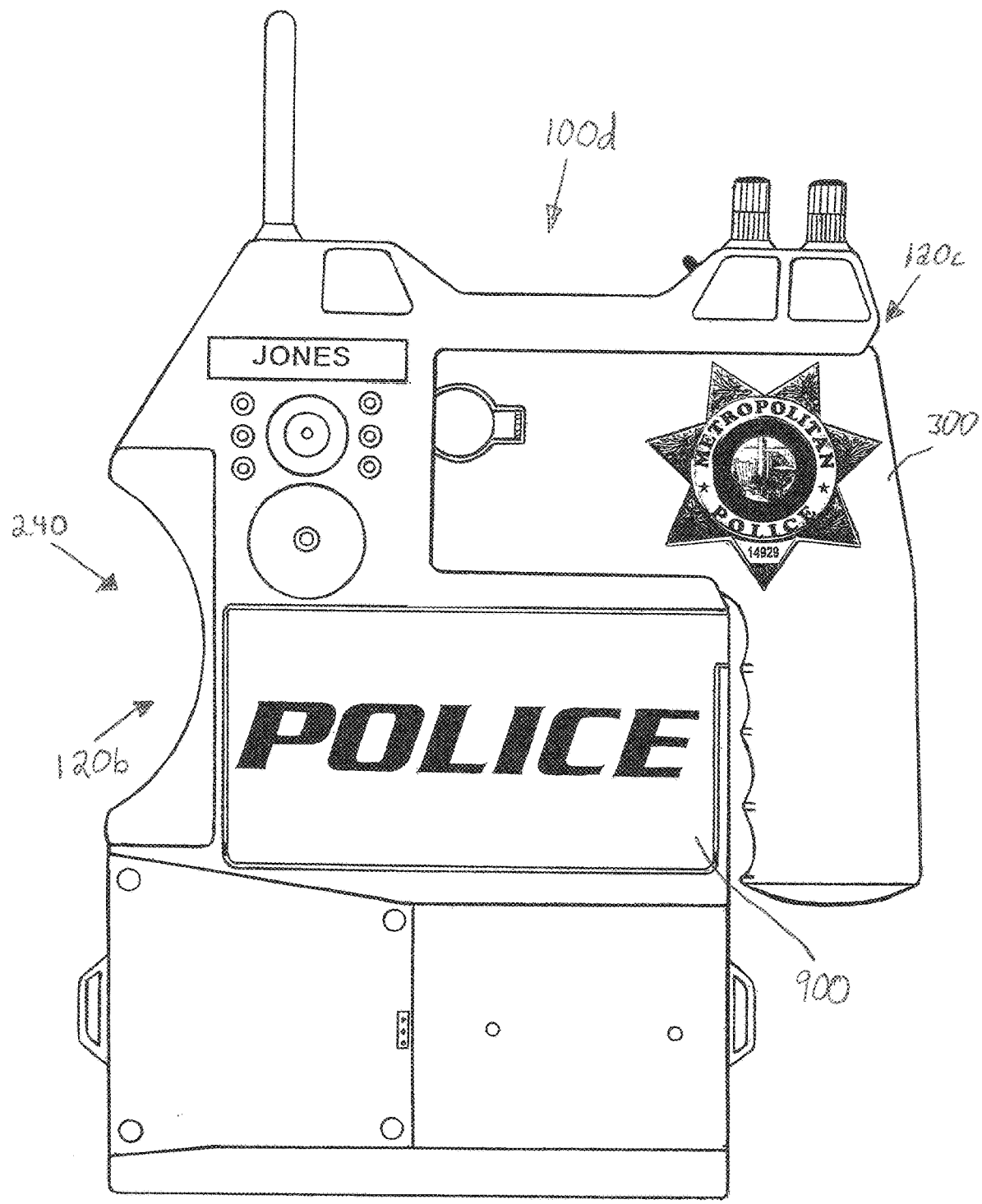
FIG. 21 is a front view of a main unit with a screen rotatably attached to the main unit in a folded up position, a non-lethal multi-functional law enforcement weapon tool attached to a right docking station of the main unit, and a space narrowing tool module attached to a left docking station of the main unit.
Figure 22:
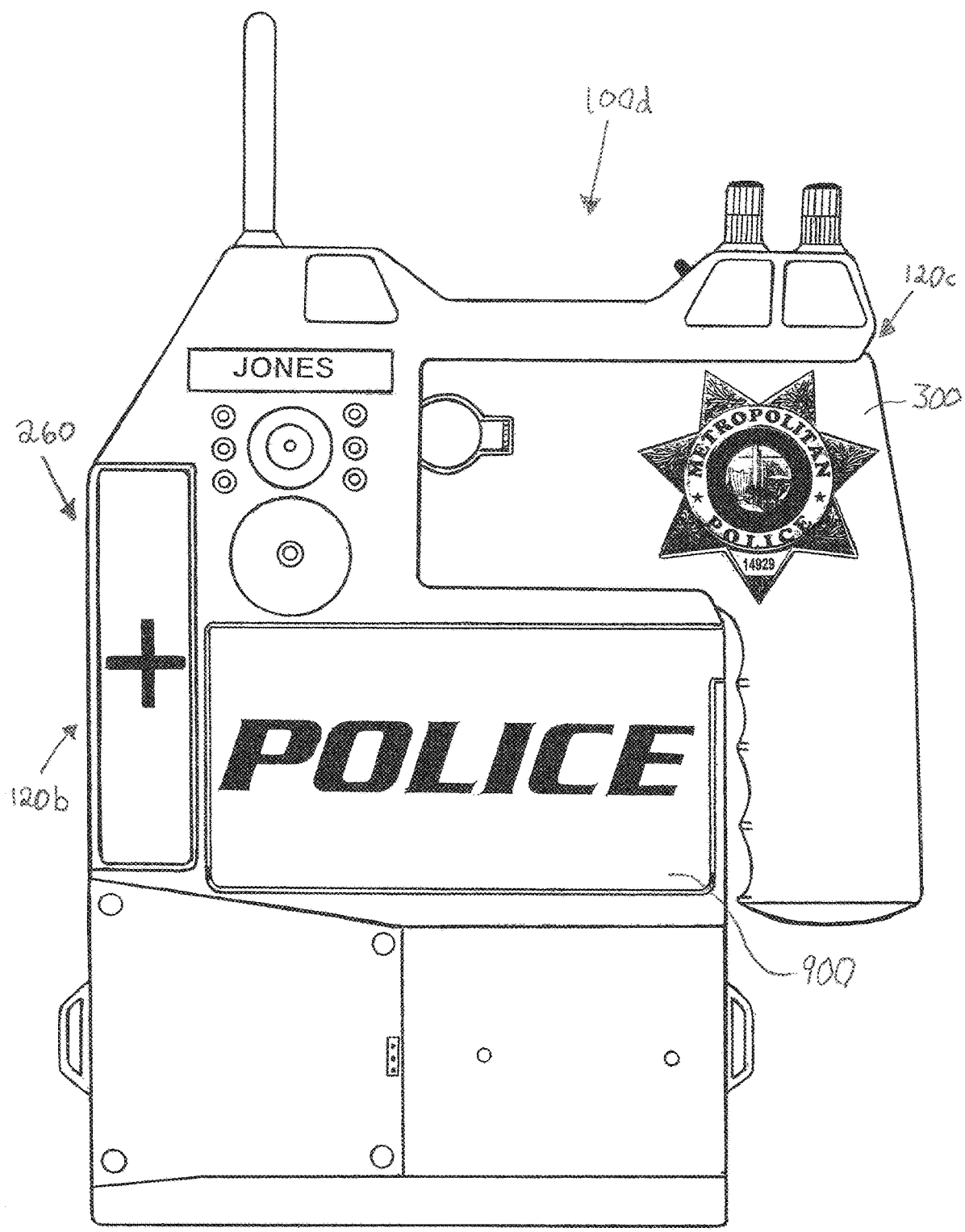
FIG. 22 is a front view of a main unit with a screen rotatably attached to the main unit in a folded up position, a non-lethal multi-functional law enforcement weapon tool attached to a right docking station of the main unit, and a tourniquet tool module attached to a left docking station of the main unit.
Figure 23:
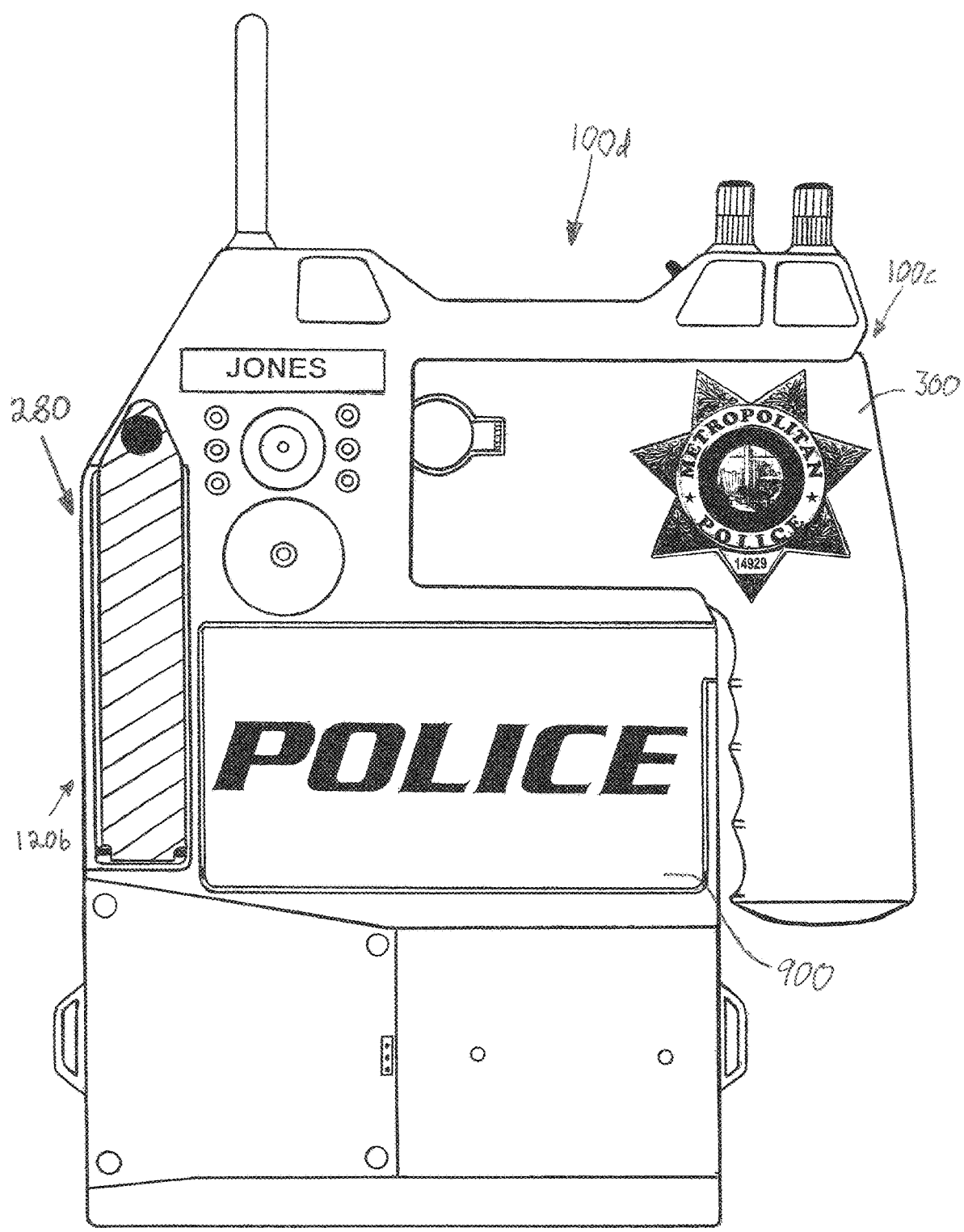
FIG. 23 is a front view of a main unit with a screen rotatably attached to the main unit in a folded up position, a non-lethal multi-functional law enforcement weapon tool attached to a right docking station of the main unit, and a storage tool module with a strap attached to a left docking station of the main unit.

With continued reference to FIGS. 1-3, aspects of a side cutout docking station 120b are further described in relation to the depictions of FIGS. 20-23. In particular, a main unit embodiment 100d is shown in FIG. 20 without any tool modules attached, except a display screen tool module in a folded up position and attached to a screen docking station 120f. An exemplary utilization of side cutout docking station 120 is shown in FIGS. 1-3, which depict a main unit embodiments 100a-c incorporating a handcuff holder tool module 200 attached to left side cutout docking station 120b. A handcuff clip (not shown) may help to removably secure the handcuffs 225 into place via frictional engagement and may also be configured to help eliminate potential wiggling of the handcuffs and associated jangling noise(s), particularly when an officer is running or otherwise vigorously moving. Another exemplary utilization of side cutout docking station 120b is depicted in FIG. 21, which shows a main unit 100d with a screen tool module 900 rotatably attached to the main unit in a folded up position, a non-lethal multi-functional law enforcement weapon tool module 300 attached to a right docking station 120c of the main unit 100d, and a space narrowing tool module 240 attached to left side cutout docking station 120b of the main unit 100d. Officers and security personnel, particularly those who are smaller and/or have narrower shoulders, or that preferentially shoot their firearms in a side stance, may appreciate the incorporation of a space narrowing "shooter's" tool module 240. Still another exemplary utilization of a left side cutout docking station 120b is depicted in FIG. 22, which shows a main unit 100d with a screen tool module 900 rotatably attached to the main unit in a folded up position, a non-lethal multi-functional law enforcement weapon tool module 300 attached to a right docking station 120c of the main unit 100d, and a tourniquet tool module 260 attached to the left side docking station 120b. Yet another exemplary utilization of a left side cutout docking station 120b is depicted in FIG. 23, which shows a main unit 100d with a screen tool module 900 rotatably attached to the main unit in a folded up position, a non-lethal multi-functional law enforcement weapon tool module 300 attached to a right docking station 120c of the main unit 100d, and a storage tool module 280 having a strap, wherein the storage too module 280 is attached to the left side docking station 120b. Those of ordinary skill in the art will appreciate that the structural format of features of a tactical torso tool carrier and communication device 10 may be reciprocated. For instance, embodiments of a main unit 100 may be configured symmetrically for right-hand preferential use or for left-hand preferential use. In such case, various Main Unit embodiments may be mirror images of each other.

Figure 24:
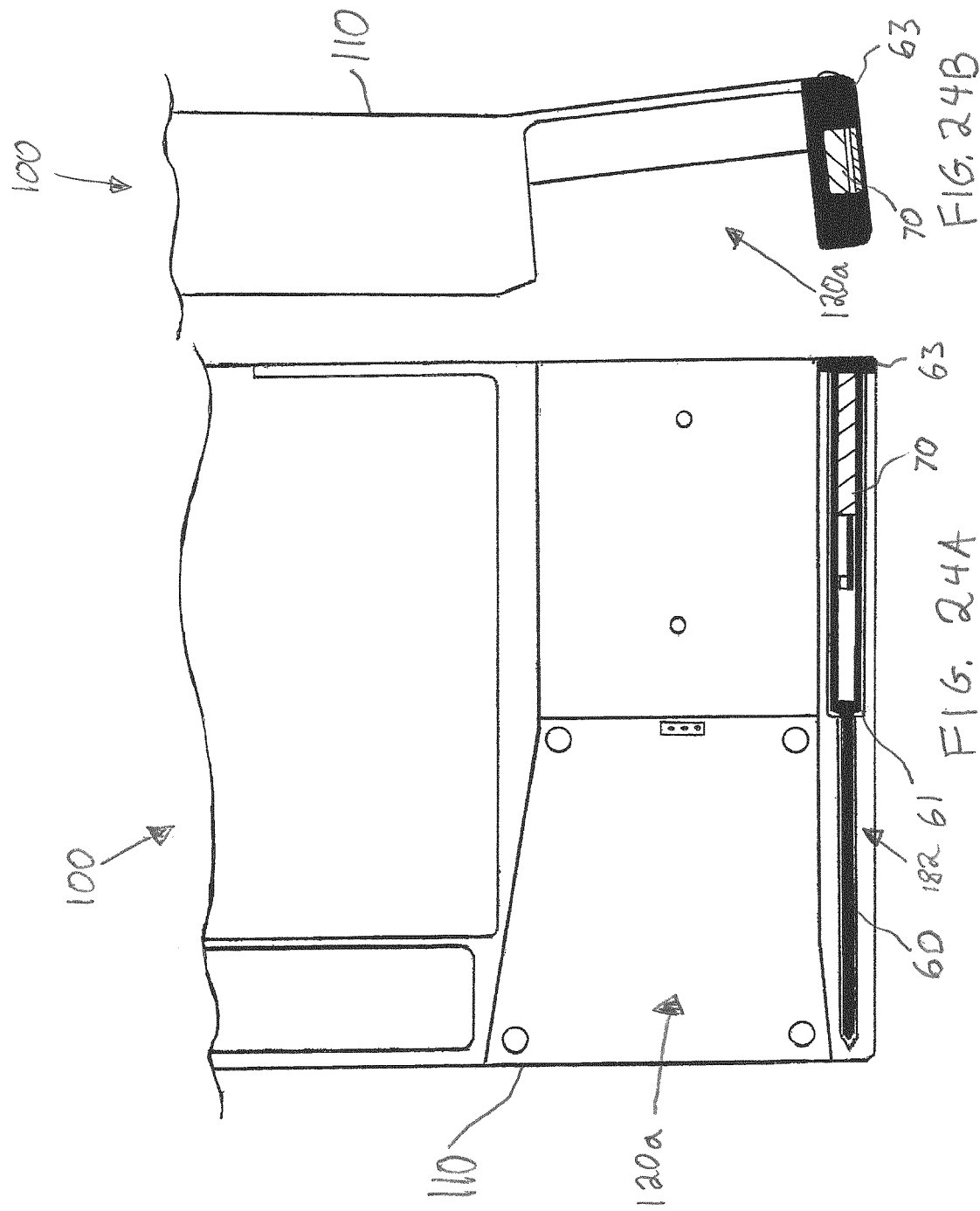
FIG. 24A is a partial cut-away partial front view of a main unit including a knife stowed in a knife holder sleeve at the bottom of the main unit.
FIG. 24B is a partial cut-away partial right side view of a main unit including a knife stowed in a knife holder sleeve at the bottom of the main unit and an handcuff key stowed in a compartment of the knife handle.

As depicted in the front and side partial cutaway partial views of a main unit 100 shown respectively in FIGS. 24A and 24B, a main unit may include a modular knife 60 horizontally located in a knife holder sleeve 182 at the bottom of housing 110. The knife 60 may include a handle 62 having a hollow portion configured for removably stowing handcuff key 70 and handcuff lock, such as a ZAK® tool comprising a handcuff key at one end and a handcuff key lock at the other. The handcuff key 70, such as a ZAK® tool, may be accessible and removed from the knife handle 61 without having to remove the knife 60 from the knife holder sleeve 182. A friction component 63 may be provided to help securely removably hold the knife 60 and stowed handcuff key 70 in the knife holder sleeve 182.

Figure 25:
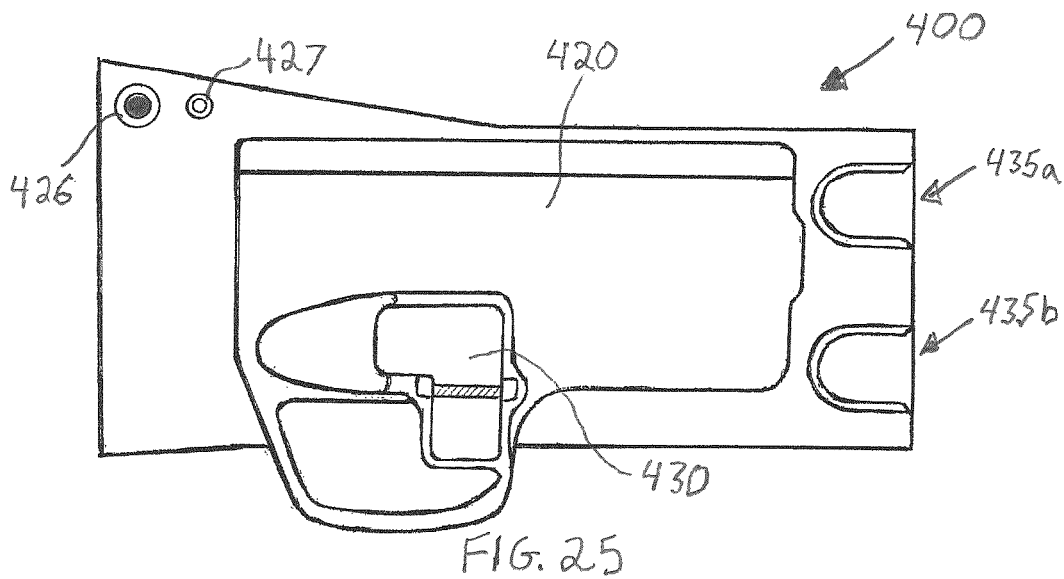
FIG. 25 is a front view of a gun holster tool module.
Figure 26:
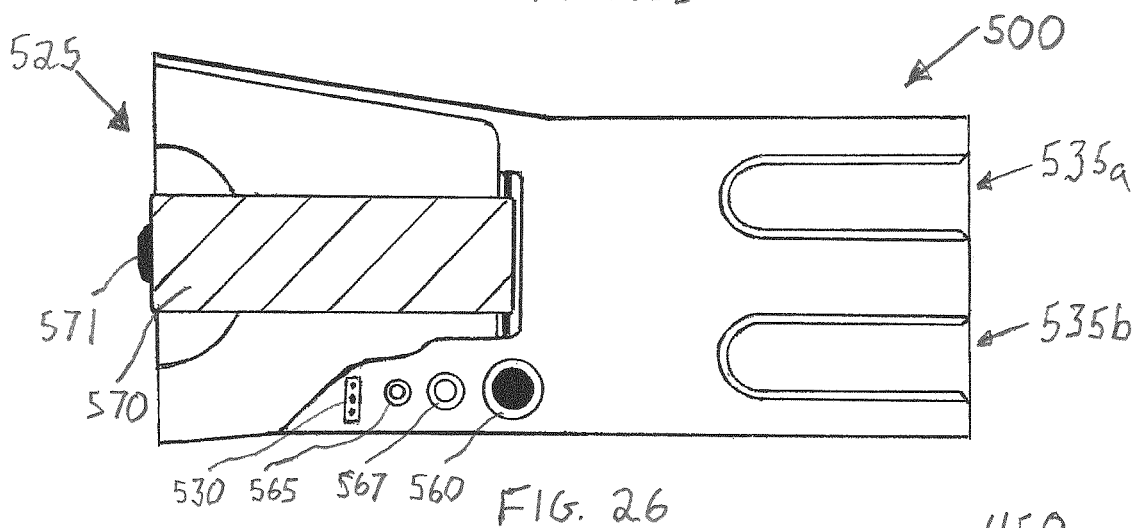
FIG. 26 is a front view of a handcuff and magazine holder tool module.
Figure 27:
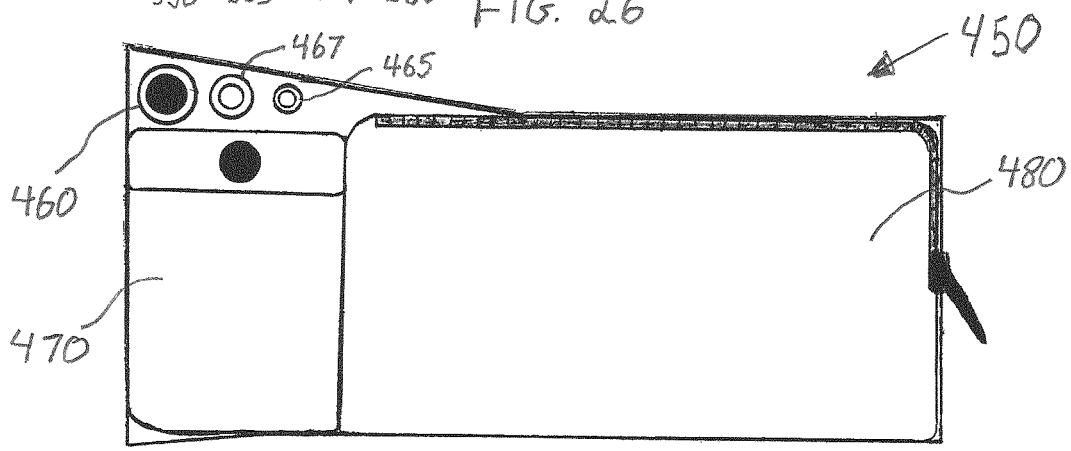
FIG. 27 is a front view of a pouch carrier tool module.
Figure 28A:
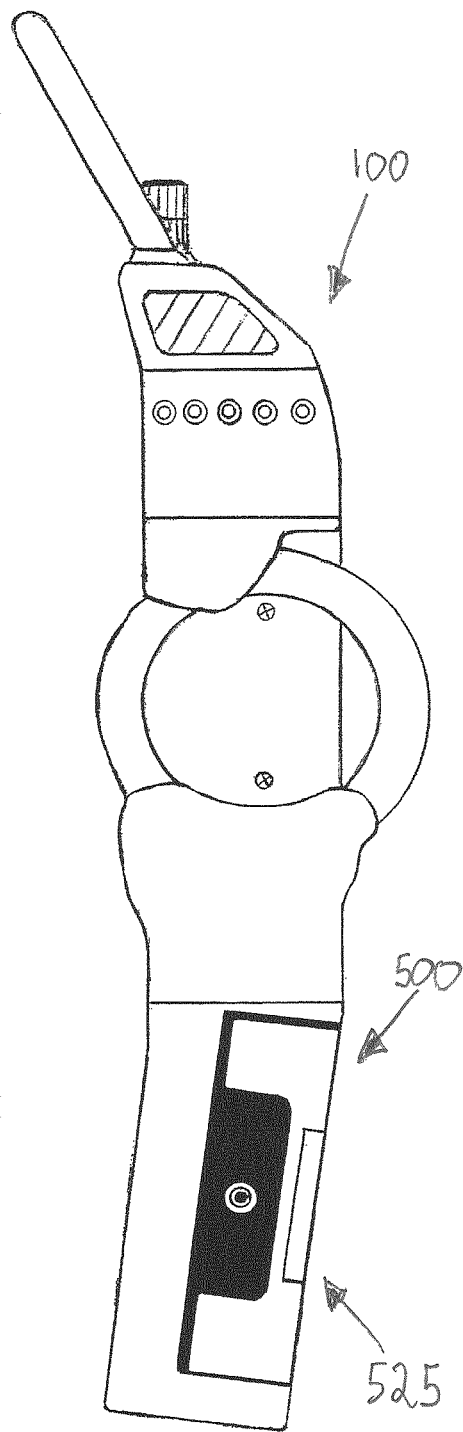
FIG. 28A is a left view of a main unit having a handcuff and magazine holder tool module attached to a bottom docking station.
Figure 28B:
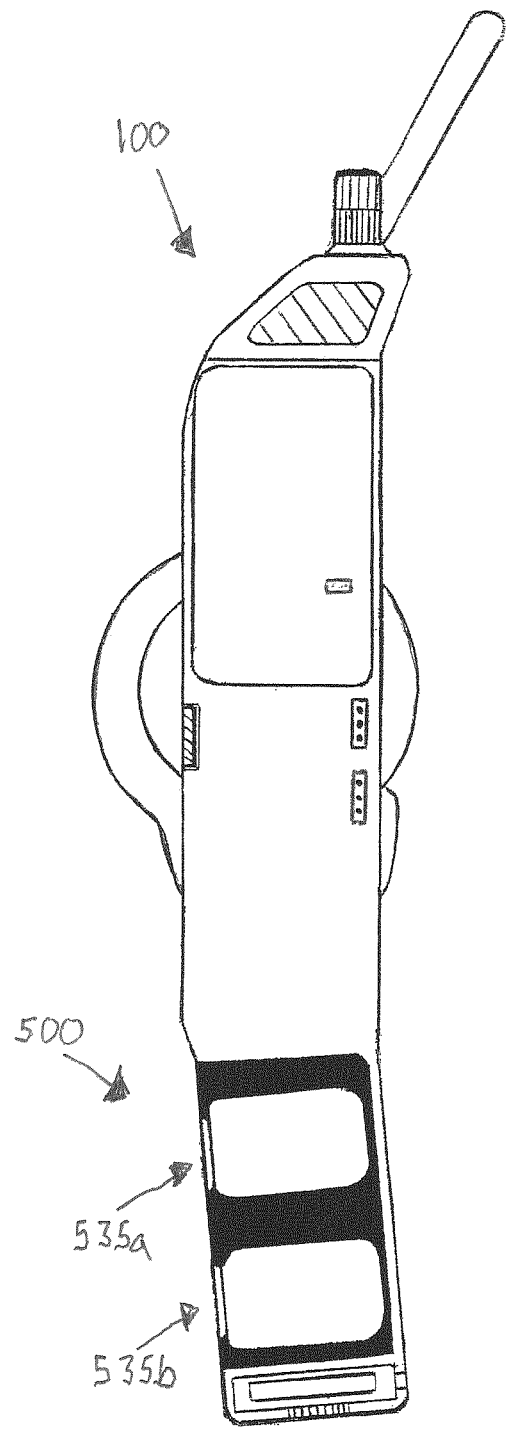
FIG. 28B is a right view of a main unit having a handcuff and magazine holder tool module attached to a bottom docking station.

With continued reference to the drawings, FIGS. 25-27 depict tool module embodiments configured for removable attachment with a docking station 120a shown, inter alia, in FIGS. 20 and 24A-B. A handcuff and magazine holder tool module 500, particularly shown in FIG. 26, may mount to a docking station 120a of a main unit 100 as specifically depicted in FIGS. 28A and 28B. The handcuff and magazine holder tool module 500 may include a handcuff holder 525 operable with a removal strap 570 and snap 571, and one or more magazine holders 535a and 535b. Additionally, the handcuff and magazine holder tool module 500 may include a video camera 560, a light 567, an visual identifier camera 565, and a charging port 530. The video camera 560, light 567, visual identifier camera 565, and charging port 530 may operate with a battery and processor (not shown).

A video camera 560 depicted in FIG. 26 (sometimes called a "gun-cam"), may function in a manner similar to video camera 160 discussed previously herein. The video camera 560 may be located on the front face of the handcuff and magazine holder tool module 500. The video camera 560 may be configured to automatically turn on when a weapon, such as an officer's lethal firearm 700 or the officer's non-lethal multi-functional law enforcement weapon tool 300, is drawn from a corresponding holster, such as a smart holster, or docking/recharge station, because sensors in the holster and/or the docking/recharge station may detect that the weapon has been drawn and send a signal to a processor of the main unit 100 or an operably connected tool module, such as the handcuff and magazine holder tool module 500, which may, in turn, process governing protocol directing the activation of the gun-cam, or video camera 560.

The positional location of a gun cam, such video camera 560, on a handcuff and magazine holder tool module 500 located at the bottom of a main unit 100 embodiment, with respect to wearable features of a tactical torso tool carrier and communication device 10, is purposeful. When an officer draws, points, and aims his or her weapon, the officer's hands and the weapon are nearly always positioned in front of the officer's chest. Hence, the officer's hands and the weapon may obscure the field of view of other body-cams (video camera 160 located at the top of a main unit 100 embodiment). However, the purposefully lower positioning of a gun cam, such as video camera 560, may still afford a clear, or clearer, field of view, because the video camera 560 may be located nearer the officer's waist, when the officer is wearing features, such as a main unit 100 and operable tool module 500, of a tactical torso tool carrier and communication device 10, and therefore the field of view of the video camera 560 may not be obstructed, or may be much less obstructed, by the arms and drawn weapon of the officer. For this reason, inter alia, a video camera 560 may be configured to automatically and immediately activate when an officer draws a weapon. Like other body-cams of a tactical torso tool carrier and networked control and communication system 500, the body-cam 101 (and similar body-cam 102) may operate with buffering, and may include one or more lenses that may facilitate zooming and other features such as night vision and/or thermal IR imaging. Additional body-cam(s), such as video camera 160 located higher on a main unit 100 embodiment, may also be capturing and recording video images while a video camera 560 is capturing and recording video images. Moreover, audio capturing features on or associated with any main unit 100, tool module or attachment of a tactical torso tool carrier and communication device 10, may contemporaneously be recording audio when a video camera 560 is actively capturing and recording video images.

When a body-cam, such as a video camera 160 and or a gun cam video camera 560, is automatically activated by an officer drawing a weapon, an audio/video feed of the events unfolding in front of the officer may be instantly recorded and/or broadcast, via wireless transmission, to a command center and/or to other officers. Additionally, other features, such as infrared IR lights 163 depicted in FIG. 9 (discussed earlier—sometimes called "gun-infrared") may also be activated when a weapon is drawn by an officer. Still further a GPS position of the weapon-drawing officer's location may be automatically transmitted to other officers, wherein the other officers may be wearing features of a tactical torso tool carrier and communication device 10, and/or may be transmitted to a command center dispatch. Wireless transmission of information pertinent to an officer's status, upon activation and use of a video camera, such as camera 160 and/or camera 560, and/or other features of a tactical torso tool carrier and communication device 10, may be effectuated, inter alia, through electromagnetic transmission means, such as digital data transfer via a two-way radio signal, by communicatory operation of a cellular phone component operably associated with a tactical torso tool carrier and communication device 10, by Wi-Fi® transmission and/or Bluetooth® transmission, and/or may be transmitted by other like wireless transmission means. In addition, an emergency signal, similar to that transmitted by the emergency button 149 associated with the two-way radio 155 of a main unit 100 embodiment, may be transmitted to other officers and/or to a command center dispatch. In essence, when an officer wearing features of a tactical torso tool carrier and communication device 10 draws their weapon, a system-wide process may be activated automatically to provide numerous tactical advantages, all while the officer may remain steadfastly focused on the critical situation before them. Such multi-operational activity of a plurality of tactical tools being activated and operated automatically and simultaneously is something that is completely unachievable currently by standard duty belt or vest-type systems typically used by law enforcement officers and security personnel.

A visual identifier camera, such as visual identifier camera 565 of handcuff and magazine holder too module 500, may be utilized to scan ID cards, pictures, reference numerals, and/or barcodes, etc. to help verify the identity of a subject an officer may be interrogating. Under current practice, officers regularly check a driver's license or other form of ID by transmitting information they visually glean from the driver's license or ID card to a command center or central department office, often via a common two-way radio transmission. This standard identification verification process is often cumbersome, slow, and open to potential fraud if the ID card or driver's license is fake or modified. The optical scanning and imaging capability of a visual identifier camera 565 may allow an officer to scan or read the ID-card into a system that may facilitate automatic verification and data matching. The operable functionality of a visual identifier camera 565 may also allow an officer to rapidly determine a person's criminal background, whether they have any outstanding warrants, and/or previous felony convictions and possible ramifications associated therewith. For example, the picture on the driver's license may be compared with a picture on file with the DMV in a permissibly-accessible database, or even possibly stored in memory of a computing unit of a main unit embodiment, and the officer may be able to tell if the person has a background issues such as a suspended license. Facial recognition software may be employed to help the ID scanner associated with the visual identifier camera 565 to verify the identification of a person whose image is scanned. The scanning/imaging capability of a visual identifier camera 565 may take advantage of the speed and accuracy of onboard modular and/or main unit computing units and/or communicatively connected external computers facilitated by electromagnetic signal transmission, to effectuate an ID verification process.

A pouch carrier tool module 450, particularly shown in FIG. 27, may mount to a docking station 120a of a main unit 100 as specifically depicted in FIGS. 29A and 29B. The pouch carrier tool module 450 may include one or more pouches, such as pouch 470 and pouch 480, wherein the pouches may be configured to store and carry a variety of tools and useful implements. Additionally, pouch carrier tool module 450 may include a video camera 460, a light 467, and a visual identifier camera 465. The video camera 460, light 467, and visual identifier camera 465 may operate with a battery and processor (not shown) and function in a manner similar to the video camera 560, light 567 and visual identifier camera 565 described herein with regard to physical and functional characteristics of a handcuff and magazine holder tool module 500.

Figure 30A:
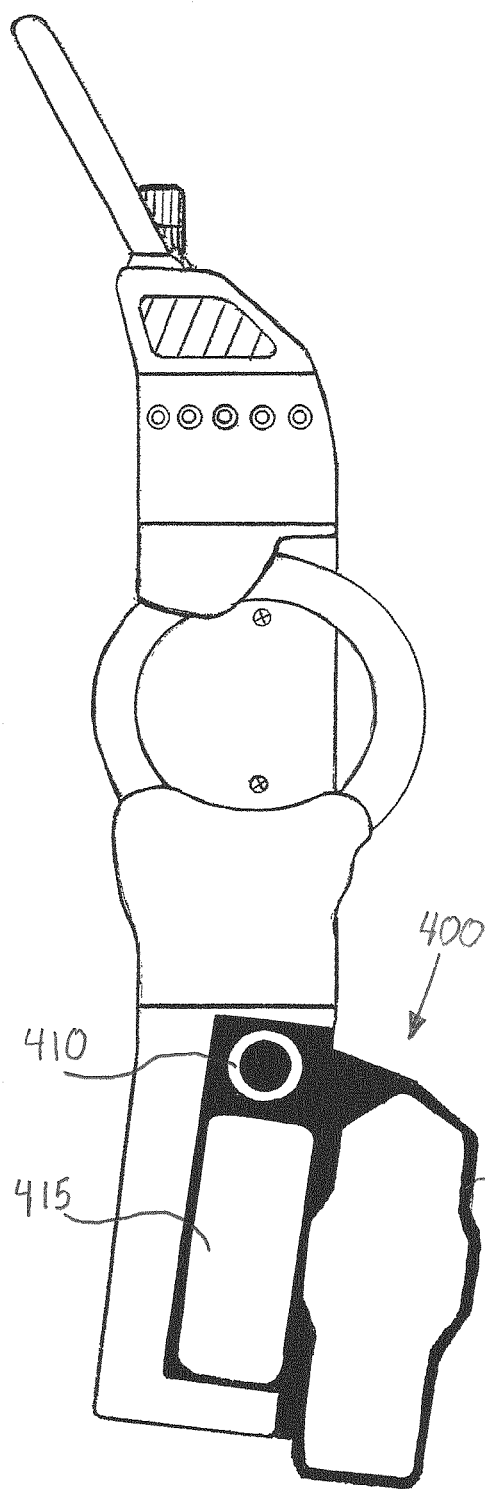
FIG. 30A is a left view of a main unit having a gun holster tool module attached to a bottom docking station.
Figure 30B:
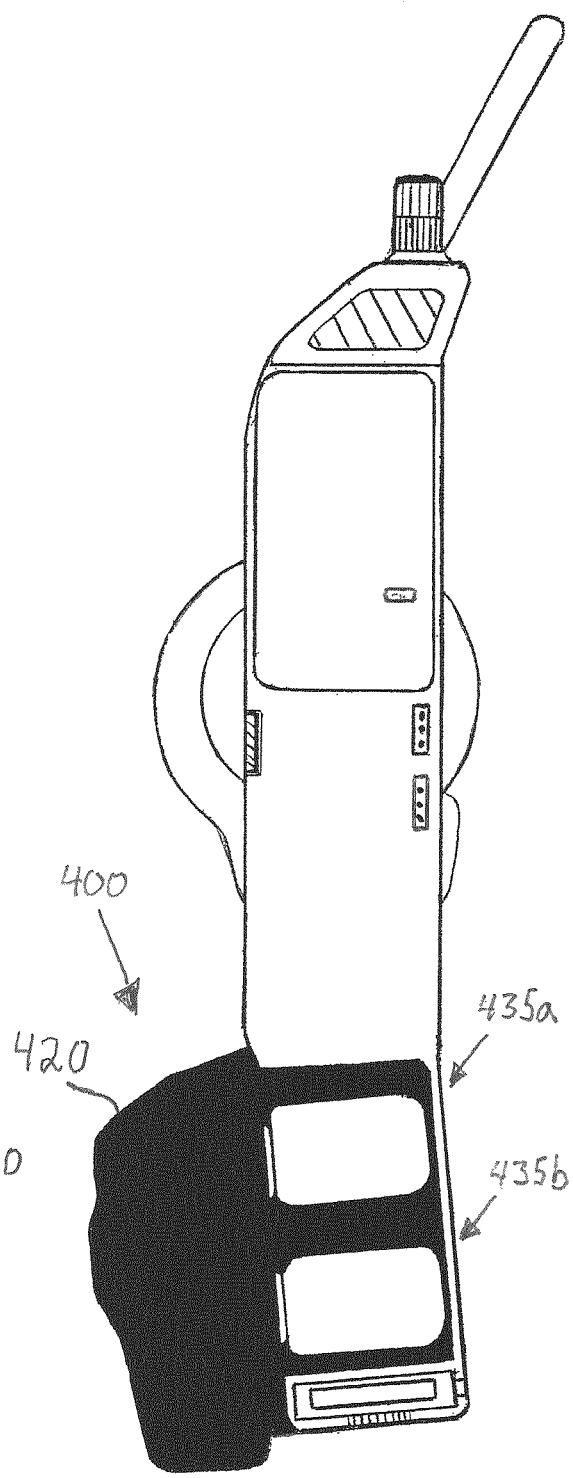
FIG. 30B is a right view of a main unit having a gun holster tool module attached to a bottom docking station.

A gun holster tool module 400, particularly shown in FIG. 25, may mount to a docking station 120a of a main unit 100 as specifically depicted in FIGS. 30A and 30B. The gun holster tool module 400 may include magazine holders 435a and 435b and a holster 420 having a retention paddle 430 configured to help releasably retain a firearm holstered therein. The holster 420 may be a "smart holster" 420a, as discussed further herein. A thumb slot 415 may be provided for user convenience Additionally, gun holster tool module 400 may include a video camera 426 and a light 427. The video camera 426 and light 427 may operate with a battery and processor (not shown) and function in a manner similar to the video camera 560 and light 567 described herein with regard to physical and functional characteristics of a handcuff and magazine holder tool module 500. Furthermore, a visual ID actuator button 410 may be included to activate visual identification functionality that may be facilitated by operation of the video camera 426, in a manner similar to operation of a visual identifier camera 565 described herein.

With continued reference to the drawings, FIGS. 31 and 32 depict front and partial cut-away views of a gun holster tool module 400a including a smart holster 420a having a gun removal use sensor 425 configured to sense the presence or absence of a lethal firearm in the holster 420a, and at least one charging contact 445 configured to mate with a charging port of an electronically enhanced lethal firearm (the electronically enhanced lethal firearm discussed further herein).

The gun removal use sensor 425 and at least one charging contact 445 may operate with a processor operable with a printed circuit board 440 and a battery (not shown). The gun holster tool module 400a may further include magazine holders 435a and 435b, which are built for quick use. The magazine holders 435a and 435b may be configured so as to allow loaded magazines to be securely held in place, while being easy and quick to extract for purposes of reloading an associated firearm. As shown in FIG. 2, loaded magazines 90a and 90b may be held in magazine holders, such as magazine holders 435a and 435b. The magazines may be a smart magazine, such as smart magazine 90 discussed further herein, or may be a standard magazine. A magazine may be secured in a magazine holder by a built-in safety feature that employs frictional engagement to retain the magazine. The friction of the safety feature must be overcome manually to fully remove a loaded replacement magazine, such as magazine 90, from a magazine holder, such as magazine holder 435a.

As shown in FIGS. 31 and 32, magazine holders 435a and 435b may incorporate magazine holder sensors 436a and 436b. These sensors may sense the presence of corresponding magazines. For example, a magazine sensor 436 may sense that a magazine holder 435 is empty, therefore sending a signal to a processor of a tactical torso tool carrier and and communication device 10, to facilitate an indication that may be provided to notify an officer (or other officers or central command) that the magazine has been removed. As such, an officer seeing the indication (possibly by viewing an alert on one of the screens of a tactical torso tool carrier and communication device 10), or hearing an audible alert, such as a beep that provides notice that the magazine is missing, may recognize that there is a need to place a loaded magazine back into the magazine holder 435.

Embodiments of a tactical torso tool carrier and communication device 10 may operate with an electronically enhanced lethal firearm 700a, such as an advanced tactical pistol, wherein side and front views of the enhanced lethal firearm 700a are depicted in FIGS. 33A and 33B. An electronically enhanced lethal firearm 700a, such as an advanced tactical pistol, may be substantially similar to other standard issue firearms, but may also include a few component features that provide advantages over common pistols. As depicted in FIG. 33A, embodiments of an advanced tactical pistol may include a gun light activation button 710. The gun light activation button 710 may allow the ready activation and utilization of a gun light 702 depicted in FIG. 33B. The advanced tactical pistol may be configured to work together with a smart gun holster, such as smart holster 420a, or a smart wireless retention holster (as will be discussed further herein). Moreover, electronically enhanced lethal firearm embodiments 700a may comprise a shooting platform attachment slide 750, or other like mechanical feature. Embodiments of an electronically enhanced lethal firearm may also include a laser sight 701. By consolidating laser sight activation button 710 with a passive infrared sensor 720 an officer can push down the laser sight activation button 710 to the "on" or compressed position. The laser sight 701 may activate the passive infrared sensor 720 which is covered up by the officer's index finger. If the officer decides to shoot their electronically enhanced advance tactical pistol 700a, the instant that they remove their index finger covering the passive infrared sensor 720, the laser sight 701 turns on at the same time an officer is pulling the trigger. Embodiments of an electrictronically enhanced lethal firearm 700a may also include a battery and a processor (not shown) operably connected to the gun light activation button 710, the infrared sensor 720, the laser sight 701, and/or the gun light 702. In addition, embodiments of an electronically enhanced lethal firearm 700b may be configured to operate with a standard magazine and/or to operate with a smart electronically enhanced magazine electrically connected with a magazine charge contact 704. Still further, embodiments of an electronically enhanced lethal firearm 700a may include at least one gun frame recharge contact, such as gun frame recharge contacts 703a and 703b, configured for electrical connection with at least one charging contact, such as charging contact 445 of smart holster 420a, when the electronically enhanced lethal firearm 700b is operably holstered in the smart holster 420a, as depicted via a partial cut-away view shown in FIG. 34.

With still further reference to the drawings, FIGS. 35A, 35B and 35C depict aspects of an electronically enhanced wireless magazine 770. Embodiments of an electronically enhanced wireless magazine 770, or "smart" magazine, may include a camera 773, a light 775, such as a light emitting diode (LED) light 775a and/or an infrared (IR) light 775b, an on/off switch 776, a battery 777, a processor 771, a capacity sensor 772, a transmitter 774, and a battery recharge contact 778 configured to electrically mate and be in electrical communication with a charge contact 704 of an electronically enhanced lethal firearm 700a, when the magazine 770 is loaded in an operable position within the electronically enhanced lethal firearm 700a. The battery 777 may be electrically connected with the camera 773, the wireless transmitter 774, the capacity sensor 772, and the processor 771. The features of a wireless magazine 770, when employed with an electronically enhanced lethal firearm 700a, such as an advanced tactical pistol, as operable with a tactical torso tool carrier and communication device 10, may provide an officer the ability use the camera 773 to see on a screen, such as a screen 910 of a screen tool module 900, what may be around a corner. The capacity sensor 772 may be configured to determine how many rounds are stored in the magazine, such as by determining the correlative position of spring 779, and the transmitter may wireless convey the sensor 772 determination to a receiver of a main unit 100, so an officer may look on a screen 910 to see how many rounds are detected in the magazine. Moreover, the light(s) 775, along with the gun light 702 depicted in the front view of the electronically enhanced advanced tactical pistol 700b shown in FIG. 33B, may also assist an officer by illuminating the suspect at night or in otherwise visually dark conditions.

Figure 36:
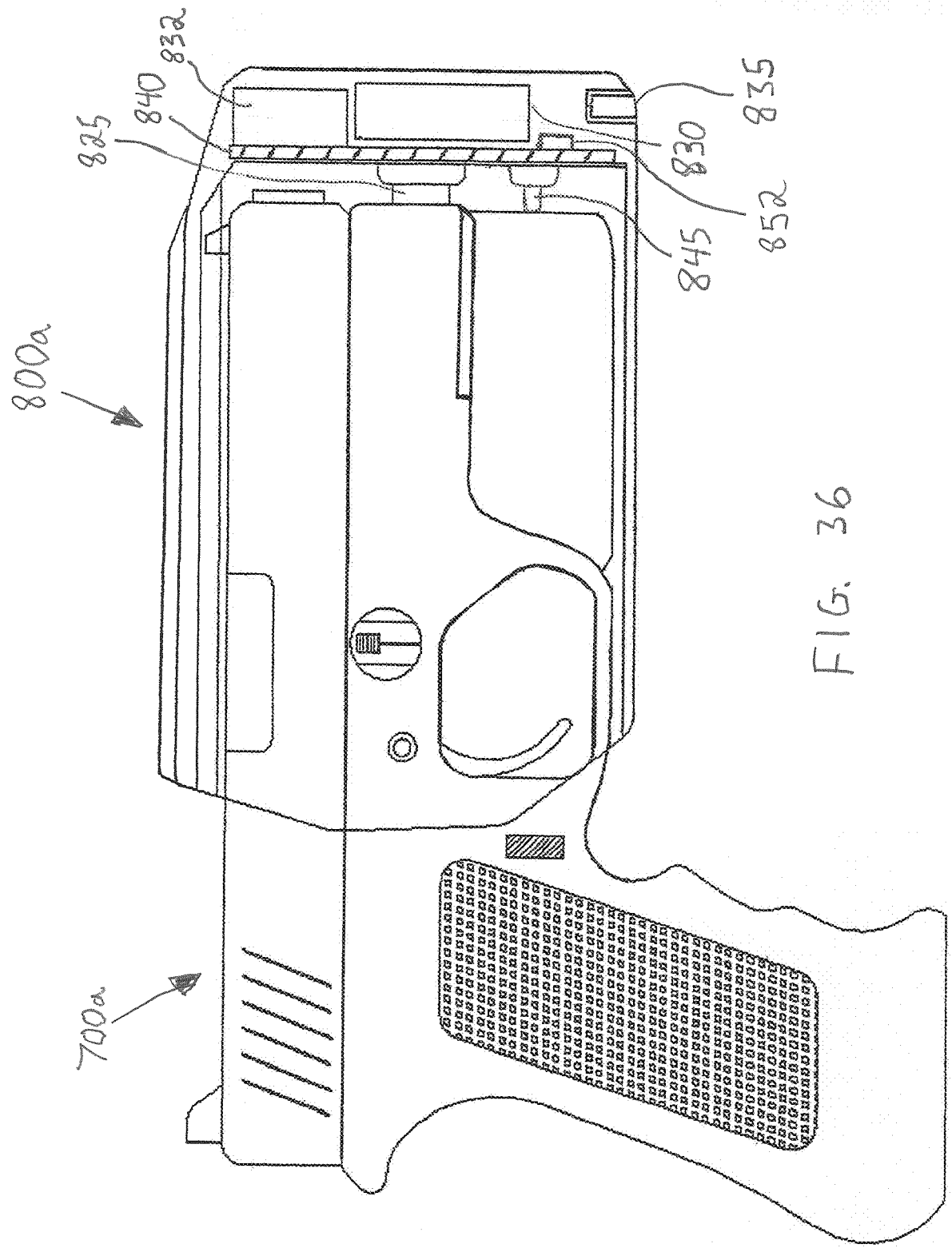
FIG. 36 is a partial cut-away view of a wireless smart holster having a lethal firearm operably holstered therein.

A tactical torso tool carrier and communication device 10 may operate with a wireless smart holster 800a, as shown in partial cut-away view of FIG. 36. Structurally, the wireless smart holster 800b may be configured in a manner somewhat similar to other common gun holsters 800 and also in a manner similar to a smart holster, such as smart holster 420a operable with a gun holster tool module 400. The wireless smart holster 800a may include a battery 830 in electrical communication with a processor 852, a circuit board 840, a transmitter/receiver 832, a power charging port 835, an enhanced electronic lethal firearm charge contact 845, and a gun removal use sensor 825 positioned to detect the presence of a firearm, when operably holstered within the wireless smart holster 800a. The transmitter/receiver may enable embodiments of a wireless smart holster 800a may operate wirelessly with a main unit 100 of a tactical torso tool carrier and communication device 10. The power charging port 835 may be configured to electrically mate with a power plug, such as a car recharger plug, or an electrical plug associated with a wall charger. Moreover, the enhanced electronic lethal firearm charge contact 845 may be configured to electrically connect with a corresponding electrical contact, such as contacts 703*a* and 703*b*, of an electronically enhanced lethal firearm 700*b*, when operably holstered, to charge the electronically enhanced lethal firearm 700*b*. A wireless smart holster 800*a* may be configured for functional operation associated with a tactical torso tool carrier and communion device 10 in a manner that is similar to the functional operation of a smart holster 420*a* discussed previously.

Figure 37:
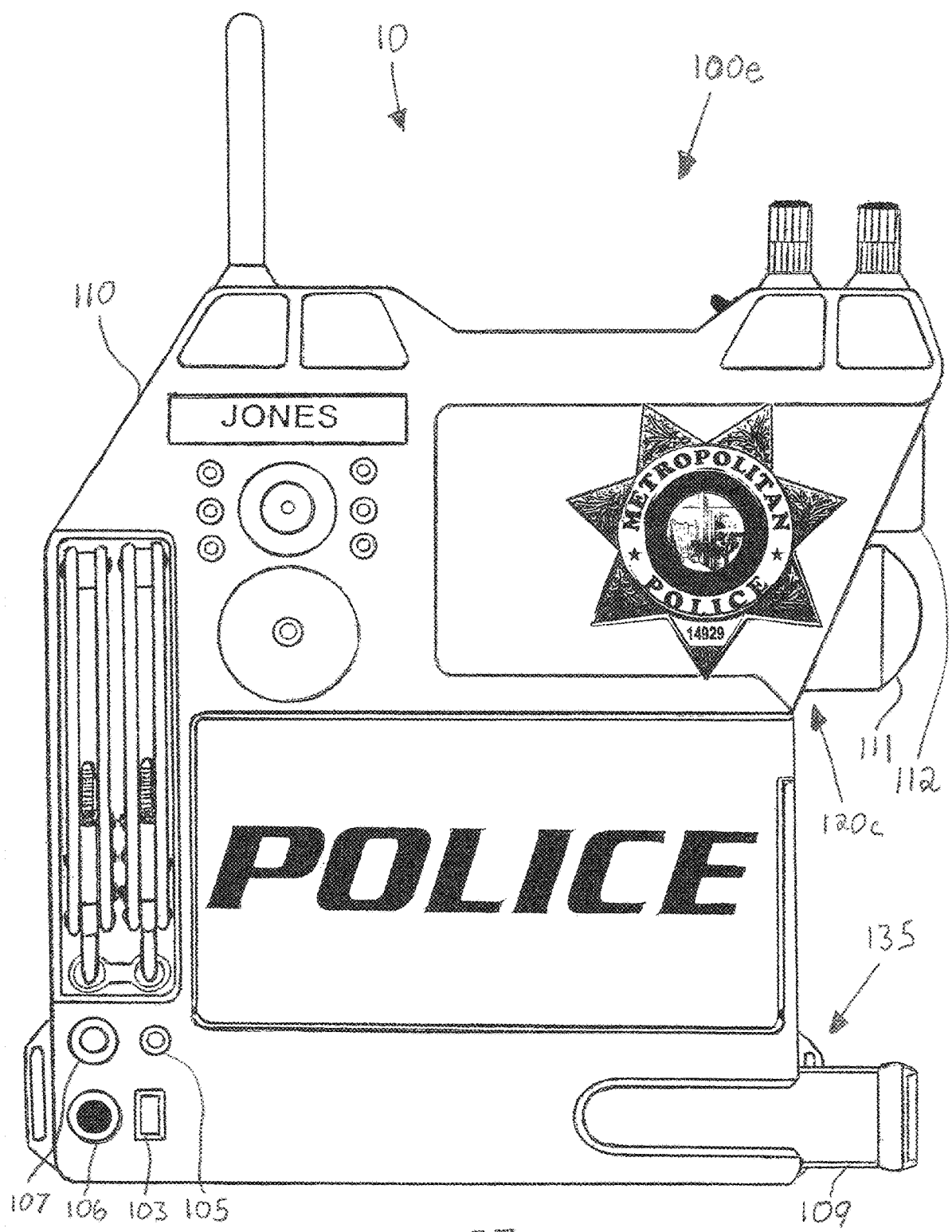
FIG. 37 is a front view of a vertically shortened main unit embodiment.

With continued reference to the drawings, FIG. 37 depicts a vertically shortened main unit 100*e* embodiment that may be convenient for officers having shorter torsos. The bottom of a main unit 100*e* may not include any docking station(s). Rather, a portion of housing 110 may include an extended magazine holder 135 configured to hold an extended magazine 109 having capacity for storing up to 29 ammunition rounds. A light 105, body-cam video camera 106, visual identifier camera (and associated activation button) 105 may be located in bottom portion of housing 110 near a power charging port 103. Instead of attaching a non-lethal multi-functional law enforcement weapon tool module 300 in docking station 120*c*, the docking station 120*c* may be configured to operably stow and charge a flashlight 112 and house a pepper spray/glass breaker tool 111, thereby narrowing the width of the tactical torso tool carrier and communication device 10.

Figure 38:
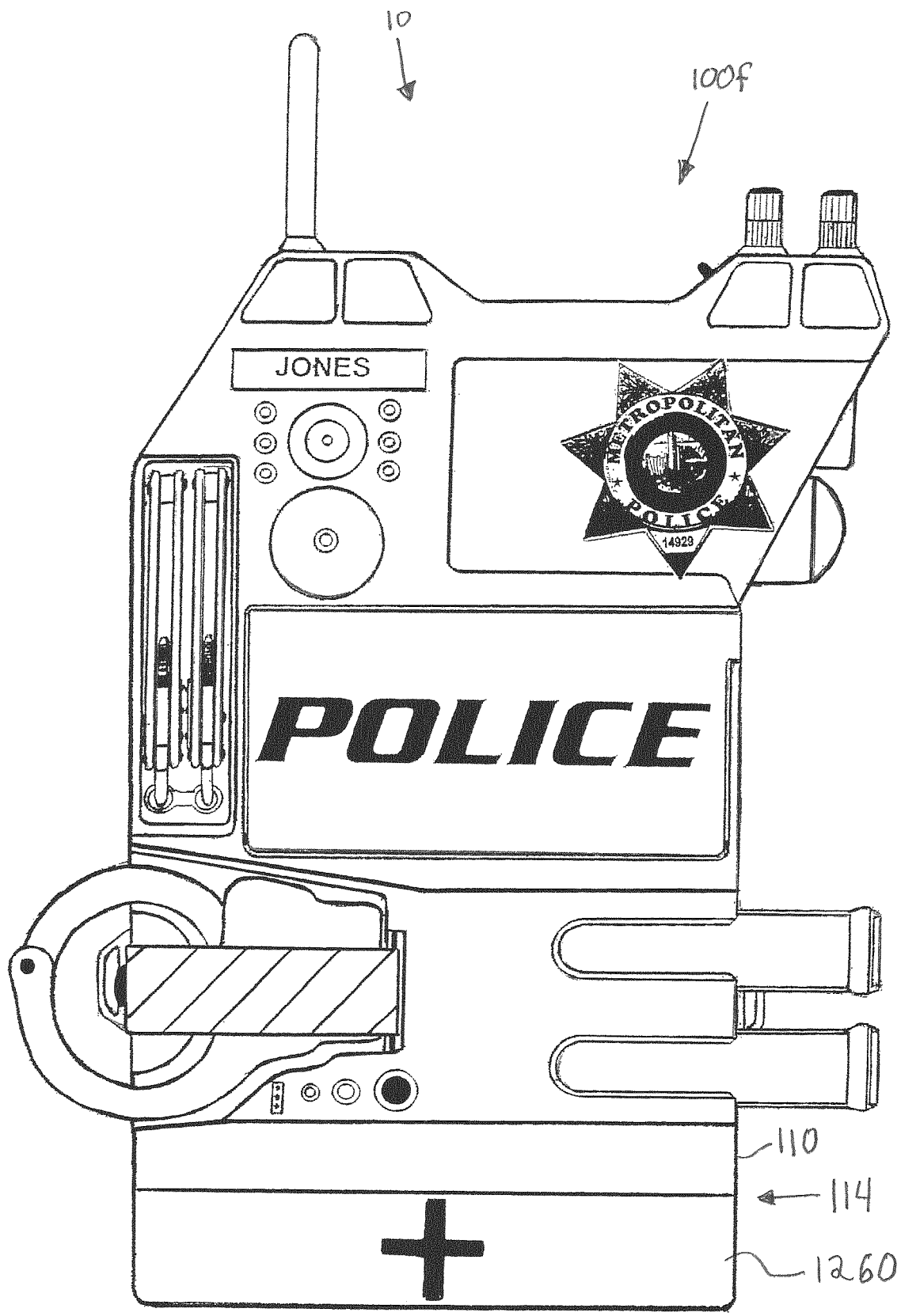
FIG. 38 is a front view of a main unit embodiment that has been vertically extended by slidable attachment of a first aid tool module to a bottom slide rail of the main unit.

Main unit 100 embodiments may be physically enlarged via inclusion of attachable components. For example, FIG. 38 depicts a main unit 100*f* embodiment that has been vertically extended by slidable attachment of a first aid tool module 1260 to a bottom slide rail, such as bottom slide rail 114 (shown in FIG. 5A) of the housing 110 of main unit 100*f*. The first aid tool module 1260 may include a number of first aid implements, such gauze, tape, a blood clotting packet, rubber gloves, a tourniquet and/or other like first aid implements, and wherein the tourniquet may operate with an expandable rod, which may telescope out for greater leverage, and a nylon strap with a built-in loop, which may allow for quick deployment once the tourniquet is removed from the first aid tool module 1260.

Figure 39:
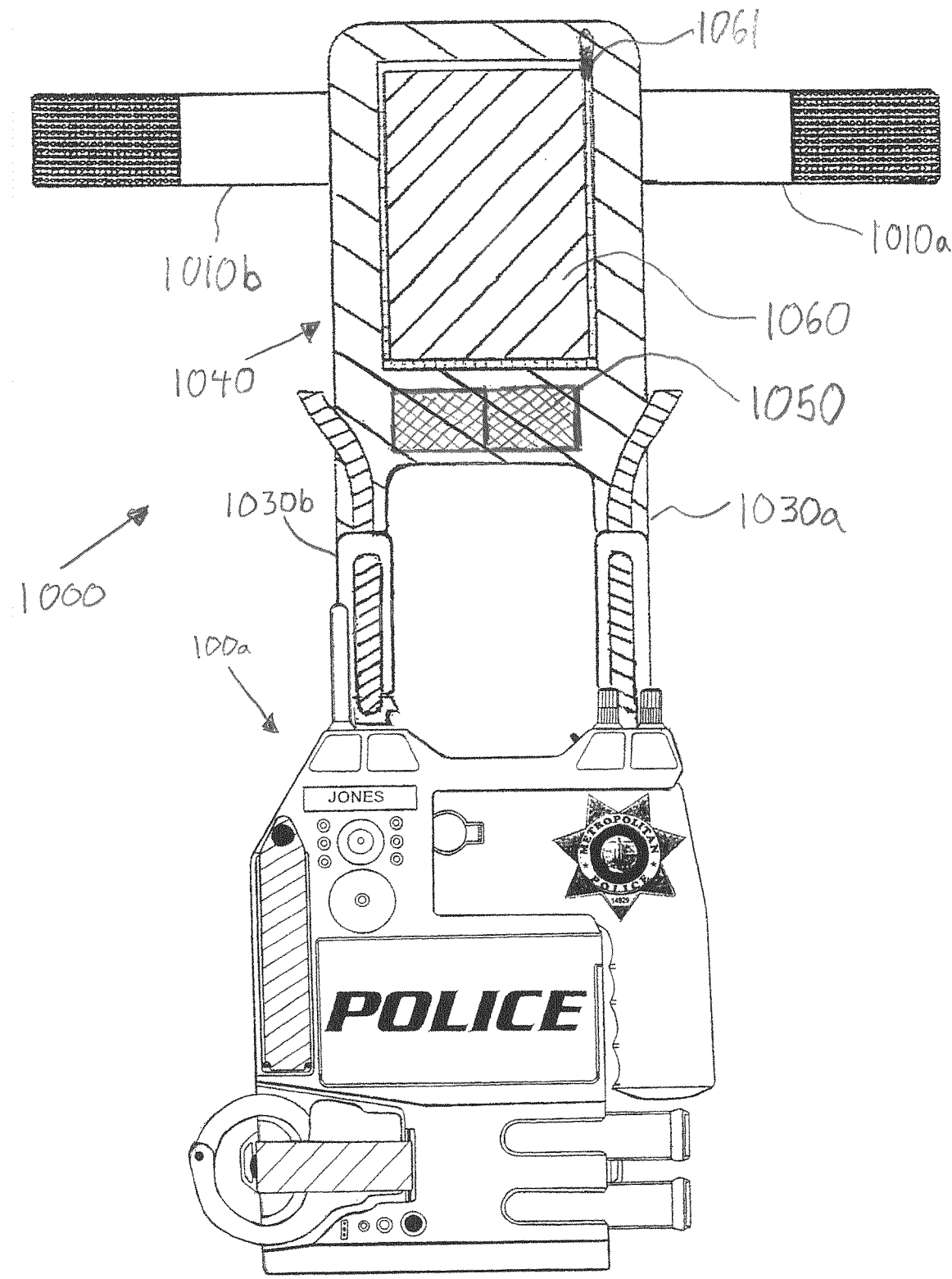
FIG. 39 is a front view of a main unit attached to a backpack embodiment.

FIG. 39 depicts features of a tactical torso tool carrier and communication device 10, wherein a main unit, such as main unit 100*a*, is connected to straps and components forming a backpack. The backpack embodiment depicted in FIG. 39 may include side straps 1010*a* and 1010*b*, which may be used to attach features of the tactical torso tool carrier and communication device 10, in a manner wherein the two side straps 1010*a-b* may join together around an officer's waist securely through side slots (not visible) of a main unit, and also operate with top straps 1030*a* and 1030*b*, so as to form a functional backpack embodiment. A backpack storage area 1060 may be accessible via a zipper 1061 and may also share space with a canteen bladder 1040. The backpack embodiment depicted in FIG. 39 may also incorporate a solar panel(s) 1050, which solar panel(s) 1050 may assist officers in recharging the one or more rechargeable batteries that may be associated with components of a tactical torso tool carrier and communication device 10. The backpack embodiment may also facilitate mobile housing and charging of an autonomous drone.

Figure 44:
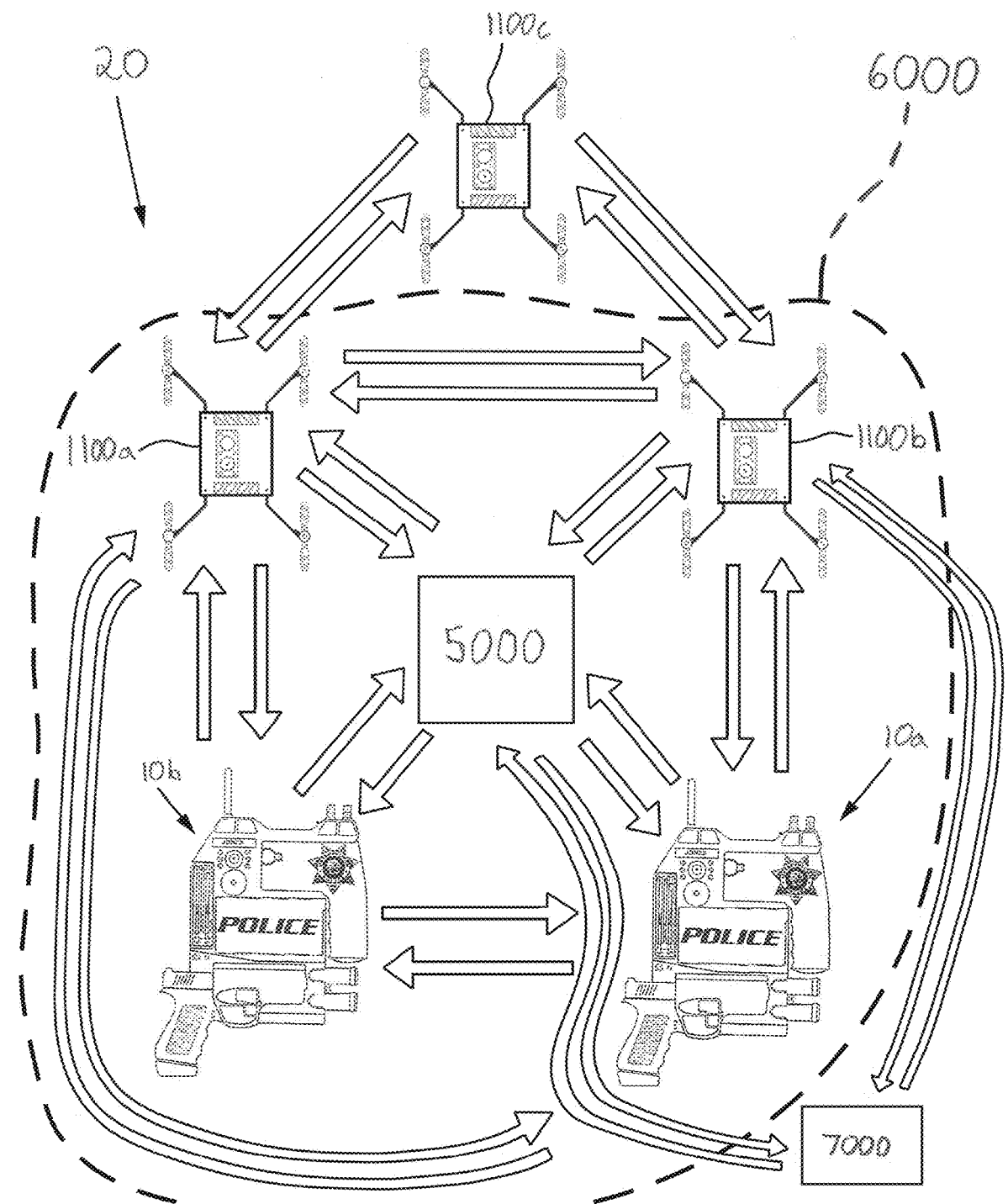
FIG. 44 is a schematic view of an embodiment of a networked control and communication system.

Tactical torso tool carrier and communication devices 10 may operate with one or more autonomous drones. Referring to FIG. 40, a foldable autonomous drone 1100 is depicted. The drone 1100 may include collapsible rotor arms 1180 and blades 1180 configured so that the rotor arms 1140 and blades may be folded into a collapsed profile allowing the autonomous drone 1100 to be docked in a drone tool module 1150, wherein the drone tool module 1150 may be operable with a tactical torso tool carrier and communication device 10. The autonomous drone may be in communication with a processor, such as processor 652, of a main unit 100, wherein the autonomous drone may include at least one wireless transmitter/receiver. The at least one wireless transmitter/receiver may facilitate communications between the drone 1100 and a main unit 100 of one or more tactical torso tool carrier and communication devices 10, and/or a command center 5000 (see FIG. 44), and/or other communication devices. A tactical torso tool carrier and communication device 10 may include a drone controller and/or drone controller application configured to control one or more autonomous drones 1100. The controller may be part of a main unit embodiment associated with features of a tactical torso tool carrier and communication device 10 worn by an officer who may have launched a drone 1100, may be a controller that is part of a main unit worn by another officer that did not launch a drone 1100, may be a separate controller not associated with a main unit (and perhaps operated by another officer, or a by central command), and/or may be a controller linked with artificial intelligence (AI) functionality, which AI functionality may help coordinate the actions of the drone 1100 and/or synchronize the actions of multiple drones operating simultaneously. Embodiments of an autonomous drone 1100 may include one or more cameras, such as camera 1160, and may operate with night vision or otherwise include non-visible spectrum imaging, such as may be facilitated by IR lights 1163. GPS technology, along with cellular transmission capability, may be paired with drone 1100 operation, to help navigate drone 1100 movement, to help coordinate multiple drone synchronization, and to help facilitate locating friendly officers viewable (whether by visual image capture or other means) by a launched drone 1100.

A drone associated with a Main Unit of a tactical torso tool carrier and networked control and communication system 10 may communicate with one or more of the transmitter/receivers of a main unit embodiment, such as a transmitter/receiver of a two-way radio that is associated with a controller to receive and respond to command signal transmissions, while, at the same time, the drone may include another transmitter/receiver configured to transmit and/or receive cellular communications from a cellular phone transmitter/receiver of a main unit embodiment (or possibly from a cellular transmitter receiver associated with another drone, with another officer, and/or with a central command), while further, at the same time, a GPS receiver of the drone may receive signals pertaining to GPS coordinates. Additionally, a transmitter/receiver of a drone may be configured to communicate with a transmitter/receiver of a two-way radio of a Main Unit 1 worn by an officer. Moreover, the transmitter/receiver of a drone may communicate with a two-way radio and/or a cellular communication system that is utilized by a command center. One or more transmitter/receivers of a drone 1100 may operate via short-wave radio communications, may operate via cellular network communications, may benefit from and receive GPS communications, and/or may operate via other like communication means to effectuate operable communication with an officer who launched the drone, with another officer or officers, and/or with a central command (that may have launched the drone), wherein the communication may comprise drone command and response signals, data streams pertaining to captured audio/video (A/V) and/or other communication signals and/or data transmissions commensurate with the operation of a drone as set forth herein.

By pushing a drone activation button 148 (see FIG. 9) a drone in communication with a tactical torso tool carrier and communication device 10 may launch. For example, an autonomous drone 1100 may unfold (see FIG. 40) and activate its motors automatically. An officer can use a screen operable with their tactical torso tool carrier and communication device 10, to glean information and control the drone. A touchscreen display, such as display 910 (see FIG. 8) or a screen of an operably associated smartphone, may show control features (like icons, joystick images, digital speed bars, elevation indicators, battery power indicators, camera, light, speaker and sound amplification control signs, GPS coordinates, and other like features) that may help control the drone. A drone controller associated with a main unit 100 embodiment may operate with the processor, such as processor 652, of the main unit 100. The controller application may show not only control features on the screen but may also depict the video images captured by the camera(s), such as camera 1160, associated with the drone. Moreover, split-screen applications may permit an officer or command center to control the drone, see video footage captured by the drone, potentially see video footage captured by other associated drones, and see GPS related imagery. In addition, overlay technology may allow maps, pinpoint indicators pertaining to officer location, GPS data and other information to be overlaid onto the video images from the drone that are shown on the screen.

A drone controller may provide an officer or command center with the ability to dictate to what and to whom a drone may transmit A/V data and other information, such as whether the drone broadcasts information to nearby officers, to a central command dispatch, or to another entity having a permitted and operable transmission/reception-configured device. Additionally, the transmission of data from the drone 1100 to various other devices may also be automated.

An autonomous drone 1100 may operably reside with a main unit 100, such as in a backpack 1060 or as incorporated into a tool module attached to a docking station of the main unit, and, in this regard, the drone 1100 may be with an officer actively wearing the main unit 100. Moreover, an autonomous drone 1100 may reside with a patrol vehicle, such as in an automatically openable weatherproof housing mounted on the patrol vehicle, such as on the trunk or as incorporated into a light-bar implement of the patrol vehicle. In addition, an autonomous drone may reside in a stationary housing, such as a weatherproof housing located on top of a city building. Wherever an autonomous drone 1100 operably resides, it may be launched and controlled by a user utilizing a tactical torso tool carrier and communication device 10, and/or by a stationary central command, such as a drone command officer stationed in a drone control headquarters.

Figure 42:
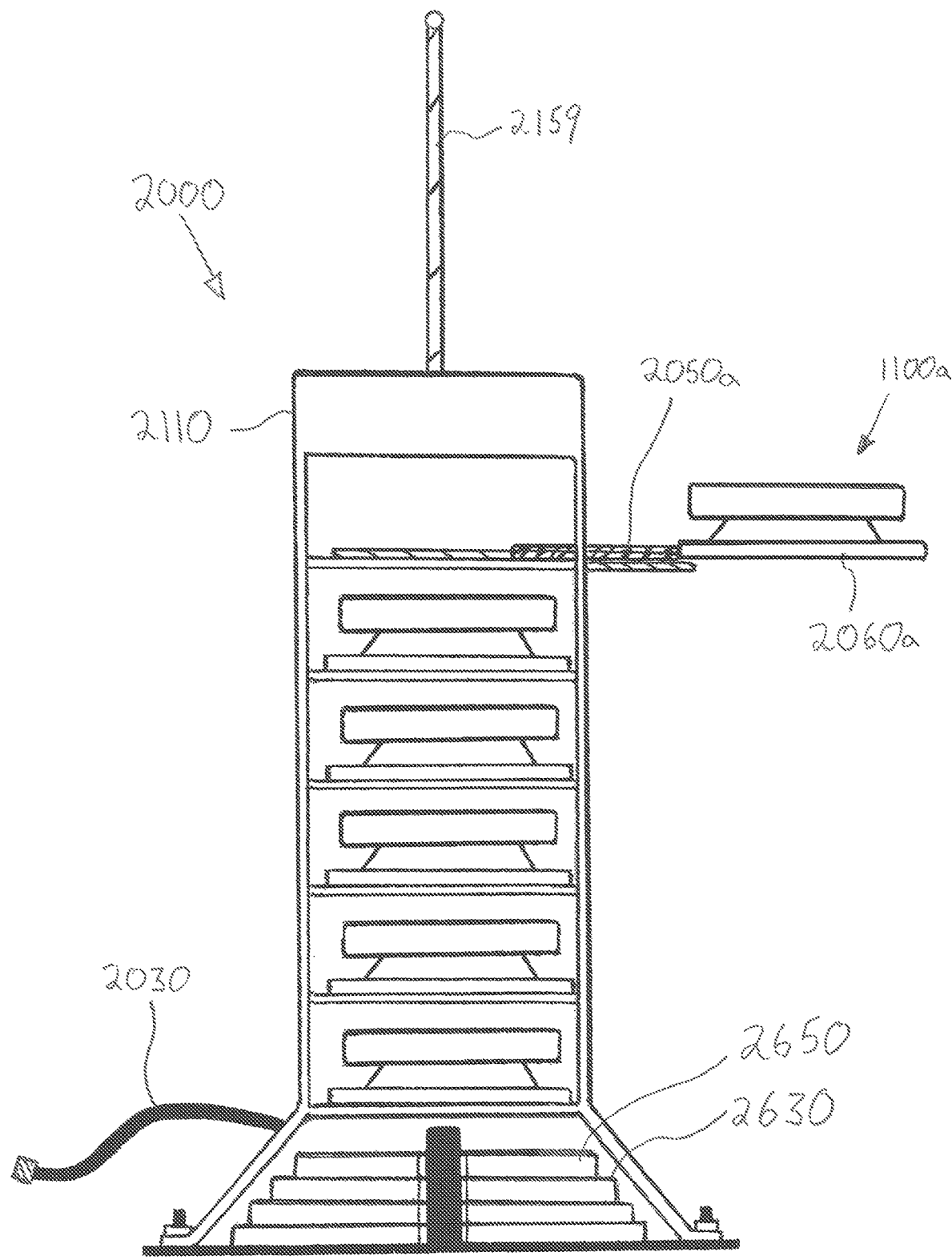
FIG. 42 is a partial cut-away front view of a drone hub housing a plurality of autonomous drones.
Figure 43:
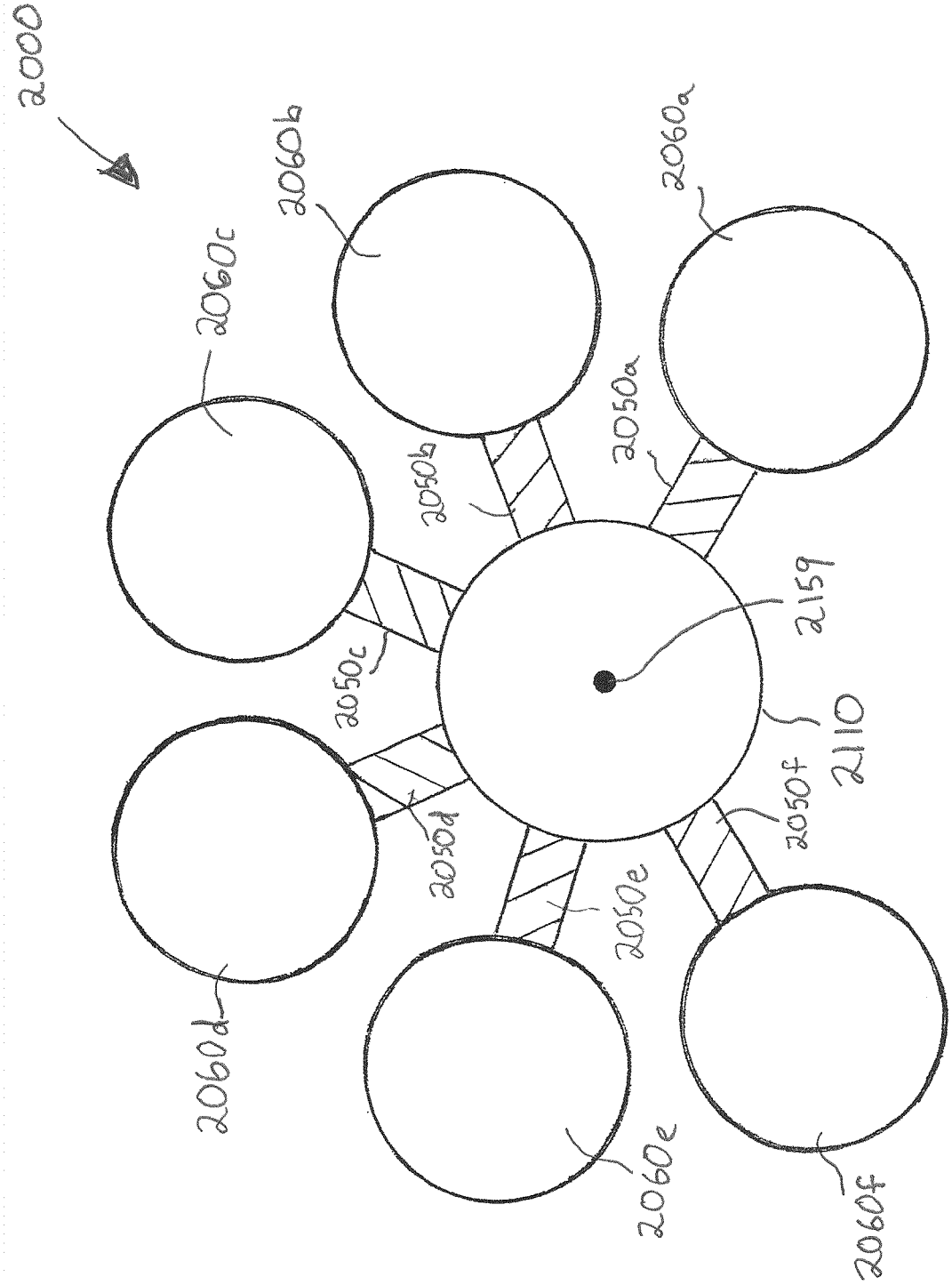
FIG. 43 is a top view of a drone hub with a plurality of drone terminals in an extended position.

With further reference to the drawings, a plurality of drones 1100a-f may reside in a drone hub, such as drone hub 2000 depicted in FIG. 42. Each drone of the plurality of drones 1100a-f housed in the drone hub 2000 may operate and communicate in association with one or more tactical tool carrier devices 10 and/or with a command center, such as command center 5000 depicted in FIG. 44. A drone hub 2000 may include a weatherproof housing 2110 configured to operably house the plurality of drones 1100a-f, wherein each drone may be separately/simultaneously launched from or stored in the drone hub 2000. With continued reference to FIG. 42 and further reference to FIG. 43, one exemplary embodiment of a drone hub 2000 may be a tower-like structure having a plurality of drone pads 2060a-f movably extendable from and contractable back into the housing 2110 by a corresponding plurality of operably connected extension arms 2050a-f. A drone hub 2000 may include a computing device 2650 operable with a processor and a transmitter/receiver. A drone hub 2000 may include a battery 2630 that may be electrically connected to the computing device (including the transmitter/receiver and the processor) and each of the plurality of drones 1100a-f when operably stowed on a corresponding drone pad 2060a-f, so that, as stowed, each drone may be charged either through a wireless charging process, or by contact with electrical charge contacts on the drone pads 2060a-f. Additionally, a drone hub 2000 may also operate with hardline electrical power and physical communication cables 2030 operably connected to the drone hub 2000, whereby the drone hub 2000 may have available electrical power and be connected to the internet and other communication networks associated with the physical communications cables.

Embodiments of a tactical torso tool carrier and communication device 10 may operate with a plurality of drones operably housed in a plurality of drone hubs. For example, several drone hubs 2000 may be placed on different rooftops in different locations around a city. With continued reference to the drawings and further reference to FIG. 44, a networked control and communication system 20 may comprise a plurality of drones, such as drones 1100a and 1100b, that may be communicatively linked to one or more tactical torso tool carrier and communications devices, such as device 10a and device 10b. Moreover, a plurality of drones, such as drones 1100a and 1100b, may be communicatively linked to a central command 5000. In addition, one or more tactical torso tool carrier and communication devices, such as devices 10a and 10b, may be communicatively linked to a central command 5000. A communications network 6000 may help facilitate exchange of communications between one or more drones, such as drones 1100. Additionally, communications, such data signals, may be exchanged between at least one tactical torso tool carrier and communication device 10 and a data repository 7000 and/or communications, such as data signals, may be exchanged between a command center 5000 and the data repository 7000. The data repository may comprise a cloud-accessible data and may be housed virtually and/or physically in one or more repository locations.

Drones in communication with a tactical torso tool carrier and communications device 10 and/or in communication with a command center 5000 may operate individually. Furthermore, a plurality of drones in communication with a tactical torso tool carrier and communications device 10 and/or in communication with a command center 5000 may operate simultaneously. In addition, a plurality of drones may be synchronized for organized controlled operation of the plurality of drones. When a drone is launched, such as from a main unit worn by an officer arriving at a crime scene, such as from a patrol car, such as from a hub on a nearby building, and/or such as from a hub near a police headquarters command center, a control system may monitor the battery capacity of the drone and determine how long the drone can operate before it needs to depart the crime scene area and have enough power to operably land. A second drone may be launched from any operable location in time to arrive at the crime scene prior to the calculated departure of the first drone. Once the first drone has landed, it can be recharged on a landing pad. Where enough drones are provided, drone operation over a crime scene may be continuous. Drone control and operation may be effectuated by a drone control officer monitoring and controlling the drones from a command location, and/or may be effectuated by an AI control platform in communication with the drones.

Where the above examples, embodiments and implementations reference examples, it should be understood by those of ordinary skill in the art that other networks, protocols, and hardware and examples could be intermixed or substituted with those provided. In places where the description above refers to particular embodiments of systems and methods associated with a tactical torso tool carrier and networked control and communication system, it should be readily apparent that a number of modifications may be made without departing from the spirit thereof and that these embodiments and implementations may be applied to other tactical torso tool carrier and networked control and communication system and industries as well. Accordingly, the disclosed subject matter is intended to embrace all such alterations, modifications and variations that fall within the spirit and scope of the disclosure and the knowledge of one of ordinary skill in the art.

It will be understood that tactical torso tool carrier and networked control and communication system implementations are not limited to the specific components disclosed herein, as virtually any components consistent with the intended operation of the various tactical torso tool carrier and networked control and communication system implementations may be utilized. Accordingly, for example, it should be understood that, while the drawings and accompanying specification describe particular tactical torso tool carrier and networked control and communication system implementations, any such implementation may comprise any shape, size, style, type, model, version, class, grade, measurement, concentration, material, weight, quantity, and/or the like consistent with the intended operation of tactical torso tool carrier and networked control and communication system implementations.

The concepts disclosed herein are not limited to the specific tactical torso tool carrier and networked control and communication system implements shown herein. For example, it is specifically contemplated that the components included in particular tactical torso tool carrier and networked control and communication system implementations may be formed of any of many different types of materials or combinations that can readily be formed into shaped objects and that are consistent with the intended operation of tactical torso tool carrier and networked control and communication systems. For example, the components may be formed of: rubbers (synthetic and/or natural) and/or other like materials: glasses (Such as fiberglass), carbon-fiber, aramid-fiber, any combinations thereof, and/or other like materials; polymers such as thermoplastics (such as ABS, Fluoropolymers, Polyacetal, Polyamide, Polycarbonate, Polyethylene, Polysulfide, and/or the like), thermosets (such as Epoxy, Phenolic Resin, Polyimide Polyurethane, Silicone, and/or the like), any combination thereof, and/or other like materials; composite and/or other like materials; metals, such as zinc, magnesium, titanium, copper, iron, steel, carbon steel, alloy steel, tool steel, stainless steel, spring steel, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing.

Furthermore, tactical torso tool carrier and networked control and communication system implementations may be manufactured separately and then assembled together, or any or all of the components may be manufactured simultaneously and integrally joined with one another. Manufacture of these components separately or simultaneously, as understood by those of ordinary skill in the art, may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, etching, assembling, and/or the like. If any of the components are manufactured separately, they may then be coupled or removably coupled with one another in any manner, such as friction fitting, interlocking, joining with adhesive, a plastic weld, a fastener, any combination thereof, and/or the like for example, depending on, among other considerations, the particular material(s) forming the components.

In places where the description above refers to particular tactical torso tool carrier and networked control and communication system embodiments, it should be readily apparent that a number of modifications may be made without departing from the spirit thereof and that these implementations may be applied to other implementations disclosed or undisclosed. The presently disclosed tactical torso tool carrier and networked control and communication system implementations are, therefore, to be considered in all respects as illustrative and not restrictive.

What is claimed is:

1. A method of wireless communication, the method comprising:
   providing a plurality of tactical torso tool carrier and communication devices, wherein each of the provided tactical torso tool carrier and communication devices include:
      a main unit configured to be worn on the torso of a person, the main unit including:
         a housing having a plurality of docking stations, wherein each of the plurality of docking stations is configured to securely attach a removable tool module to the housing;
         a wireless transmitter/receiver, wherein the transmitter/receiver is housed within the housing;
         a video camera, wherein at least a portion of the video camera is housed within the housing; a microphone, wherein at least a portion of the microphone is located on the housing;
         a screen, attached to the housing;
         a processor, housed within the housing and in communication with the wireless transmitter/receiver, the video camera, the microphone, and the screen; and
         a battery, configured to provide electrical power to the wireless transmitter/receiver, the video camera, the microphone, the screen, and the processor; and
   transmitting communications between at least two tactical torso tool carrier and communication devices of the plurality of tactical torso tool carrier and communication devices.

2. The method of wireless communication of claim 1, further comprising transmitting communications between a command center and at least one tactical torso tool carrier device of the plurality of tactical torso tool carrier and communication devices.

3. The method of wireless communication of claim 2, wherein the main unit further comprises a body light, a drone activation button, an emergency button, a nameplate and police indicia, handcuffs, an infrared strobe, a magazine holder, a tourniquet, a knife holder sleeve configured to receive a tactical knife and handcuff key, and an identity verification actuator; and wherein the transmitter/receiver operates with a two-way radio.

4. The method of wireless communication of claim 2, wherein the main unit operates with a smart holster having a use sensor, the smart holster in communication with the processor.

5. The method of wireless communication of claim 4, wherein the smart holster includes a charging contact configured to mate with a charging contact of an electronically enhanced lethal firearm, the electronically enhanced lethal firearm including a gun light, a laser sight, and a battery, the battery in electrical communication with an electronically enhanced wireless magazine having an electrical contact configured to electrically connect with a corresponding contact of the electronically enhanced lethal firearm, when the magazine is loaded in an operable position within the electronically enhanced lethal firearm, and further wherein the electronically enhanced wireless magazine includes a camera, a wireless transmitter, a processor, and a battery electrically connected with the camera, the wireless transmitter, and the processor.

6. The method of wireless communication of claim 2, further comprising communications through a communication network between at least one tactical torso tool carrier and communication device and a data repository.

7. The method of wireless communication of claim 2, further comprising communications between the command center and at least one autonomous drone.

8. The method of wireless communication of claim 7, wherein the at least one autonomous drone is communicatively associated with a drone network comprising a plurality of autonomous drones, and wherein each of the autonomous drones of the plurality of autonomous drones of the drone network is configured to communicate with the command center.

9. The method of wireless communication of claim 8, further comprising transmitting communications between an autonomous drone and at least one tactical torso tool carrier device of the plurality of tactical torso tool carrier and communication devices.

10. The method of wireless communication of claim 2, wherein the communications transmitted between the at least two tactical torso tool carrier and communication devices include audio/visual signal and global positioning system data.

11. A networked control and communication system comprising:
a plurality of tactical torso tool carrier and communication devices, wherein each tactical torso tool carrier and communication device of the plurality of tactical torso tool carrier and communication devices includes:
a main unit configured to be worn on the torso of a person, the main unit including:
a housing having at least one docking station, wherein the at least one docking station is configured to securely attach a plurality of differently configured removable tool modules to the housing;
a microphone, wherein at least a portion of the microphone is located on the housing;
a video camera, wherein at least a portion of the video camera is housed within the housing;
a processor, in communication with the microphone and the video camera; and
a battery, configured to provide electrical power to the microphone, the video camera, and the processor; and
a command center, wherein at least two of the tactical torso tool carrier and communication devices of the plurality of tactical torso communications devices communicate with the command center through a communication network; and
wherein communications between at least two of the tactical torso tool earner and communication devices of the plurality of tactical torso communications devices are exchanged through the communication network.

12. The networked control and communication system of claim 11, wherein communications through the communication network between the command center and at least one tactical torso tool carrier and communication device include audio/video data.

13. The networked control and communication system of claim 11, wherein communications through the communication network between at least two of the tactical torso tool carrier and communication devices of the plurality of tactical torso communications devices include audio/video data.

14. The networked control and communication system of claim 11, wherein communications through the communication network between the command center and at least one tactical torso tool carrier and communication device include smart holster sensor operation data.

15. The networked control and communication system of claim 11, wherein communications through the communication network between the command center and at least one tactical torso tool carrier and communication device include two-way radio communications.

16. The networked control and communication system of claim 11, further comprising a plurality of docking stations, wherein at least one of the plurality of docking stations is configured as a housing compartment to securely removably stow and charge a non-lethal multi-functional law enforcement weapon tool, wherein the non-lethal multi-functional law enforcement weapon tool includes:
a flashlight;
a laser sight;
a pepper spray cannister;
a wireless transmitter;
a battery; and
a removable electronic control device cartridge.

17. The networked control and communication system of claim 16, wherein the removable electronic control device cartridge includes:
a laser sight hole;
a pepper spray nozzle;
at least one electrically charged probe; and
a pressurized gas capsule configured to discharge gas based on a command initiated via the non-lethal multi-functional law enforcement weapon tool and project the at least one electrically charged probe and tethered wire from the electronic control device cartridge.

18. The networked control and communication system of claim 11, wherein the main unit is configured to operate with at least one autonomous drone in communication with the processor.

19. The networked control and communication system of claim 11, further comprising transmitting communications between at least two tactical torso tool carrier and communication devices of the plurality of tactical torso tool carrier and communication devices.

* * * * *